(12) United States Patent
Howard

(10) Patent No.: US 12,710,942 B1
(45) **Date of Patent: *Aug. 18, 2026**

(54) SOFTWARE SYSTEMS AND METHODS FOR A-OALP EXECUTION ON REVERSIBLE-LOGIC OR MEASUREMENT-BASED GATES

(71) Applicant: Kevin D. Howard, Mesa, AZ (US)

(72) Inventor: Kevin D. Howard, Mesa, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/433,925

(22) Filed: Dec. 28, 2025

Related U.S. Application Data

(63) Continuation-in-part of application No. 19/301,590, filed on Aug. 15, 2025, which is a continuation of application No. 19/171,172, filed on Apr. 4, 2025, now Pat. No. 12,411,671.

(60) Provisional application No. 63/869,268, filed on Aug. 23, 2025.

(51) Int. Cl.

| | |
|---|---|
| ***G06N 3/00*** | (2023.01) |
| ***G06F 8/41*** | (2018.01) |
| ***G06N 3/08*** | (2023.01) |

(52) U.S. Cl.
CPC ............... *G06F 8/443* (2013.01); *G06N 3/08* (2013.01)

(58) Field of Classification Search
CPC .................................. G06F 8/443; G06N 3/08
See application file for complete search history.

(56) References Cited

U.S. PATENT DOCUMENTS 11,520,560 B2 * 12/2022 Howard ............ G06F 16/24558

OTHER PUBLICATIONS

Yang et al.,"A Comprehensive Survey on Integrating Large Language Model with Knowledge-Based Methods," 2025, arxiv, pp. 1-25, retrieved from the Internet: <URL: https://arxiv.org/pdf/2501.13947> (Year: 2025).*

* cited by examiner

*Primary Examiner* — Hanh Thi-Minh Bui
(74) *Attorney, Agent, or Firm* — Skaar Ulbrich Macari, P.A.

(57) ABSTRACT

Advanced output-affecting linear pathways (A-OALPs), each defined as having one or more inputs and a single output, are shown to be continuous, differentiable, single-valued, and either monotonic or constant, permitting the derivation of output complexity as a primary analytic (as are advanced time and advanced space complexity) whose data transformations are equivalent to the data transformations of its associated A-OALP. Single input variable A-OALPs and output complexities are reversible when monotonic. Advanced output vectors enable reversibility of single- or multiple-input A-OALPs and their execution on reversible-logic gates. Linked A-OALPs may form reversible directed acyclic graphs (DAGs) representing neural networks and other algorithmic structures that are compressible, reversible, and quantum-executable. Advanced output vectors further enable A-OALP and A-OALP network reconstruction and parallel execution using dynamic loop-unrolling parallelism, the associative parallel principle, A-OALP graph-based parallelism, and superposition parallelism to achieve energy-efficient, reversible, and quantum-compatible computation.

16 Claims, 36 Drawing Sheets

*Example of A-OALP Generated Input Data for Neural Network Learning*

*Example Input to Output Graph*

*Table 3: Example A-OALP Source Value Table Data Converted into Source Code*

*Example Output Curve Decomposed into Six A-OALPs*

*Example Non-Continuous, Non-Single-Valued Curve*

*Comparison of Decomposing Algorithm's Execution Pathway into a TALP or a Set of A-OALPs*

*Diagrammatic View of Decomposition of Algorithm into Set of A-OALPs with Associated Output Complexities*

| Source Values Table | |
|---|---|
| Input Values | Output Values |
| 1 | 1 |
| 2 | 0.9 |
| 4 | 16 |
| 8 | 64 |
| 16 | 256 |
| 32 | 1024 |
| 64 | 4096 |

*Example Input to Output Values Highlighting Monotonic Stable Curve Values*

*Example Advanced Output Vector vs All Quadrant Advanced Output Vector*

*Example A-OALPs Linked Using Combined Advanced Output Vectors*

Example Reverse (Inverse) Linked A-OALPs Using Uncombined Advanced Output Vectors

220

Advanced Output

194

$$\overrightarrow{m} = \left[o, \#i_o \left[\overrightarrow{i_o}\right]\right] = \left[m, 3, \left[\overrightarrow{j}, \overrightarrow{k}, \overrightarrow{l}\right]\right]$$

| "m" Source Values Table | |
|---|---|
| Input Values | Output Values |
| $[j, k, l]$ | $m_1$ |
| $\left[\frac{j}{2}, \frac{k}{2}, \frac{l}{2}\right]$ | $m_2$ |
| ... | ... |
| $\left[\frac{j}{n}, \frac{k}{n}, \frac{l}{n}\right]$ | $m_n$ |

$m = \gamma_m(j, k, l)$

| "j" Source Values Table | |
|---|---|
| Input Values | Output Values |
| $[a, b, c]$ | $j_1$ |
| $\left[\frac{a}{2}, \frac{b}{2}, \frac{c}{2}\right]$ | $j_2$ |
| ... | ... |
| $\left[\frac{a}{n}, \frac{b}{n}, \frac{c}{n}\right]$ | $j_n$ |

$j = \gamma_j(a, b, c)$

| "k" Source Values Table | |
|---|---|
| Input Values | Output Values |
| $[d, e, f]$ | $k_1$ |
| $\left[\frac{d}{2}, \frac{e}{2}, \frac{f}{2}\right]$ | $k_2$ |
| ... | ... |
| $\left[\frac{d}{n}, \frac{e}{n}, \frac{f}{n}\right]$ | $k_n$ |

$k = \gamma_k(d, e, f)$

| "l" Source Values Table | |
|---|---|
| Input Values | Output Values |
| $[g, h, i]$ | $l_1$ |
| $\left[\frac{g}{2}, \frac{h}{2}, \frac{i}{2}\right]$ | $l_2$ |
| ... | ... |
| $\left[\frac{g}{n}, \frac{h}{n}, \frac{i}{n}\right]$ | $l_n$ |

$l = \gamma_l(g, h, i)$

*Regeneration of Linked A-OALP Output Complexities from Advanced Output Vector*

FIG. 13

*Example List of Advanced Output Vectors Shown as One-, Two-, and Three-Dimensional Arrays*

*Example Superposition Adjacent 3-Dimensional Cylinder of Advanced Output Vectors*

*Example A-OALP with its Inverse (Reverse)*

*Example A-OALP Generation using the Associative Parallel Principle*

*Reverse Serial A-OALP*

Parallel A-OALP Processing Framework with Accessible Analytics

A-OALP Reversible Parallel A-OALP Framework with Accessible Analytics

A-OALP Reversible Parallel States with Accessible Analytics and Context Awareness Example of Linked A-OALPs with Timing and Spatial Information

*Example A-OALP-Based Directed Acyclic Graph Using Both Standard and Associated Advanced Output*

*A-OALP Network Version-Control Process Flow*

Example Operational State to Select A-OALP/A-OALP Network

*Example Multiple A-OALP Selection within a Single Network*

*Example Detection and Network Path Selection from Non-Starting A-OALP*

*Example Auto-Generation of Network Using Auto A-OALP Generation*

| Source Value A-OALP 5 | |
|---|---|
| Input Data Values | Output Data Values |
| 1 | 2 |
| 2 | 4 |
| 4 | 16 |
| ... | ... |

| Source Value A-OALP 7 | |
|---|---|
| Input Data Values | Output Data Values |
| 1 | 2 |
| 2 | 8 |
| 4 | 64 |
| ... | ... |

| Source Value Hybrid | |
|---|---|
| Output from A-OALP 5 | Input from A-OALP 7 |
| 2 | 1 |
| 4 | 2 |
| 16 | 4 |
| ... | ... |

*Table 1: Example Hybrid Source Values Table for New A-OALP*

*Example A-OALP-Based DAG, using Advanced Outputs, and its Reverse*

*Example Feed Forward (using Gradient Descent) Neural Network Analysis*

Example of A-OALP Generated Input Data for Neural Network Learning

| A | B | P | Q |
|---|---|---|---|
| 0 | 0 | 0 | 0 |
| 0 | 1 | 0 | 1 |
| 1 | 0 | 1 | 1 |
| 1 | 1 | 1 | 0 |

*Example Feynman Reversible Logic Gate with Associated Truth Table*

*Example Measurement-Based Quantum Circuit*

SOFTWARE SYSTEMS AND METHODS FOR A-OALP EXECUTION ON REVERSIBLE-LOGIC OR MEASUREMENT-BASED GATES

CROSS-REFERENCE TO RELATED APPLICATIONS

This Application is a continuation-in-part of U.S. patent application Ser. No. 19/301,590, filed Aug. 15, 2025, which is a continuation of U.S. patent application Ser. No. 19/171,172, filed Apr. 4, 2025 and now issued as U.S. Pat. No. 12,411,671, and this Application also claims priority to and the benefit of U.S. Provisional Patent Application No. 63/869,268, filed Aug. 23, 2025; with each of the referenced and listed applications and disclosures fully incorporated herein by reference.

TECHNICAL FIELD

The present invention relates generally to algorithm decomposition, software parallelization, serial and parallel software analytics generation, and more particularly to advanced output-affecting linear pathways (A-OALPs) expanded to include algorithm compression and network execution on historic, reversible logic, and measurement-based quantum systems.

BACKGROUND OF THE INVENTION

U.S. Pat. No. 11,520,560, Computer Processing and Outcome Prediction Systems and Methods, and U.S. Patent Application Publication No. 2024/0119109, Methods and Systems for Time-Affecting Linear Pathway (TALP) Extensions, address the decomposition of existing application source code, algorithms, processes, software modules, and software functions into executable and analyzable components called time-affecting linear pathways (TALPs) and the decomposition of a TALP into output-affecting linear pathways (OALPs), which contain a single input variable and multiple output variables. OALPs were shown to be useful in determining the sensitivity of the outputs of the associated TALP to the values of each input variable, did not generally represent a complete transformation of the data, and were seen as an analytical expansion to the TALP model.

In U.S. Pat. No. 12,411,671, Software Systems and Methods for Advanced Output-Affecting Linear Pathways, it was shown that existing application source code, algorithms, processes, software modules, and software functions could be directly decomposed into pathways called A-OALPs. An A-OALP was shown to have one or more input variables and, unlike TALPs, only a single output variable. A-OALP decomposition was shown to have advantages over TALPs.

Most computer programming languages have the concept of process grouping. For example, there are subroutines, functions, tasks, components, objects, and/or modules associated with an application. These process grouping concepts do not guarantee that a computer language function is defined such that given some set of input values, there is only a single output value, which seems to be the original intent of the C computer language as shown by the multiple input, single output formal definition of a function. The "C" computer language family, which includes the following computer languages: Agora, Alef, Amiga E, AMPL, AWK, Axum, BCPL, C,C Shell/tchsh, C*, C++, C−−, Cg, Ch, Chapel, Charm, Cilk, CINT, Claire, Cyclone, C#, D, Dart, E, eC, Fantom, Fusion, Go, Hack, Handel-C, HolyC, Java, JavaScript, Limbo, LSL, Lite-C, LPC, Neko, Nemerle, nesC, Newsqueak, Nim, Noop, NXC, NQC, OAK, Objective-C, OpenCL C, Perl, PHP, Pike, PROMAL, R, Ruby, Rust, S-Lang, SA-C, SAC, Seed7, Split-C, Squirrel, Swift, Telescript, TypeScript, Umple, Unified Parallel C, V, and Zig, all contain process groups that typically allow for multiple formal inputs and a single formal output. However, the formal input variables are defined using either pass-by-value or pass-by-reference techniques. The use of pass-by-value techniques does not inherently circumvent the formal process group definition. The use of pass-by-reference input variables means that the formal process group definition can be circumvented when pass-by-reference input variable values are changed, forcing these variables to also be outputs. In addition, writing to data streams or files circumvents the formal process group definition. There is no guarantee of a unique relationship between some input dataset and a single corresponding output data value.

In 1981 the Nobel-prize winning physicist Dr. Richard Feynman highlighted the physical limitations of classical computers and proposed using quantum computers. His quantum computation scheme (called reversible computing) used functions and their associated reverse (inverse) functions ($y=F(x)$ and $x=F^{-1}(y)$) (called reversible logic form) on a set of CNOT-equivalent logic gates (called Feynman gates or two-way quantum gates) to minimize the energy use of a computation. The problem with reversing a function with multiple input variables is that assigning the correct input values with only the output value present can be difficult. This is because this information can be lost once the function's data transformation is complete. What is required are both additional Feynman gates (to hold the information) and a way to preserve the lost input data information. Most functions can theoretically be performed using Feynman gates as long as those functions are well-behaved and reversible. The advantage of using Feynman gates is that they use as little as 0.001% of the energy required by standard circuits. This is because of a technique called adiabatic switching, which slows down voltage changes to minimize energy loss. That is, instead of abruptly switching logic states, the system moves between states gently, allowing energy to be recycled. This recaptures most of the energy that would otherwise be dissipated as heat.

In order to meet Feynman's reversible logic form requirements, computer science modules, functions, subroutine, and processes must meet all of the following requirements:

1) One or more input variables generate a single output variable.
2) A graph of the input-to-output transformation is continuous, differentiable, and single valued.
3) The module, function, subroutine, or process is reversible.

Although Feynman gates have been constructed and used for a select group of problems, putting computations (algorithms herein) into reversible logic form has been shown to be difficult. This difficulty is in part due to the fact that the modules, functions, subroutines, and processes found in computer science are not equivalent to mathematical functions and therefore are not directly applicable to conversion into reversible logic form. Another issue is the difficulty in correctly assigning the input variable values when there is more than one input variable, given only the output value. When there is only one input variable, then as long as the input-to-output relationship is strictly monotonic, the function is always reversible.

The primary analytics of an A-OALP (advanced time complexity and advanced space complexity), as with TALPs, were shown to be continuous, differentiable, single-valued; either strictly monotonic or constant; and generate a single output variable. Note that Feynman's well-behaved functions are continuous, differentiable, and single-valued. Since strictly monotonic single input variable functions are always invertible (reversible), then strictly monotonic single input variable A-OALP primary analytics are always invertible (reversible).

It should be noted that while Feynman gates can minimize energy use, there is a speed-energy tradeoff. As discussed by Feynman, achieving zero heat dissipation requires that the circuit operate at an infinitesimally slow speed. The faster the circuit operates, the more energy it consumes. In a practical sense, in order to greatly decrease energy while maintaining adequate performance requires the combined use of task-like with dynamic loop unrolling parallelization and Feynman gates as disclosed herein.

In 2001, Raussendorf and Briegel introduced the concept of one-way quantum computing, which utilizes a cluster state and a sequence of single-qubit measurements that destroy the state in order to achieve its computation. This method depends on the use of superposed plane waves. Any two-way quantum computation method can also be performed using this one-way quantum computing method.

SUMMARY OF THE INVENTION

Previously, the primary analytics of an output-affecting linear pathway (A-OALP) (advanced time complexity and advanced space complexity) were shown to be continuous, differentiable, single-valued; either strictly monotonic or constant; and generate a single output variable. The present invention teaches that the output complexity for an A-OALP, unlike for a TALP, is the relationship between a set of input variables and a single output variable. Output complexity for an A-OALP is a primary analytic like advanced time complexity and advanced space complexity. The set of input variable values and its associated output variable values derived from the execution of an A-OALP are the same values that are found using the output complexity associated with that A-OALP, meaning the output complexity is equivalent to an A-OALP. When the output complexity of an A-OALP is strictly monotonic then it is reversible, either directly or with the aid of advanced output as shown herein, and if the output complexity of an A-OALP is reversible then the associated A-OALP is also reversible and meets the requirements needed to execute on reversible logic gates. For primary analytics of an A-OALP with multiple input variables, the present invention discloses another method, advanced output, to ensure they are reversible. Since the primary analytics of A-OALPs are well-behaved, making them reversible makes them executable on Feynman gates.

In patent application publication U.S. 2024/0119109, Methods and Systems for Time-Affecting Linear Pathway (TALP) Extensions, it was shown that the output complexity analytic for a TALP is the relationship between a set of input variables and a set of output variables. This definition was carried forward and called output complexity in U.S. Pat. No. 11,861,336, Software Systems and Methods for Multiple TALP Family Enhancement and Management. The present invention teaches that output complexity for an A-OALP, unlike for a TALP, is the relationship between a set of inputs and a single output. Output complexity for an A-OALP is also continuous, differentiable, and single-valued, that is, well-behaved, and monotonic or constant, therefore, a primary analytic like advanced time complexity and advanced space complexity. When the output complexity of an A-OALP is strictly monotonic then it is reversible, either directly or with the aid of advanced output as shown herein. Output complexity represents the data transformation generated by executing the A-OALP and, thus, is equivalent to the A-OALP. This means that a reversible output complexity of an A-OALP is equivalent to a reversible A-OALP and meets the requirements needed to execute on all reversible logic gates, including Feynman, double Feynman, Toffoli, Fredkin, Peres, TSG, Sayem D-latch, and any other reversible logic gate.

The present invention teaches the automatic generation of output complexity from input/output data value pairs and the generation of A-OALPs from their associated output complexity. When the output complexity of an A-OALP with a single input variable is strictly monotonic then that A-OALP is reversible (invertible). This invention redefines an A-OALP's single output variable as a vector (called herein advanced output), containing both the standard output variable value and the associated input values, thus providing the information required to reverse the A-OALP. This means that a strictly monotonic single input variable or a multiple input variable A-OALP that generates advanced output meets the requirements to execute on reversible logic gates. The inverses of a single multiple variable input A-OALP that generates an advanced output and linked such A-OALPs that generate combined advanced outputs are created by uncombining the advanced outputs. In addition to allowing for reverse (inverse) A-OALPs, advanced output allows for a new form of compression, herein called A-OALP compression, where the advanced output can be used to regenerate a set of linked A-OALPs, not just to find the set of input variable values of each linked A-OALP. This is a form of algorithmic compression instead of data compression.

Linked A-OALPs are shown to be able to form reversible directed acyclic graphs (DAGs). The node calculations used for neural networks exhibiting gradient descent methods are shown to already be in linked A-OALP form and thus can be made to be reversible and algorithmically compressible using the current art advanced output. Entire networks can be transmitted using only advanced output vectors. These DAG networks can also be parallelized using task-like with dynamic loop-unrolling parallelization and/or the current A-OALP graph parallelism. The present invention also teaches the decomposition of an A-OALP into multiple incomplete A-OALP segments (an incomplete data transformation), which are then combined to give a complete data transformation, using the associative parallel principle, adding additional parallel capabilities to A-OALP task-like with dynamic loop-unrolling parallelization.

The present invention teaches that all A-OALP primary analytics, both strictly monotonic and constant, can be converted into plane waves and thus computed using one-way quantum computing. Neural network node calculations are also shown to meet the criteria of the superposition principle, meaning that superposition parallelization is also possible. The present invention also teaches that all A-OALP primary analytics, both strictly monotonic and constant, can be converted into plane waves and thus computed using one-way quantum computing, that is, measurement-based quantum circuits. Neural networks are then shown to be compressible and/or encryptable using advanced output vectors and trainable using A-OALP-generated input variable values, decreasing the need for large quantities of input source data. The ability to combine measurement-based quantum parallelism and A-OALP task-like with dynamic loop-unrolling parallelism is also taught, giving added parallel capabilities.

BRIEF DESCRIPTION OF THE DRAWINGS

The accompanying drawings, which are incorporated herein and form part of the specification, illustrate various embodiments of the present disclosure and, together with the description, further explain the principles of the disclosure and enable a person skilled in the pertinent art to make and use the embodiments disclosed herein. In the drawings like reference numbers indicate identical or functionally similar elements.

FIG. 13 shows the conversion of an advanced output vector first into a set of source values tables (one per input variable) and then into a set of associated output complexities (one per input variable), in accordance with embodiments of the present invention.

DETAILED DESCRIPTION

Figure 1:
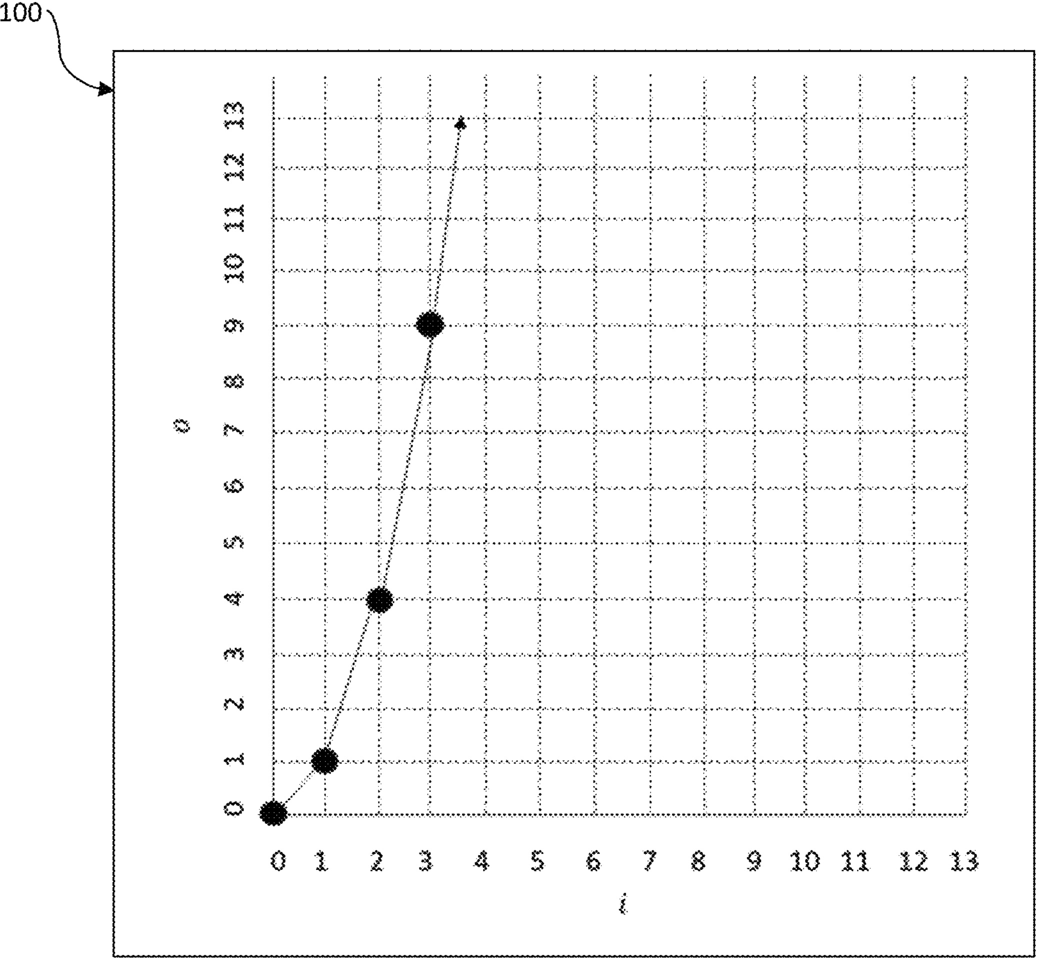
FIG. 1 shows an example graph that relates a set of input variable values to a set of output variable values, in accordance with embodiments of the present invention.

Embodiments of the present invention teach the automatic generation of output complexity from input/output data value pairs and the generation of output-affecting linear pathways (A-OALPs) from their associated output complexity. When the output complexity of an A-OALP with a single input variable is strictly monotonic then that A-OALP is reversible (invertible). This invention redefines an A-OALP's single output variable as a vector (called herein advanced output), containing both the standard output variable value and the associated input values, thus providing the information required to reverse the A-OALP. This means that a strictly monotonic single input variable or a multiple input variable A-OALP that generates advanced output meets the requirements to execute on reversible logic gates. The inverses of a single multiple variable input A-OALP that generates an advanced output and linked such A-OALPs that generate combined advanced outputs are created by uncombining the advanced outputs. In addition to allowing for reverse (inverse) A-OALPs, advanced output allows for a new form of compression, herein called A-OALP compression, where the advanced output can be used to regenerate a set of linked A-OALPs, not just to find the set of input variable values of each linked A-OALP. This is a form of algorithmic compression instead of data compression.

A-OALP primary analytics, both strictly monotonic and constant, can be converted into plane waves and thus computed using one-way quantum computing. Neural network node calculations are also shown to meet the criteria of the superposition principle, meaning that superposition parallelization is also possible. The present invention also teaches that all A-OALP primary analytics, both strictly monotonic and constant, can be converted into plane waves and thus computed using one-way quantum computing, that is, measurement-based quantum circuits. Neural networks are then shown to be compressible and/or encryptable using advanced output vectors and trainable using A-OALP-generated input variable values, decreasing the need for large quantities of input source data. The ability to combine measurement-based quantum parallelism and A-OALP task-like with dynamic loop-unrolling parallelism is also taught, giving added parallel capabilities.

All patent applications, publications, and patents, and their corresponding disclosures and details, referenced or identified herein are hereby fully incorporated herein by reference.

Various devices or computing systems can be included and adapted to process and carry out the aspects, computations, and algorithmic processing represented by the software systems and devices of the present invention may include a processor, which may include one or more microprocessors and/or one or more circuits, such as an Application Specific Integrated Circuit (ASIC), Field-Programmable Gate Arrays (FPGAs), Central Processing Units (CPUs), Graphical Processing Units (GPUs), General-Purpose Computing on Graphics Processing Units (GPGPUs), Tensor Processing Units (TPUs), Floating-Point Units (FPUs), single-core, multicore, etc. Further, the devices can include a network interface. The network interface is configured to enable communication with a communication network, other devices and systems, and servers, using a wired and/or wireless and/or quantum connection.

The devices or computing systems may include memory, such as non-transitive, which may include one or more non-volatile storage devices and/or one or more volatile storage devices (e.g., random access memory (RAM) or Qubits. In instances where the computing devices include a microprocessor, computer readable program code may be stored in a computer readable medium or memory, such as, but not limited to drive media (e.g., a hard disk or SSD), optical media (e.g., an OVO), memory devices (e.g., random access memory, flash memory, Qubits), etc. The computer program or software code can be stored on a tangible, or non-transitive, machine-readable medium or memory. In some embodiments, computer readable program code is configured such that when executed by a processor, the code causes the device to perform the steps described above and herein. In other embodiments, the device is configured to perform steps described herein without the need for code.

It will be recognized by one skilled in the art that these operations, algorithms, logic, method steps, routines, subroutines, and modules may be implemented in software, in firmware, in special purpose digital logic, and any combination thereof without deviating from the spirit and scope of the present invention as recited within the claims attached hereto.

The devices or computing devices may include an input device. The input devices are configured to receive an input from either a user (e.g., admin, user, etc.) or a hardware or software component—as disclosed herein in connection with the various user interface or automatic data inputs. Examples of an input device include a keyboard, mouse, microphone, touch screen and software enabling interaction with a touch screen, etc. The devices can also include an output device. Examples of output devices include monitors, televisions, mobile devices screens, tablet screens, speakers, remote screens, etc. The output devices can be configured to display images, media files, text, video or play audio to a user through speaker output.

Server processing systems for use or connected with the systems of the present invention, can include one or more microprocessors, and/or one or more circuits, such as an application specific integrated circuits, such as ASICs, FPGAs, etc. A network interface can be configured to enable communication with a communication network, using a wired and/or wireless connection, including communication with devices or computing devices disclosed herein.

Memory can include one or more non-volatile storage devices and/or one or more volatile storage devices (e.g., RAM). In instances where the server system includes a microprocessor, computer readable program code may be stored in a computer readable program code may be stored in a computer readable medium, such as, but not limited to drive media (e.g., a hard disk or SSD), optical media (e.g., a DVD), memory devices, etc.

Throughout the present disclosure, "core," "cores," "processing element," and "processing elements" can be interchangeable. Further, a core or processing element can comprise one or more distinct cores or processing elements.

With regards to FIG. 1 through FIG. 34, A-OALPs must generate a monotonic or constant curve. In addition, an A-OALP's output values for the single output variable must form a graph that is also continuous, differentiable, and single-valued. An A-OALP's output value is the actual transformation of the A-OALP's input variable values. This transformation can be thought of as a primary analytic of the A-OALP, like advanced time and advanced space complexity, called herein output complexity as it "predicts" the output value of the A-OALP, given some set of input values. Unlike advanced time complexity, which relates a set of input variable attribute values to processing time, or advanced space complexity, which relates a set of input variable attribute values to memory allocation, output complexity relates a set of input variable values to a set of output variable values.

Unlike for advanced time and space complexity, output complexity can be generated using two different methods. The first method uses a set of input/output value pairs analyzed to extract loops from data patterns. This is accomplished using piece-wise sequence detection rather than piece-wise curve fitting. The advantage is the ability to detect the presence of repeating activity, that is loops, which can occur for output complexity but not for advanced time or space complexity. The second method, the direct conversion of source code into output complexity, is possible because there is a direct relationship between the A-OALP's source code and the transformation of input variable values and the output variable value. Consider that the input variables that affect time do not directly change time, instead they change the number of loop iterations performed by the A-OALP. The relationship between a loop iteration and processing time must be obtained by profiling, which generates the input/output data pairs that are used with curve-fitting techniques to determine advanced time complexity. Advanced space complexity is found analogously, using the input variables that affect memory allocation and any associated loops.

The general form of output complexity when there is only input/output pair data, will, as with other A-OALP analytics, be placed in a table called the source values table.

TABLE 1

Examples A-OALP Source Value Not Indicating a Loop Source Values Table

| $i_1$ | o |
|---|---|
| 1 | 1 |
| 2 | 4 |
| 4 | 16 |
| . . . | . . . |
| x | $x^2$ |

Consider that the source value table is sorted by the input variable attribute size (smallest to largest). When using the time-affecting variable a for advanced time complexity, the smallest possible input variable attribute value where the calculation is still valid is called $a_{min}$, and the detected time given $a_{min}$ is called $t_{min}$. With dynamic loop unrolling parallelization, the input value on a single core (processing element) is called, $a_1$ and the values are spread evenly across n cores giving $$\frac{a_1}{n}$$

for each core. This gives:

Number of Cores Given Temporal Input Values $$a_n = \frac{a_1}{n} \rightarrow n = \frac{a_1}{a_n} \quad \text{Equation 1}$$

When $a_n$ is the smallest possible value whereby the calculation is still valid, it is called $a_{min}$. The maximum scaled advanced time complexity, also called advanced speedup, was given as the curve fit of the scaled input variable attribute values that affect the A-OALP's looping structures.

Advanced Speedup Given Temporal Variables $$s = T\left(\frac{a_1}{a_{min}}\right) \quad \text{Equation 2}$$

It is further shown that advanced speedup could be converted into advanced time complexity by unscaling the scaled curve fit and applying the proper units. That is:

Advanced Time Complexity from Advanced Speedup $$t \times \text{units} = T\left(\frac{a_1}{a_{min}}\right) \times t_{min} \times \text{units} \quad \text{Equation 3}$$

Even though output complexity is generated using piece-wise sequence detection rather than piece-wise curve fitting, the minimum valid input variable attribute values and the minimum output values are analogous to those for advanced time complexity. That is when $i_1$ is the input variable attribute value that affects the output calculation on a single core (processing element), $i_{min}$ the minimum valid input variable attribute value, and $o_{min}$ is the output value generated from the minimum valid input variable attribute value. With dynamic loop unrolling parallelization, the input value on a single core (processing element) is called $i_1$ and the values are spread evenly across n cores giving $$\frac{i_1}{n}$$

for each core. This gives:

Number of Cores Given Output-Affecting Input Variables $$i_n = \frac{i_1}{n} \rightarrow n = \frac{i_1}{i_n} \quad \text{Equation 4}$$

When $i_n$ is the smallest possible value whereby the calculation is still valid, it is called $i_{min}$. The scaled output complexity, also called divvyup, is generated using piece-wise sequence detection of the scaled input variable attribute values that affect the A-OALP's output values.

Divvyup Given Output Effecting Variables $$d = Y\left(\frac{i_1}{i_{min}}\right) \quad \text{Equation 5}$$

It should be noted that with the exception of direct decomposition, all of the techniques shown herein can be used as part of the A-OALP Server Hardware Controller system detailed in U.S. Pat. No. 12,411,671, Software System and Methods for Advanced Output-Affecting Linear Pathways. Decomposition into A-OALPs used in the present invention takes place in the A-OALP Extraction and Visualization portion of a system.

FIG. 1 shows a graph 100 of the associated input and output values in table 1. Here the output values are the square of the input values. This graph also shows the continuous, strictly monotonic curve over some input value range from the example source values in table 1.

It is possible to use techniques that are analogous to those used to construct the advanced time complexity and advanced space complexity, that is curve-fitting and unscaling. In the present invention, piece-wise sequence detection is combined with unscaling to generate output complexity. FIG. 1 indicates that the serial output complexity is formed from a single input variable, "i". As with time complexity derived from un-scaling speedup, output complexity is derived from un-scaling divvyup, that is:

*A-OALP*-Based Output Complexity from Divvyup $$o \times \text{units} = Y\left(\frac{i_1}{i_{min}}\right) \times o_{min} \times \text{units} \quad \text{Equation 6}$$

Where: $i_1$ = Input variable that affects the output value on one core, units = Output value units of the *A-OALP*

Table 2 shows another example of a source values table that relates a set of input variable values to a set of output variable values derived from the execution of an A-OALP or from any other data-generating source with input/output value pairs. This shows it is possible to detect when a repeated calculation (a loop) occurs for an output complexity derived only from source values table data using piece-wise sequence detection rather than piece-wise curve fitting.

TABLE 2

Example A-OALP Source Value Table Indicating a Loop

| Source Values Table | |
|---|---|
| i | o |
| 1 | o = 1 |
| 2 | o = 1 + 4 |
| 4 | o = 1 + 4 + 9 + 16 |
| . . . | . . . |
| n | $o = \sum_{x=1}^{n} x^2$ |

Since the number of calculated terms is a function of the input variable value, it varies processing time, which means that which means that like an A-OALP derived from an algorithm, an A-OALP derived from the output complexity that was itself derived from the source value table input/output value pairs can be also parallelized using task-like with dynamic loop-unrolling parallelization techniques.

Figure 1A:
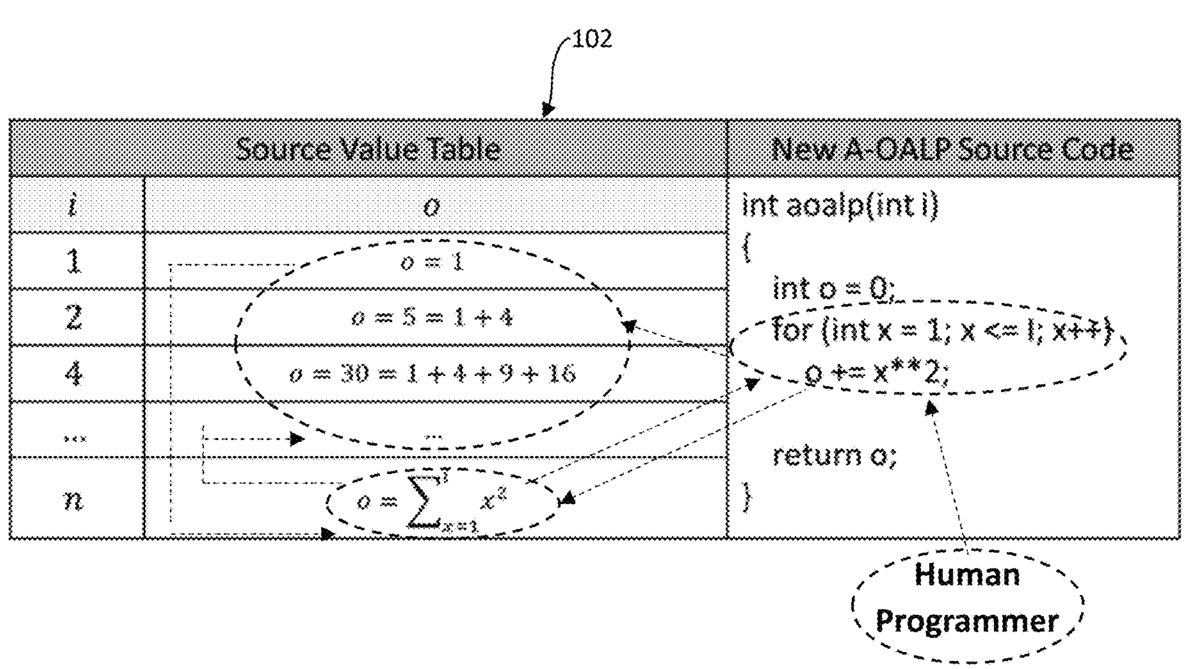
FIG. 1A shows Table 3, an example of A-OALP source value table data converted into source code, in accordance with embodiments of the present invention.

Table 3, shown as table 102 in FIG. 1A, depicts an expansion of table 2 where output complexity (row n) is shown to be generated from either extraction of source code or the input/output value pairs in the source values table. The input/output value pairs are shown to be either from the execution of the A-OALP code or from the output complexity function. The A-OALP source code is shown to be from either a human programmer or from the translation of output complexity.

Once the A-OALP source code has been generated, then the advanced time and advanced space complexity analytics can be generated as it would be for any other execution pathway. As with the advanced time and advanced space complexity, output complexity can limit the number of cores (processing elements) that can be used to execute the associated A-OALP and a given input dataset.

In order to use output complexity in a way that is analogous to advanced time and space complexity, output complexity's input variables are identified and then scaled by dividing those variable values by the smallest valid values detected while profiling the A-OALP. The input variables that affect the output variable value are given as:

Output Complexity's Input Variable $$\vec{i} = [i_{o_1}, i_{o_2}, \ldots i_{o_n}] \quad \text{Equation 7}$$

Where $i_{o_n} = n^{th}$ input variable attribute that affects the output value

Equation 8 shows that for the multiple variable case, the variable that controls the maximum number of times that the values of each input variable can divided is the given by:

$$\min\left(\frac{i_{o_1}}{n}, \frac{i_{o_2}}{n}, \ldots, \frac{i_{o_n}}{n}\right) = \frac{i_{o_m}}{n}.$$

Controlling Input Variable $$\vec{\iota_n} \to \frac{\vec{\iota}}{n} = \left[\frac{i_{o_1}}{n}, \frac{i_{o_2}}{n}, \ldots, \frac{i_{o_n}}{n}\right] \to \min\left(\frac{i_{o_1}}{n}, \frac{i_{o_2}}{n}, \ldots, \frac{i_{o_n}}{n}\right) = \frac{i_{o_m}}{n} \quad \text{Equation 8}$$

Where $n$ = Number of times that the input variable values are divided, $i_{o_m}$=Minimum selected input variable that controls number of times the input variable values can be divided Therefore:

Output Complexity Input Variable

Values and Number of Cores (Processing Elements)

$$i_n = \frac{\to \vec{\iota_1}}{n} \to i_n = \frac{i_{o_m}}{n} \to n = \frac{i_{o_m}}{i_n} \quad \text{Equation 9}$$

As with advanced time and advanced space complexity, if n=1 the output complexity does not divide up the number of calculations. When n>1 then the output complexity reflects the number of calculations performed when the data is evenly divided and spread among multiple cores (processing elements). The value of $i_{o_m}$ divided by the smallest possible valid value of $i_{o_m}$, $i_{min}$, gives the maximum possible number of cores, $maxCores_{output}$. Since the number of data divisions is equivalent to the number of cores (processing elements) we get the following:

Maximum Number of Cores Possible Given Output Complexity $$i_{min} = \frac{i_{o_m}}{maxCores_{output}} \to maxCores_{output} = \frac{i_{o_m}}{i_{min}} \quad \text{Equation 10}$$

Where: $maxCores_{output}$ = Maximum number of cores, $i_{min}$ = Minimum possible valid input value for $i_{o_m}$ The maximum number of usable cores (processing elements) given output complexity can now be compared with the maximum number of usable cores given advanced time complexity and the maximum number of usable cores given advanced space complexity. There are two additional optional limitations to be considered for a given input dataset: the hard limit and the soft limit. The hard limit, $P_{max_{hard}}$, is determined by the number of unallocated cores in the current hardware system whereas the soft limit, $P_{max_{soft}}$, is a limit given by the system user. The minimum of these limits for a given input dataset determines the number of cores that are used for that A-OALP executing the current input dataset on the current hardware system, $P_{max}$. Note that if the optional limitations do not exist, then they are not included in the $P_{max}$ calculation.

Selecting Maximum Number of Usable Cores Given Time,

Space, Output, Hard, and Soft Limits $$P_{max} = \min\left(maxCores_{time}, maxCores_{space}, maxCores_{output}, P_{max_{hard}}, P_{max_{soft}}\right) \quad \text{Equation 11}$$

Each of the primary analytics (output complexity, advanced time complexity, advanced space complexity) generated for an A-OALP must itself form a curve that is either monotonic or constant and is also continuous, differentiable, and single-valued. Constructing any of an A-OALP's primary analytics requires the following conditions on A-OALP execution:

1. An algorithm has been decomposed into a set of execution pathways that consists of "if", "case", "ternary," or any other non-loop control conditional statements used to traverse the execution pathway along with its "assignment," and "loop" statements.
2. Each execution pathway has all of its non-loop control conditions that are not part of a temporal loop removed, decreasing the total number of source lines of code.
3. Each execution pathway has one and only one output variable and is called a single output execution pathway. An A-OALP with zero output variables cannot have a primary analytic. Having more than one output variable creates a set of A-OALPs and thus a set of primary analytics, one A-OALP per output variable, as long as all other conditions hold.
4. If a single output execution pathway has at least one input variable, i, used to calculate its output variable, that relationship is called output complexity, $\gamma(i_{o_1}, i_{o_2}, \ldots, i_{o_n})$ and is equivalent to an A-OALP as long as all other conditions are met. If there are no input variables used to calculate the output values, then the single output execution pathway is not an output complexity and therefore not equivalent to an A-OALP.
5. For each single output execution pathway, there is at least one advanced time complexity, $T(i_{t_1}, i_{t_2}, \ldots, i_{t_n})$, one advanced space complexity, $\mathcal{S}(i_{m_1}, i_{m_2}, \ldots, i_{m_p})$, and one output complexity, $\gamma(i_{o_1}, i_{o_2}, \ldots, i_{o_n})$, each of which could be constant values. If any of these three complexities are invalid, then none of the complexities is valid for that A-OALP.

The above set of five conditions on A-OALP execution ensures that all primary analytics for an A-OALP, $T(i_{t_1}, i_{t_2}, \ldots, i_{t_n})$, $\mathcal{S}(i_{m_1}, i_{m_2}, \ldots, i_{m_p})$, and $\gamma(i_{o_1}, i_{o_2}, \ldots i_{o_n})$, are well-behaved in the Feynman sense.

Figure 2:
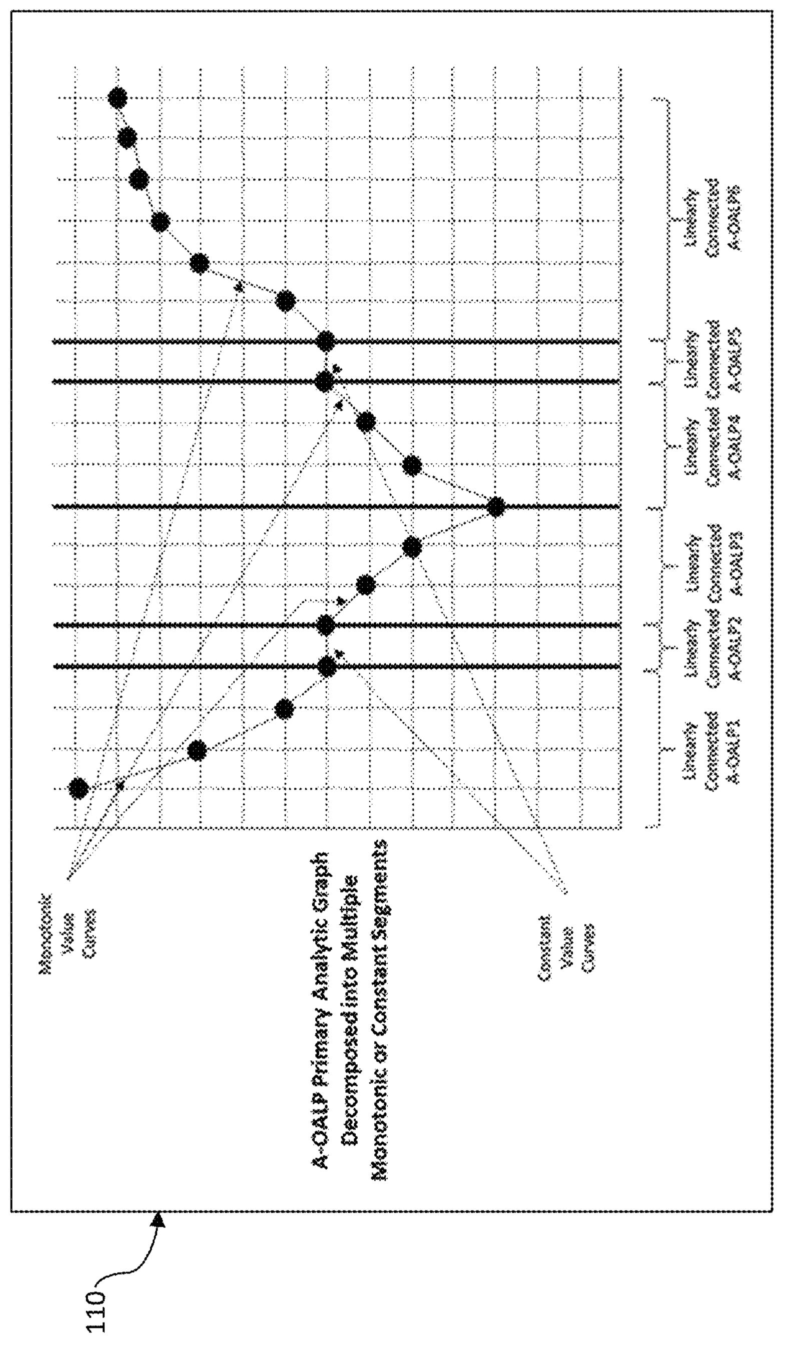
FIG. 2 shows an example of an output curve that is non-monotonic, decomposed into a set of curves, some of which are strictly monotonic and others constant-value curves, used to define a set of A-OALPs, in accordance with embodiments of the present invention.

FIG. 2 shows a well-behaved graph 110 defining more than one output complexity value range and thus more than one A-OALP. Note that $\gamma(i_{o_1}, i_{o_2}, \ldots, i_{o_n})$ is defined to be the output of an A-OALP given a set of input values: $i_{o_1}, i_{o_2}, \ldots, i_{o_n}$. Also note that even though monotonicity is not required for a well-behaved function, it is required for either the accurate piece-wise curve-fitting or the piece-wise sequence detection methods used in the construction of the primary analytics.

Notice that even though the graph is well behaved, the monotonic or constant requirement means that it requires six output complexity curve segments, each defining a separate output complexity and thus a separate A-OALP, in order to define the full graph.

Figure 3:
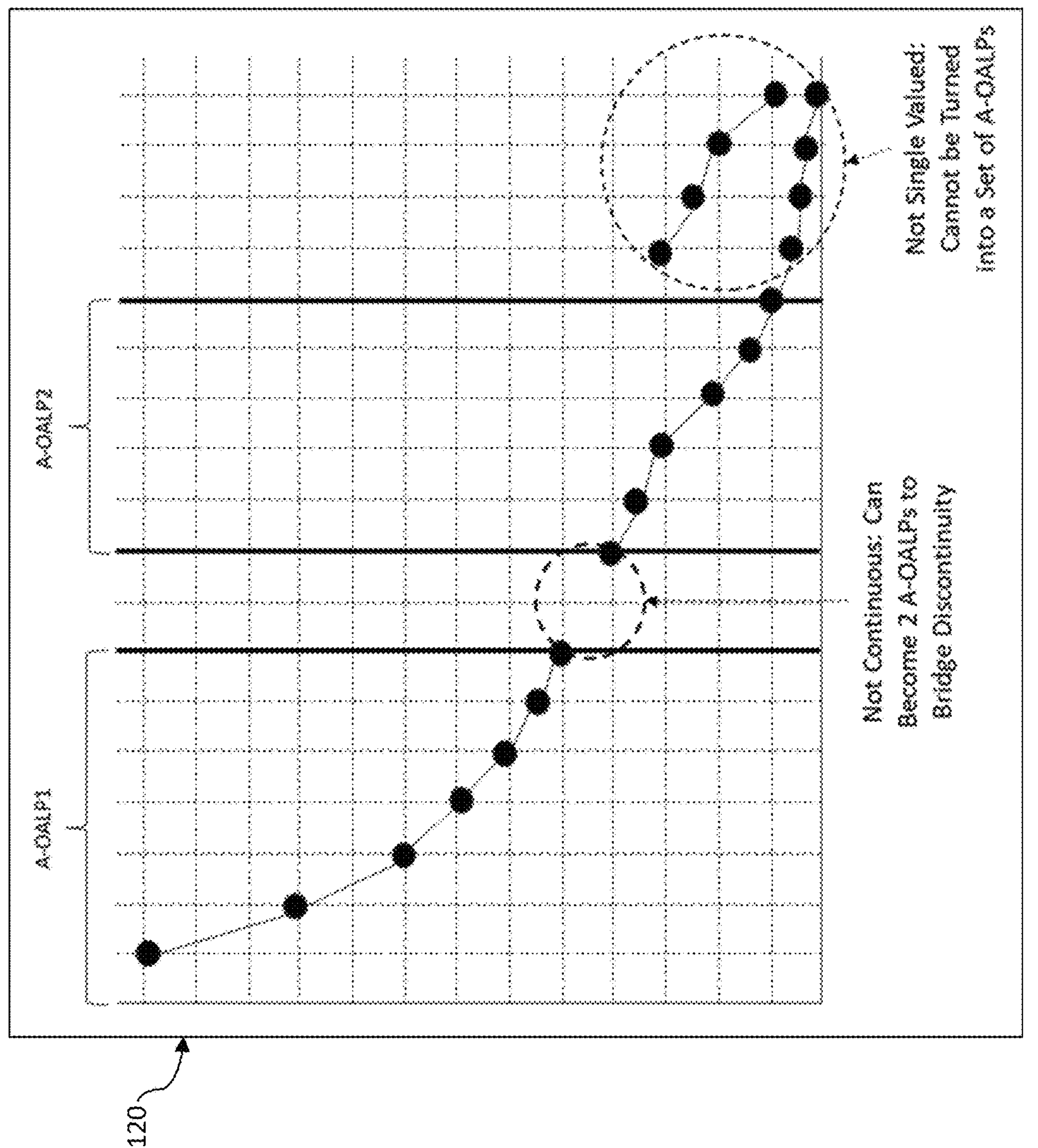
FIG. 3 shows an example of a non-continuous, non-single-valued curve decomposed into two monotonic output curves used to define two A-OALPs, in accordance with embodiments of the present invention.

FIG. 3 shows a graph 120 that is not well behaved since it is not continuous, and parts of the graph are not single valued. Highlighted is the fact that discontinuity can be overcome by defining additional A-OALPs. This is the case for the graph segment generated using input values one through seven and the graph segment generated using input values nine through fourteen. Notice that there is no graph segment defined for input values seven through nine. The ability to segment a graph into multiple well-formed graphs expands the types of functions that can be transformed into A-OALPs. However, not being single valued, as shown for the graph segment from the input variable values fifteen through eighteen cannot be overcome.

Figure 4:
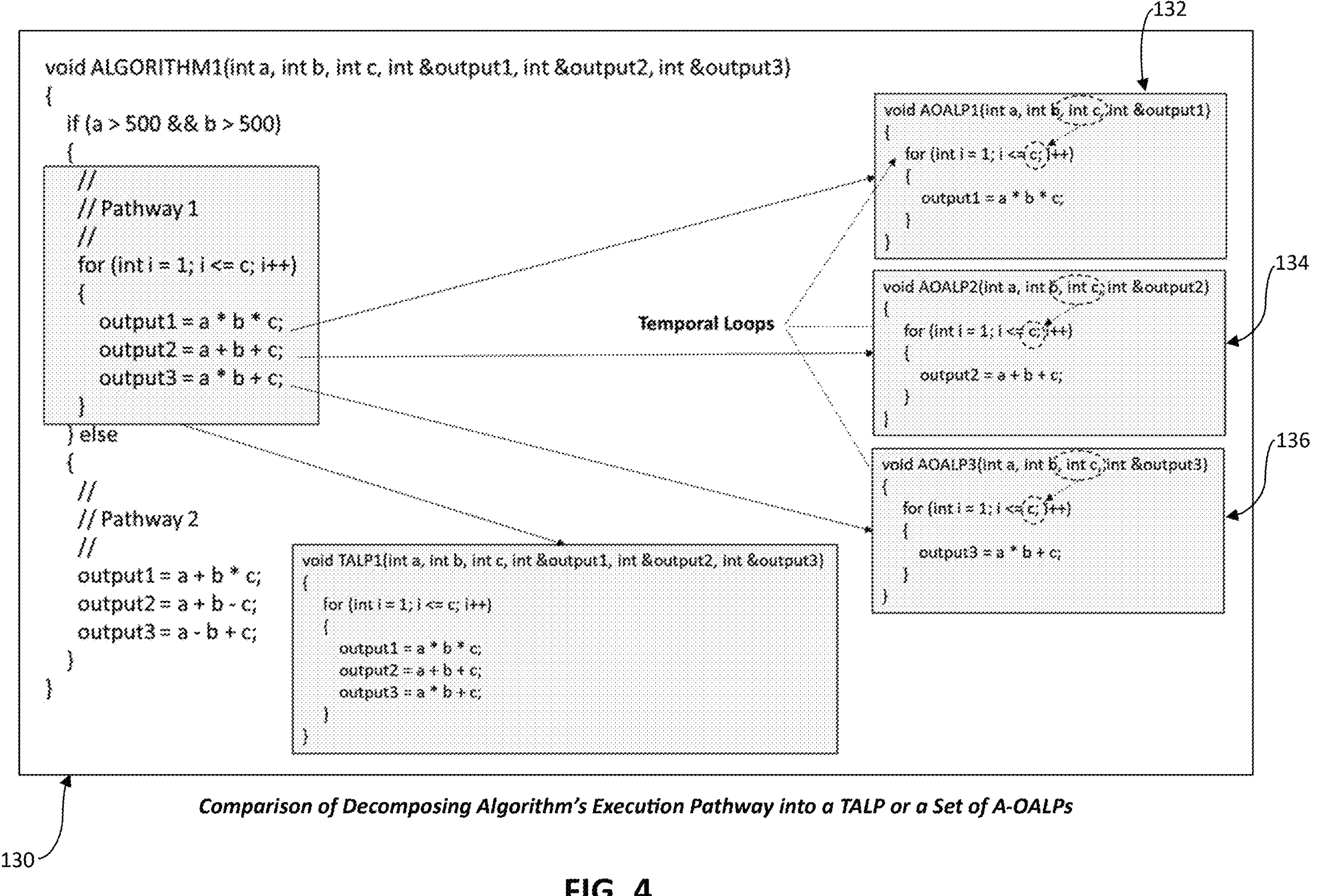
FIG. 4 shows a comparison between an algorithm's execution pathway decomposed into either a single TALP or a set of A-OALPs to be used to derive output complexity through examination of the code, in accordance with embodiments of the present invention.

FIG. 4 shows an algorithm depiction 130 written in the 'C' programming language, highlighting its two embedded pathways and three embedded A-OALPs on the first pathway. The algorithm has three input variables "a," "b," and "c" and three output variables (132, 134, 136), "output1," "output2," and "output3." The output values are transferred out of the algorithm using pass-by-reference. Even though pass-by-reference is used, the outputs are not both input and output because they are only used as dependent variables in the A-OALPs. Taken as a whole, pathway 1 is shown to be represented as a TALP, but when pathway 1 is decomposed into its constituent output variables, it is shown to be represented as a set of three A-OALPs. Generating an inverse for the TALP is not obvious while generating inverses for the A-OALPs is obvious.

The A-OALP selection table contains all of the conditional and value ranges needed to select an A-OALP. A-OALP systems demonstrate automatic code reduction via the removal of codes not used to calculate the A-OALP's output variable value. Herein, the non-loop control conditions used to define the A-OALPs are also removed because they are not needed to select a correct pathway or an A-OALP within that pathway. If an A-OALP contains a looping structure whose loop control conditions are associated with an input variable, then that loop is considered a variable time loop. As also discussed in A-OALP systems, changes in the loop-associated time-affecting variables cause a variation in the number of loop iterations, thus the processing time of the A-OALP, and form the basis of the A-OALP dynamic loop-unrolling method of parallelization. In addition to parallelization, variable time loops were shown as important in aligning the processing times of one or more A-OALPs to avoid race conditions.

Figure 5:
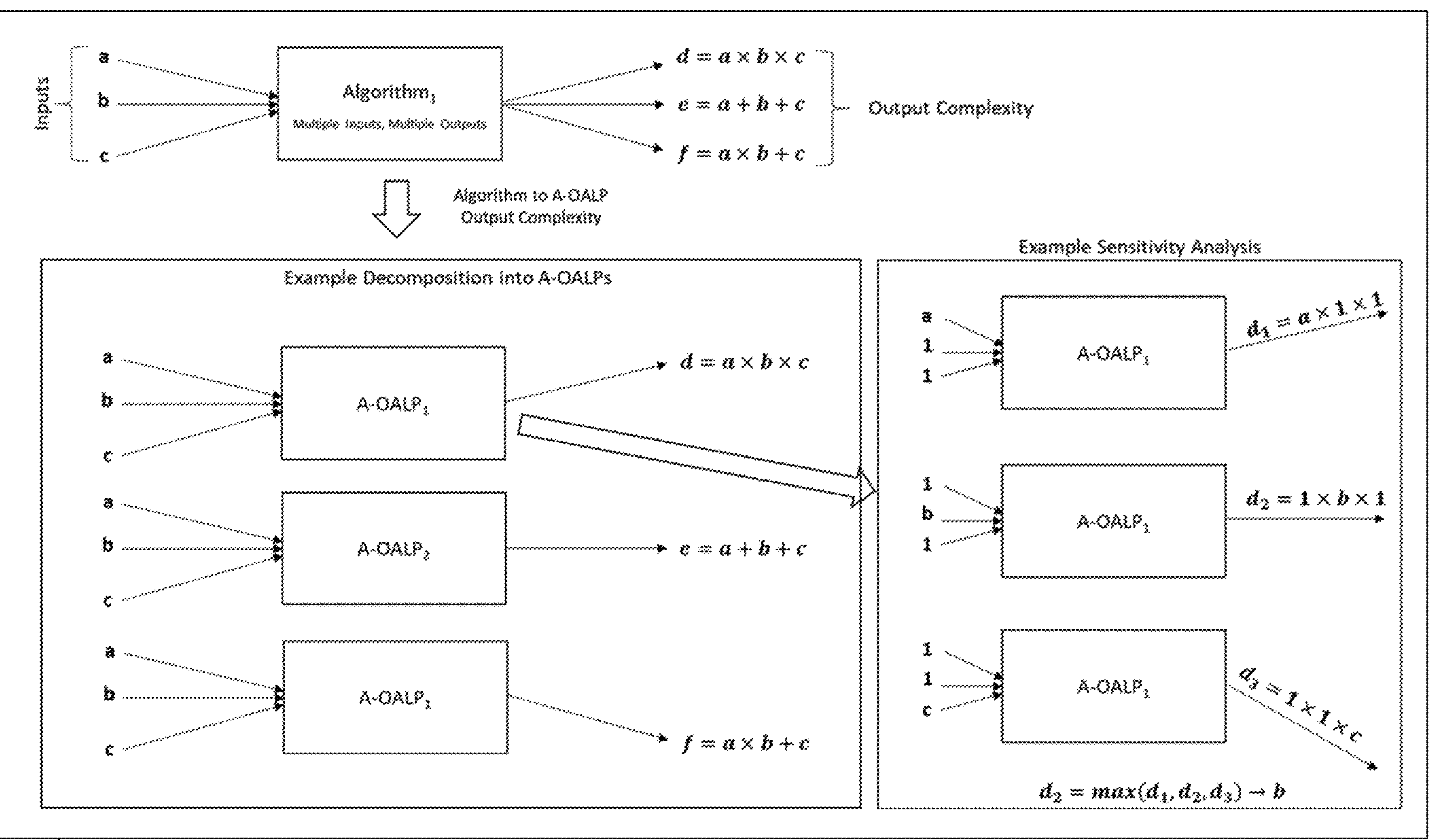
FIG. 5 is an example of a diagram showing the decomposition of an algorithm into a set of A-OALPs and their associated output complexities, in accordance with embodiments of the present invention.

FIG. 5 is a diagrammatic view 140 of the decomposition of an algorithm into three A-OALPs. This diagram defines the new A-OALP analytic called output complexity, which consists of the input-to-output transformation used to generate the output variable values. As can be seen, the output value of each A-OALP is equivalent to the output value generated by the output complexity. In addition to showing output complexity, this figure shows that the sensitivity of an A-OALP to its various input variables can be determined by executing the A-OALP and varying a single input variable while holding the values of other, associated, input variable values constant.

Figure 6:
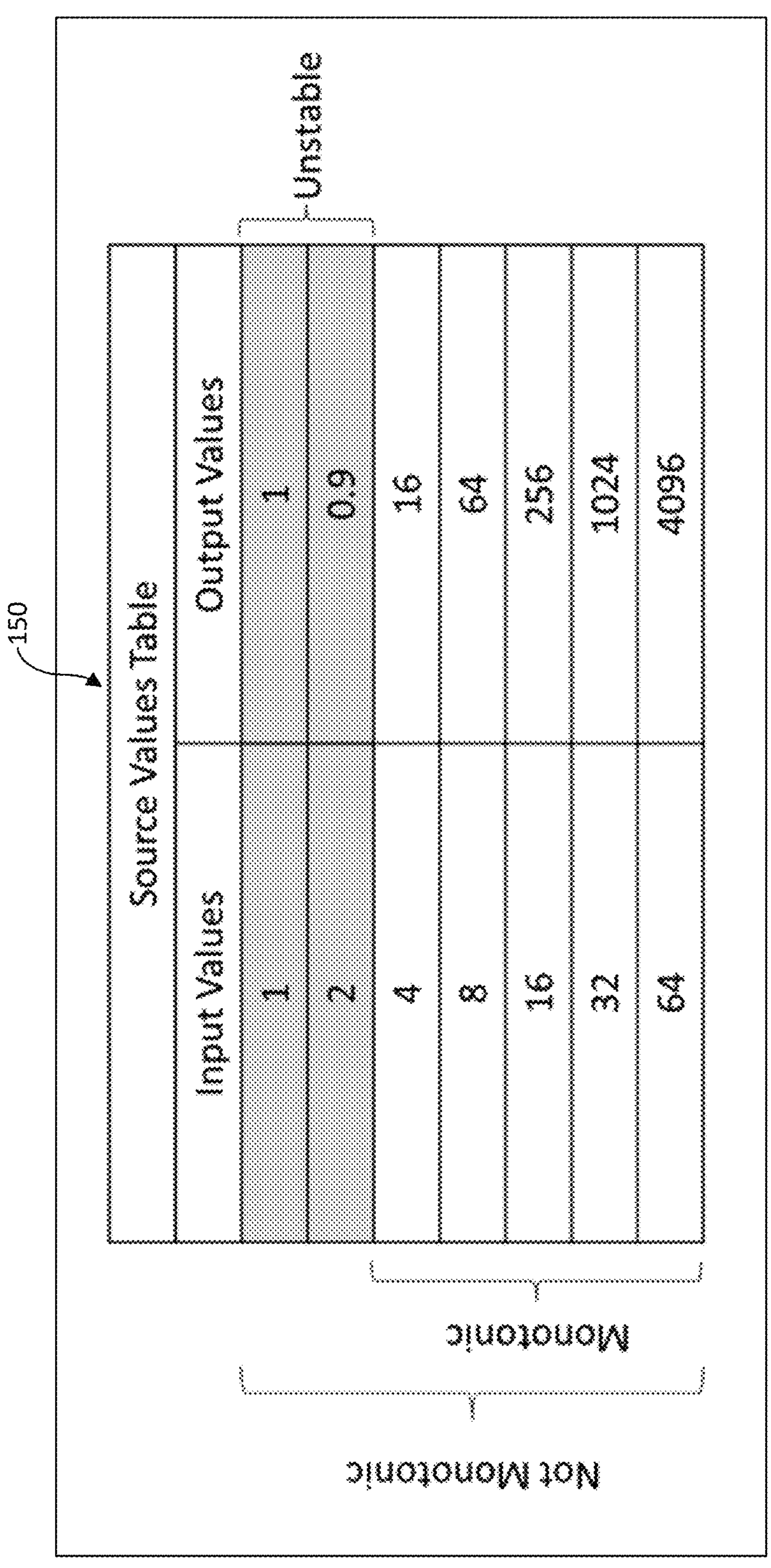
FIG. 6 shows an example of a set of paired input/output values, highlighting monotonic, that is stable regions, that can be used for sequence detection in order to generate an A-OALP output complexity, in accordance with embodiments of the present invention.

FIG. 6 shows a source values table 150 containing multiple values for variables and their computed output values. Although the values of this table could be for anything, in this example the input/output pairs represent time. As the input values of the input variable that affects time increase, the number of looping iterations also increases and thus processing time increases in a properly functioning system. Processing time that decreases with an increase in input variable values indicates an unknown interference in processing time and is considered unstable and therefore unpredictable. Accurate time prediction can only occur for stable processing time. The smallest stable processing time shown in this figure occurs when the input variable value that affects time equals four, giving a processing time of sixteen. In contrast, the absolute minimum processing time for the A-OALP occurs when the input variable value that affects time equals one. This concept of using only stable values is consistent for all of the A-OALP analytics.

Figure 7:
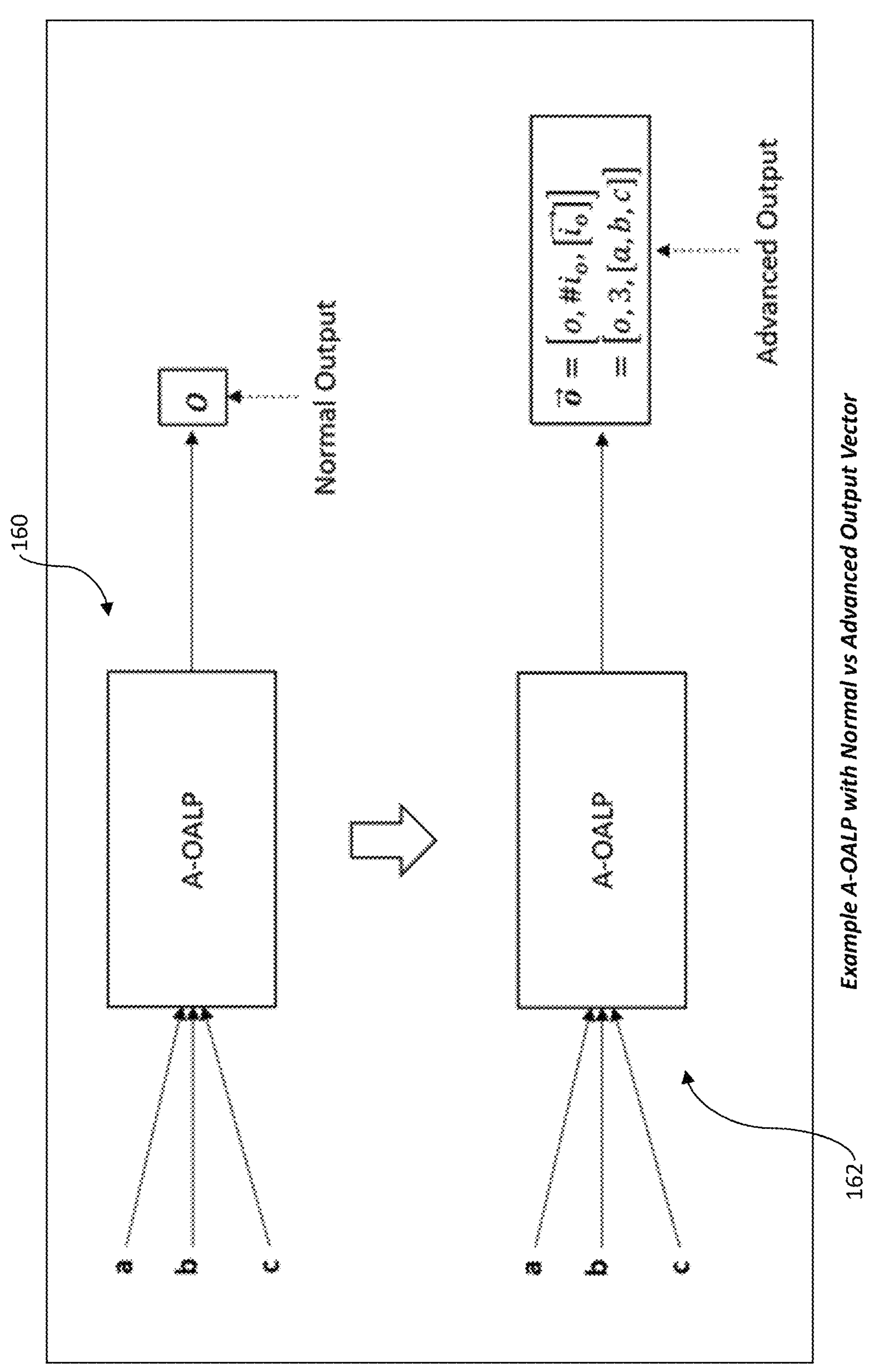
FIG. 7 shows two diagrams, the first of which is an example of an A-OALP generating a normal output and the second, the same A-OALP generating an advanced output vector, in accordance with embodiments of the present invention.

FIG. 7 shows two diagrams 160, 162, with the first diagram 160 indicating the transformation of a set of input variables (a, b, c) into a single output variable value (o) using an A-OALP. The second diagram 162 shows that same A-OALP generating an advanced output (a vector) rather than the normal output and represents the simplest type of advanced output vector used to store the input variable values along with the output. Note that all vectors discussed in this document are software vectors, that is, lists of variables, arrays, matrices, or structures. Generating a normal output, as shown in the first diagram, is analogous to the outputs shown in legacy computer science methods, and represents the transformation of input to output, that, in most cases, is not reversible. The lack of reversibility is shown by examination of the multiple input values in the table below, where input information is lost even for the simplest multiple input variable data transformations:

TABLE 3

| Example Input Information Loss<br>0 = a + b + c | | | |
|---|---|---|---|
| a | b | c | o |
| 1 | 2 | 3 | 6 |
| 1 | 3 | 2 | |
| 2 | 1 | 3 | |
| 2 | 3 | 1 | |
| 3 | 1 | 2 | |
| 3 | 2 | 1 | |

Table 4 shows that multiple input values for the input variables a, b, c could be used to generate the same output value. This means that the function is not reversible without the additional information shown in the second diagram depicting advanced output. Since a vector can be considered a variable then it is possible to transform the simple output variable "o" into a vector "$\vec{o}$" containing the expected output variable value, a count of the associated input variable values, and a vector containing the original input variable values. This provides the information needed to reverse the A-OALP. This output vector is called herein either advanced output or the advanced output vector as it allows for the reversal of any well-behaved (continuous, differentiable, and single valued) function, including algorithmic functions like A-OALPs, regardless of the number of input variables and regardless of the actual data transformation used. Changing the A-OALP's standard output into advanced output form allows an A-OALP to always be invertible, that is, bijective. Note that the input variables of the advanced output vector can themselves be input vectors containing all of the input values of some proceeding A-OALP.

The advanced output vector terms are shown in the table below.

TABLE 4

| Advanced Output Vector Terms<br>Advanced Output Terms | |
|---|---|
| Symbol | Meaning |
| $\vec{o}$ | Advanced Output Vector |
| o | Normal Output Variable (Scaler, Matrix, Array, Structure) |
| $\#i_o$ | Number of Input Variables that Affect the Output Value |
| $\vec{i_o}$ | A Vector Containing the List of Input Variable Values |

Figure 8:
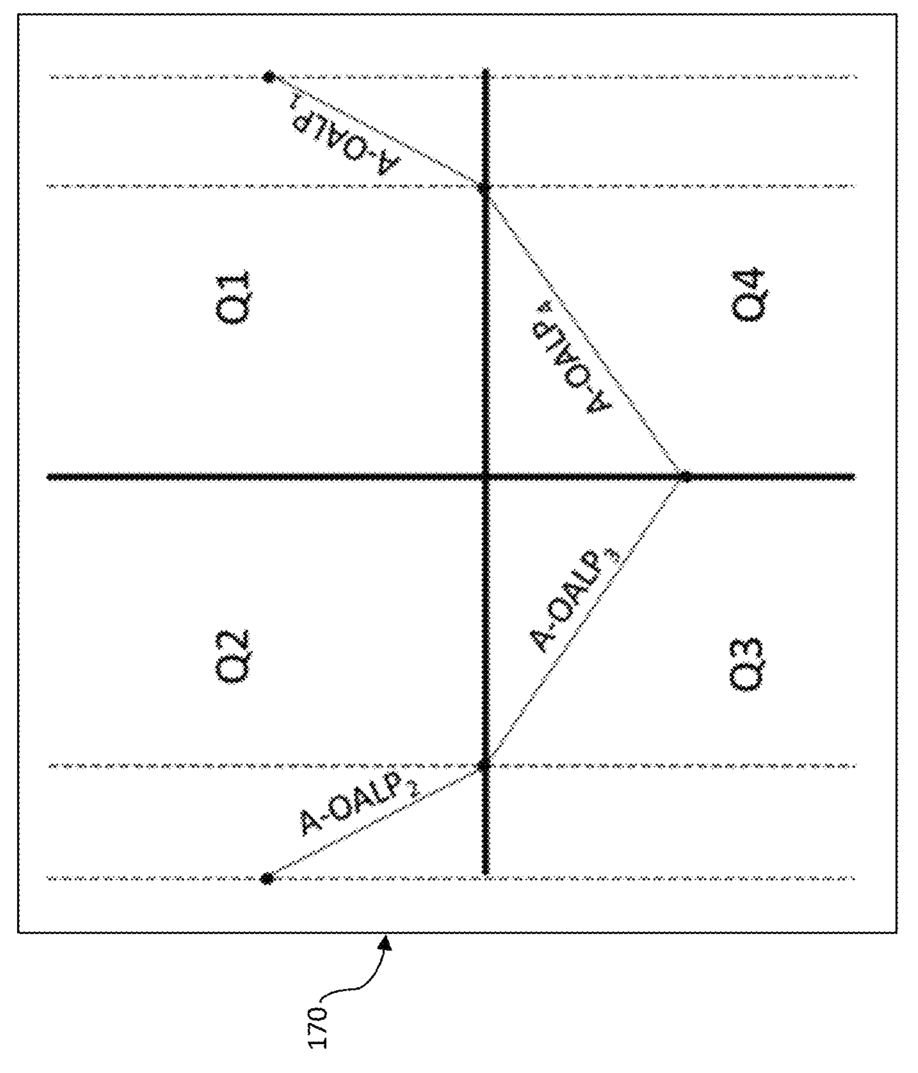
FIG. 8 shows a curve of an A-OALP's output variable value ranges that span all four graph quadrants and are thus decomposed into multiple A-OALPs, one per quadrant, in accordance with embodiments of the present invention.

FIG. 8 shows a single curve graph 170 that spans all four Cartesian graph quadrants. The advanced time complexity, advanced space complexity, and output complexity analytics can all have monotonic values that either ascend or descend. A-OALP advanced time complexity is given by:

*A-OALP* Multi-Variable Advanced Time Complexity $$t \times \text{units} = T\left(\frac{\vec{a_1}}{a_{min}}\right) \times t_{min} \times \text{units} \qquad \text{Equation 12}$$

Where: $\vec{a_1}$ = Vector containing the input variable attributes that affect time on one processing element (core), $a_{min}$ = Minimum valid value of $\vec{a_1}$, $t_{min}$ = Minimum valid processing time for $\vec{a_1}$, units = Time units (ms, seconds, minutes, etc.)

Equation 12 represents the ascending value of advanced time complexity and can be denoted as:

Ascending *A-OALP* Advanced Time Complexity $$t_{ascending} \times \text{units} = T\left(\frac{\vec{a_1}}{a_{min}}\right) \times t_{min} \times \text{units} \qquad \text{Equation 13}$$

Descending advanced time complexity is given as:

Descending A-OALP Advanced Time Complexity $$t_{descending} \times \text{units} = \frac{T(a_{min})}{T\left(\frac{\vec{a_1}}{a_{min}}\right)} \times t_{min} \times \text{units} \qquad \text{Equation 14}$$

As can be seen by the equations, ascending and descending advanced time complexity are related.

The descending version of an A-OALP's advanced space complexity is analogous and given as:

Descending A-OALP Advanced Space Complexity $$\mathcal{Z}_{descending} \times \text{units} = \frac{\mathcal{Z}(m_{min})}{\mathcal{Z}\left(\frac{\vec{m_1}}{m_{min}}\right)} \times \mathcal{Z}_{min} \times \text{units} \qquad \text{Equation 15}$$

Where: $\vec{m_1}$ = Vector containing the input variables that affect memory allocation on one processing element (core), $m_{min}$ = Minimum valid value for $\vec{m_1}$, $\mathcal{Z}_{min}$ = Minimum value memory size for $\vec{\iota_1}$, units = Memory units (bits, bytes, kilobytes, megabytes, etc.)

It should be noted that both an A-OALP's advanced time complexity and advanced space complexity exist only in the first Cartesian graph quadrant. Below are the analogous equations for output complexity. Examining the equations highlights a special feature of output complexity, the fact that the basic transformation can be generated in the first quadrant and then manipulated such that their activity in response to being in other quadrants can be discerned.

First Quadrant Ascending A-OALP Output Complexity (Positive Input and Positive Output Values)

$$o_{ascending} \times \text{units} = \Upsilon\left(\frac{\vec{\iota_1}}{i_{min}}\right) \times o_{min} \times \text{units} \qquad \text{Equation 16}$$

Where: $\vec{\iota_1}$ = Vector containing the input variables that affect the output variable, processed using one processing element (core), $i_{min}$ = Minimum valid value for $\vec{\iota_1}$, $o_{min}$ = Minimum value output data value for $\vec{\iota_1}$, units = Arbitrary user-defined data units First Quadrant Descending Output Complexity (Inverted Positive Input Values, Positive Output Value)

$$o_{descending} \times \text{units} = \frac{\Upsilon(i_{min})}{\Upsilon\left(\frac{\vec{\iota_1}}{i_{min}}\right)} \times o_{min} \times \text{units} \qquad \text{Equation 17}$$

Advanced output complexity can exist in any of the four Cartesian graph quadrants. Similar to FIG. 2, which shows an A-OALP output complexity curve decomposed into multiple A-OALPs, if an A-OALP output complexity curve exists in more than one Cartesian graph quadrant, then the curve in each quadrant represents a separate A-OALP. Each quadrant changes the prediction equations as follows:

Second Quadrant Ascending A-OALP Output Complexity (Negative Input, Positive Output Value)

$$o_{descending} \times \text{units} = \Upsilon\left(\frac{|-\vec{\iota_1}|}{i_{min}}\right) \times o_{min} \times \text{units} \qquad \text{Equation 18}$$

It should be noted that the maximum input variable attribute value, $i_{max}$, determined by profiling the A-OALP, is used in the second, third, and fourth quadrant descending A-OALP output complexity prediction equation.

Second Quadrant Descending A-OALP Output Complexity (Inverted Negative Input, Positive Output Value)

$$o_{descending} \times \text{units} = \frac{\Upsilon(i_{max})}{\Upsilon\left(\frac{|-\vec{\iota_1}|}{i_{min}}\right)} \times o_{min} \times \text{units} \qquad \text{Equation 19}$$

Third Quadrant Ascending A-OALP Output Complexity (Negative Input and Output Value)

$$-o_{ascending} \times \text{units} = -\Upsilon\left(\frac{|-\vec{\iota_1}|}{i_{min}}\right) \times o_{min} \times \text{units} \qquad \text{Equation 20}$$

Third Quadrant Descending A-OALP Output Complexity (Inverted Negative Input, Negative Output Value)

$$-o_{descending} \times \text{units} = \frac{\Upsilon(i_{max})}{\Upsilon\left(\frac{|-\vec{\iota_1}|}{i_{min}}\right)} \times o_{min} \times \text{units} \qquad \text{Equation 21}$$

Fourth Quadrant Ascending A-OALP Output Complexity (Positive Input Value, Negative Output Value)

-continued $$-o_{ascending}\times \text{units} = -\Upsilon\left(\frac{\vec{i_1}}{i_{min}}\right)\times o_{min}\times \text{units} \quad \text{Equation 22}$$

Fourth Quadrant Descending A−OALP Output Complexity (Inverted Positive Input Value, Negative Output Value)

$$-o_{descending}\times \text{units} = \frac{\Upsilon(i_{max})}{\Upsilon\left(\frac{\vec{i_1}}{i_{min}}\right)}\times o_{min}\times \text{units} \quad \text{Equation 23}$$

Figure 9:
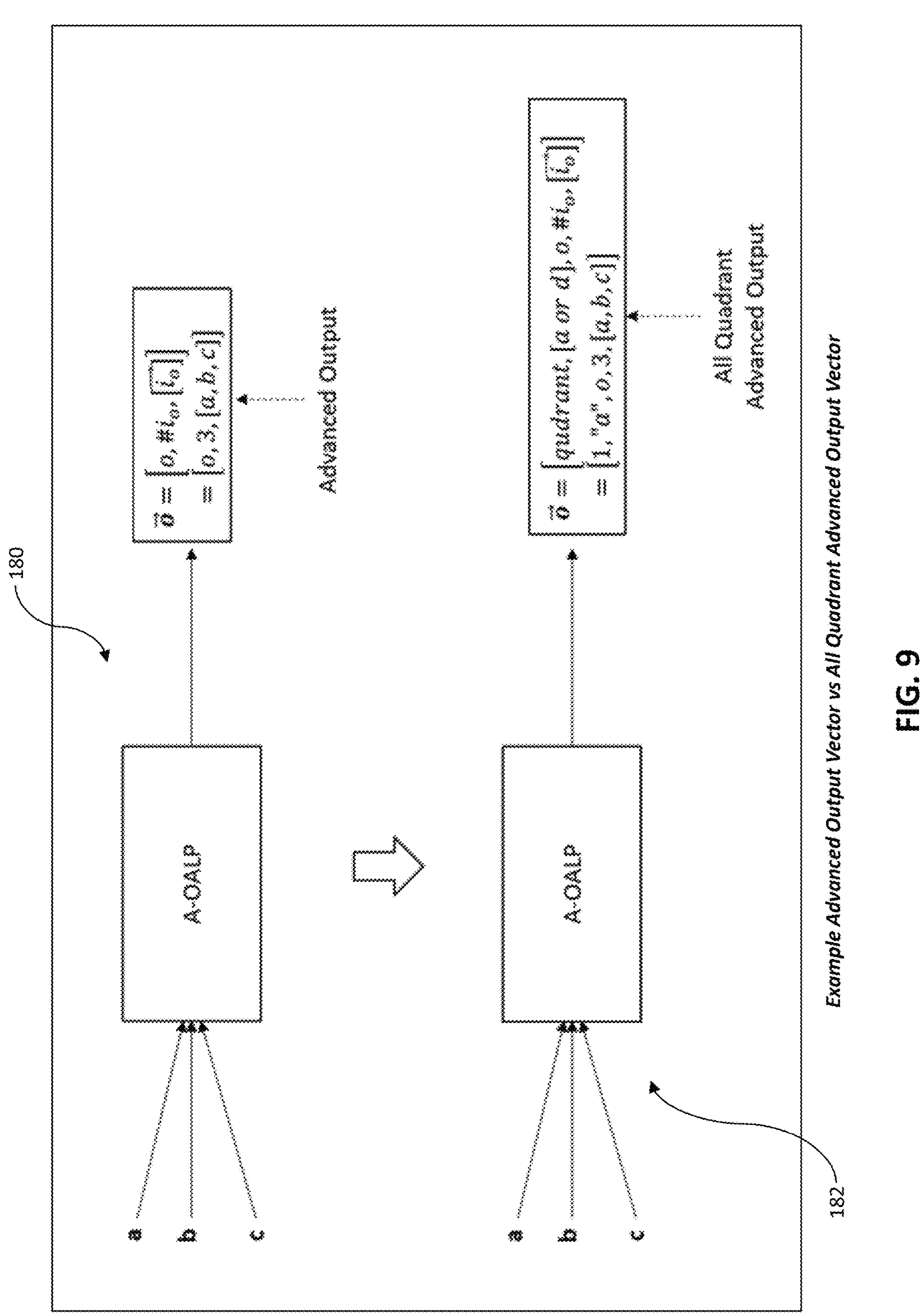
FIG. 9 shows two diagrams, the first of which is an example of an A-OALP generating an advanced output vector and the second, an example of an A-OALP generating the all-quadrant version of the advanced output vector, in accordance with embodiments of the present invention.

FIG. 9 shows two diagrams 180, 182: the first diagram 180 is the previously defined advanced output vector and the second diagram 182 is the all-quadrant advanced output vector. The all-quadrant advanced output vector extends the predictive capability of the advanced output vector to include graphs that occur in any of the four traditional Cartesian quadrants, not just the first quadrant. This is required because the output complexity value can be generated in any Cartesian quadrant. By identifying both the quadrant and whether the monotonic values are ascending ("a") or descending ("d") allows for the proper prediction function to be automatically used correctly. Note that the components of the advanced output vector consist of the output value, input size, and a list of the input values, and the components of the all-quadrant advanced output vector consist of the quadrant, ascending or descending indicator, output value, input size, and a list of the input values. The all-quadrant advanced output terms are:

TABLE 5

| Symbol | All Quadrant Advanced Output Terms<br>Meaning |
|---|---|
| $\vec{o}$ | Advanced Output Vector |
| quadrant | Cartesian Coordinate Two-Dimensional Graph Quadrant Identifier |
| "a" or "d" | Ascending or Descending Graph Identifier |
| o | Normal Output Variable (Scaler, Matrix, Array, Structure) |
| $\#i_o$ | Number of Input Variables that Affect the Output Value |
| | A Vector Containing the List of Input Variable Values |

Analogously, it is possible to extend the concept of quadrants to include both imaginary and complex numbers.

Figure 10:
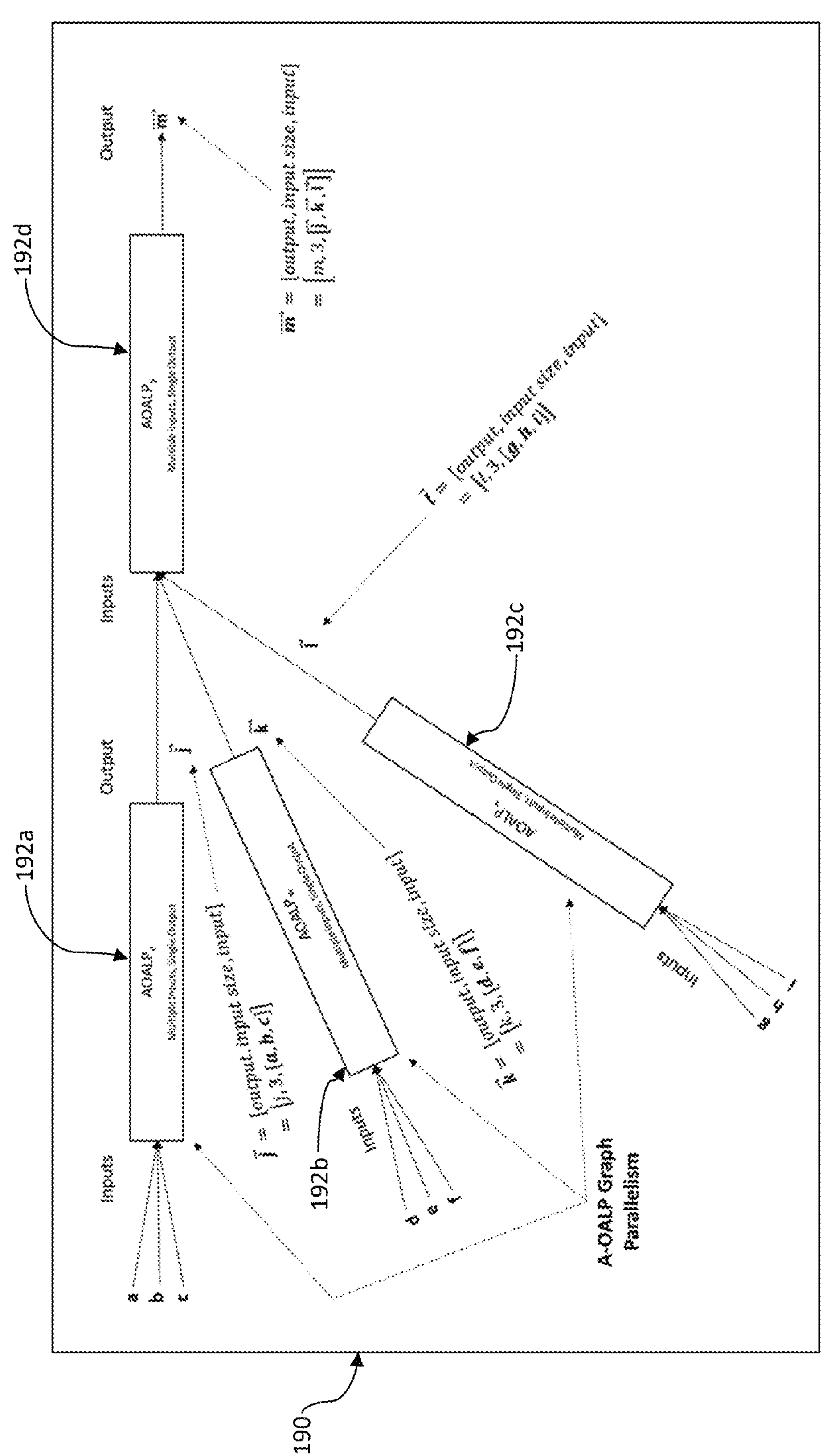
FIG. 10 is a diagram showing an example of linked A-OALPs connected via hierarchically combined advanced output vectors, in accordance with embodiments of the present invention.

FIG. 10 shows an example diagram 190 of linked A-OALPs 192*a*, 192*b*, 192*c*, 192*d* connected via hierarchically combined advanced outputs. This diagram demonstrates that the output values of multiple preceding A-OALPs can be used as the input values of another A-OALP. Consider that the output of the one or more directly preceding A-OALPs could be an advanced output, shown as $\vec{j}$, $\vec{k}$, and $\vec{l}$. The expected output variable values are used as input values for a linked A-OALP's data transformation, shown as $AOALP_y$ 192*d*. These input values, which are the advanced output vectors of the preceding linked A-OALPs, are saved in the input component of the advanced output of $AOALP_y$ as advanced output vectors.

Example Hierarchically Defined Advanced Outputs $$\text{Since: } \vec{J} = [j, 3[a, b, c]], \quad \text{Equation 24}$$

$$\vec{k} = [k, 3, [d, e, f]], \vec{l} = [l, 3, [g, h, i]]$$

$$\text{Then } \vec{m} = \left[m, 3, \left[\vec{J}, \vec{k}, \vec{l}\right]\right] =$$

$$[m, 3, [[a, b, c], [d, e, f], [g, h, i]]]$$

This hierarchical definition of advanced outputs means that regardless of the number of A-OALPs linked or the complexity of those links, it is possible to accurately trace the input values of each A-OALP in a set of linked A-OALPs.

Consider that $AOALP_v$, $AOALP_w$, and $AOALP_x$ 192*a*, 192*b*, 192*c* all generate values that are used for the inputs of $AOALP_y$ 192*d*. Since $AOALP_y$ 192*d* cannot begin processing until all of its inputs have been received, the most efficient way to for this to occur is if $AOALP_v$, $AOALP_w$, and $AOALP_x$ are executed in parallel. This represents a new form of parallelism, one that is linked to the directed acyclic graph position of the A-OALPs rather than to either the number of loop iterations (dynamic loop-unrolling parallelism) or the number of output variables (task-like parallelism). This parallelism is called A-OALP graph parallelism.

Figure 11:
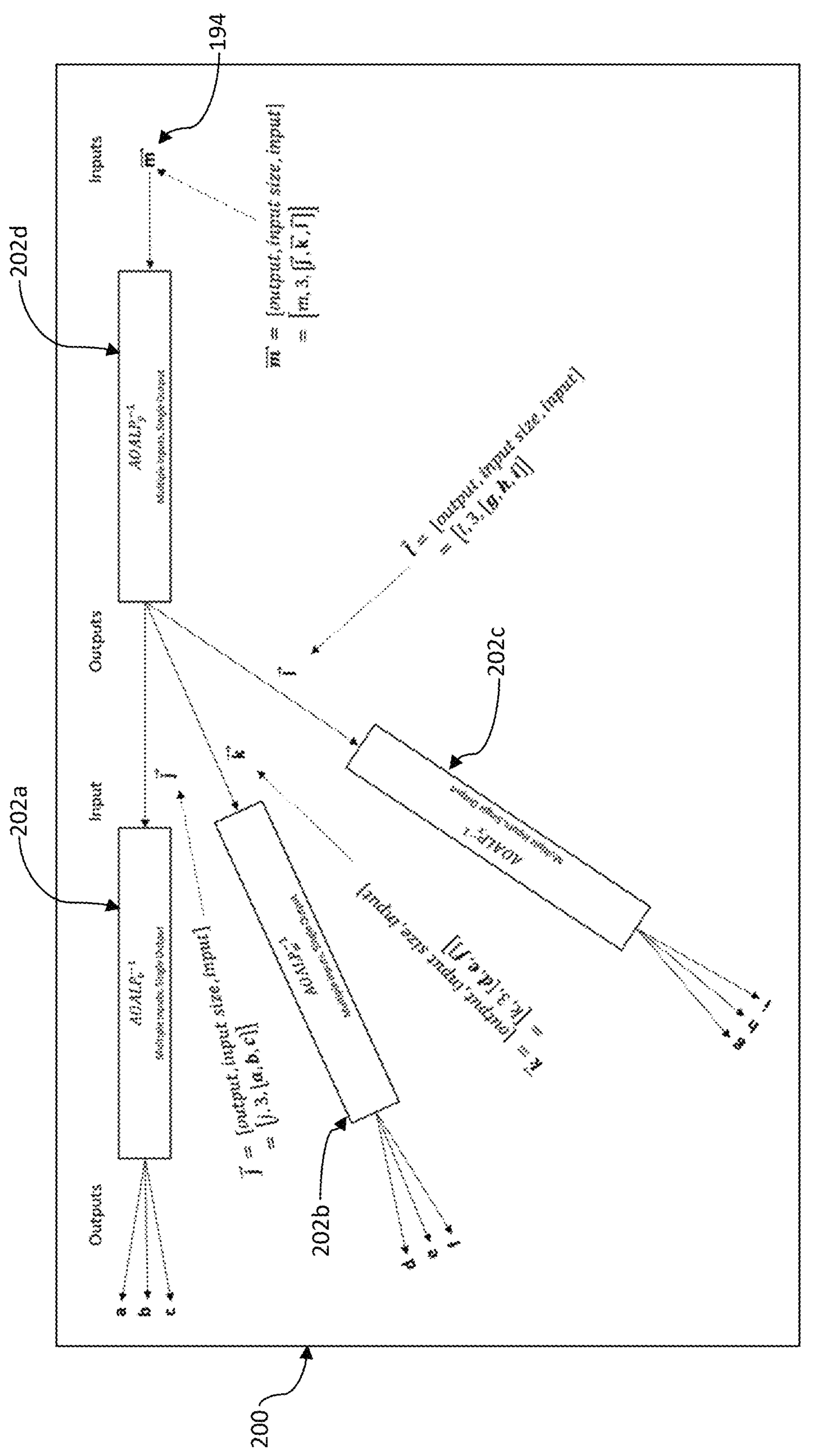
FIG. 11 is a diagram showing an example of reversed (inverted) linked A-OALPs connected via hierarchically uncombined advanced output vectors, in accordance with embodiments of the present invention.

FIG. 11 shows an example diagram 200 of reversed linked A-OALPs 202*a*, 202*b*, 202*c*, 202*d* connected via hierarchically uncombined advanced outputs. Consider that the advanced output of $AOALP_y$202*d* is given by $\vec{m}$ 194, wherein $\vec{m}$=[m, 3, [$\vec{j}$, $\vec{k}$, $\vec{l}$]]. To reverse the function's direction requires accessing the appropriate list of the attached input component. For example, since $AOALP_v$ 202*a* is the first A-OALP, it is given $\vec{j}$ while $AOALP_w$ 202*b* is given $\vec{k}$, and A-$OALP_x$ 202*c* is given $\vec{l}$. $AOALP_v$ uses j=[j, 3, [a, b, c]] to determine its input values a, b, c. Analogously the input values of $AOALP_w$ are d, e, f and the input values of $AOALP_x$ are g, h, i. Thus, using the hierarchical advanced outputs of linked A-OALPs allows for the automatic determination of the inputs of the preceding linked A-OALPs, a process of uncombining the associated advanced output vectors.

Figure 12:
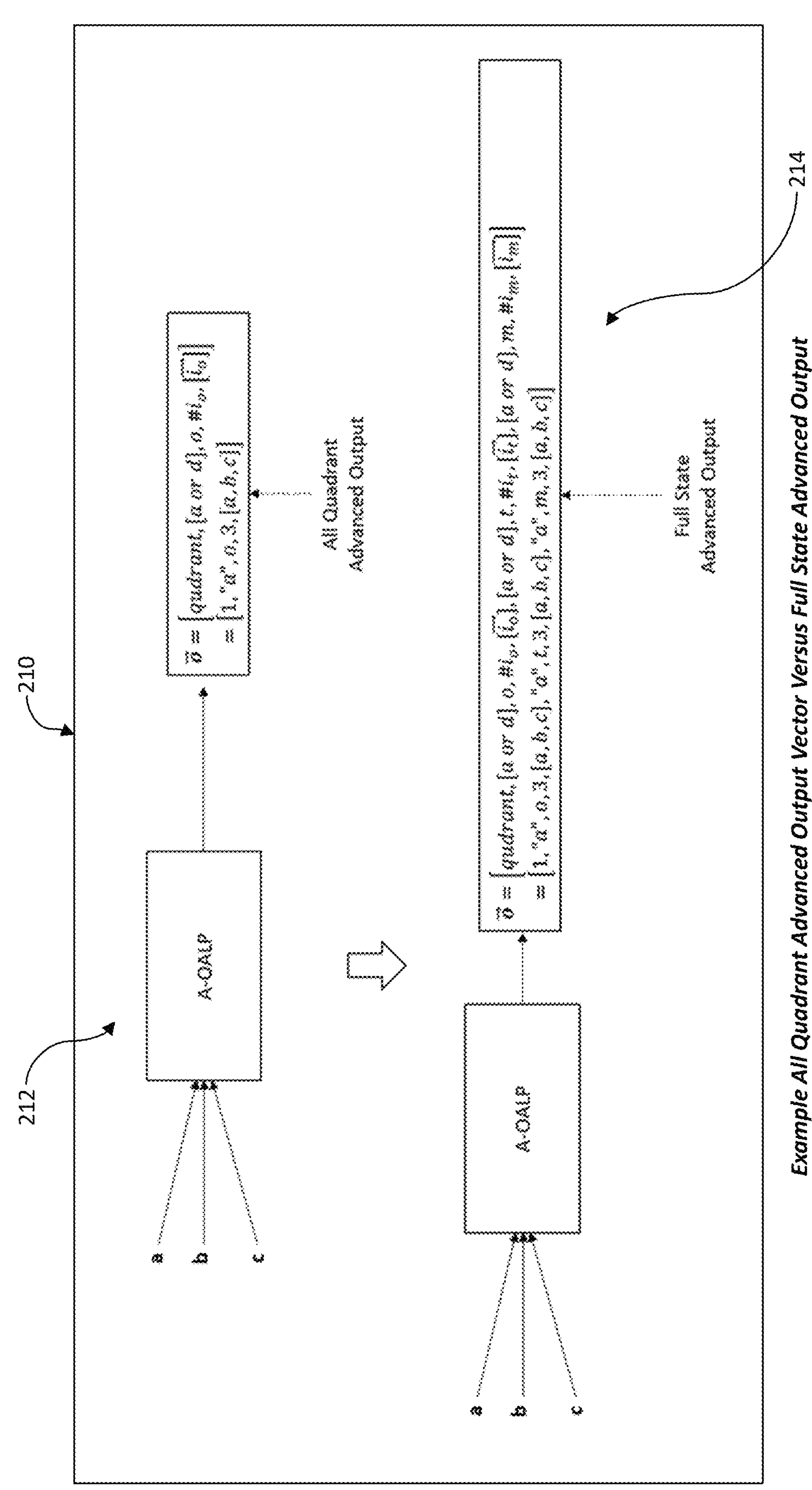
FIG. 12 shows two diagrams, comparing the all-quadrant version of the advanced output vector to the full state version of the advanced output vector, in accordance with embodiments of the present invention.

The example diagram 210 of FIG. 12 shows the difference between the all-quadrant advanced output vector 212 and the full state advanced output vector 214, so called because the three A-OALP states of output, time, and space are tracked. Unlike the all-quadrant advanced output vector which only contains information on the output complexity quadrant, ascending or descending curve, output variable value, number of input variables, and a list of input variables, the full state advanced output vector also contains the ascending or descending temporal curve indicator, the processing time, the number of temporal input variables, the list of temporal input variables, the ascending or descending spatial curve indicator, the memory value, number of spatial input variables, and the list of spatial input variables. These additions allow for the regeneration of the three A-OALP states of output, time, and space, which provides the information required to reconstruct the task-like with dynamic loop-unrolling parallelism without re-profiling the A-OALPs. The full state advanced output vector terms are:

TABLE 6

Full State Advanced Output Vector Terms

| Symbol | Full State Advanced Output Terms<br>Meaning |
|---|---|
| $\vec{o}$ | Full State Advanced Output Vector |
| quadrant | Cartesian Coordinate Two-Dimensional Graph Quadrant Identifier |
| "a" or "d" | Ascending or Descending Graph Identifier for Output Curve |
| o | Normal Output Variable (Scaler, Matrix, Array, Structure) |

TABLE 6-continued

| Full State Advanced Output Vector Terms<br>Full State Advanced Output Terms | |
|---|---|
| Symbol | Meaning |
| $\#i_o$ | Number of Input Variables that Affect the Output Value |
| $\vec{\iota}_o$ | A Vector Containing the List of Input Variables |
| "$t_a$" or "$t_d$" shown as "a" or "d" | Ascending or Descending Graph Identifier for Temporal Curve |
| t | Processing Time |
| $\#i_t$ | Number of Input Variables that Affect Processing Time |
| $\vec{\iota}_t$ | A Vector Containing the List of Input Variable That Affect Time |
| "$m_a$" or "$m_d$" shown as "d" or "d" | Ascending or Descending Graph Identifier for Space Curve |
| m | Memory Allocation |
| $\#i_m$ | Number of Input Variables that Affect Memory Allocation |
| $\vec{\iota}_{\vec{m}}$ | A Vector Containing the List of Input Variables that Affect Space |

The example diagram 220 of FIG. 13 shows the advanced output vector, $\vec{m}$ 194, from the set of linked A-OALPs shown in previous figures first converted into a set of source values tables and then into a set of output complexities. In order to generate the source value tables, the linked A-OALPs are executed in parallel multiple times with their input values gradually changed, generating a set of values for each linked A-OALP. These input values with their associated output values are used to generate the source values tables. A multi-variable piece-wise sequence detection is then used to generate the various A-OALP output complexity prediction functions. Using the A-OALP linking criteria, the hierarchical advanced output vectors and their order, allows the newly constructed output complexities to be converted into A-OALPs and correctly linked back together. This means that not only can the reverse of the linked A-OALPs be generated but also that the entire processing network can be reconstructed from the advanced output vectors without prior knowledge of the underlying processing.

Consider that an entire network of linked A-OALPs can be stored as a small set of advanced output vectors. This set of advanced output vectors is generally smaller than the combination of input and output variables and the transformational logic of the set of linked A-OALPs. That is, a set of advanced outputs decreases the amount of information required to define that set of linked A-OALPs. In other words, the advanced output vector form represents a compressed form of the original set of linked A-OALPs, a fundamentally new form of compression, A-OALP compression. A-OALP decompression means the conversion of advanced output vectors first into source values tables and then into output complexity functions, which are directly convertible to A-OALP source code, as shown in table 3. A-OALP compression can be used with data compression as long as that data compression is loss-less. Combining compressed A-OALP network recovery with A-OALP graph parallelism means that A-OALP graph parallelism can be detected as part of decompressing a compressed network of linked A-OALPs.

Hierarchical time and memory allocation can also be stored in advanced output when full-state advanced output is used. Not only can the reverse of the linked A-OALPs be generated but also their associated advanced time and advanced space complexities. From the reconstructed output complexity, advanced time complexity, and advanced space complexity, we are able to reconstruct any associated task-like with dynamic loop-unrolling parallelism.

Figure 14:
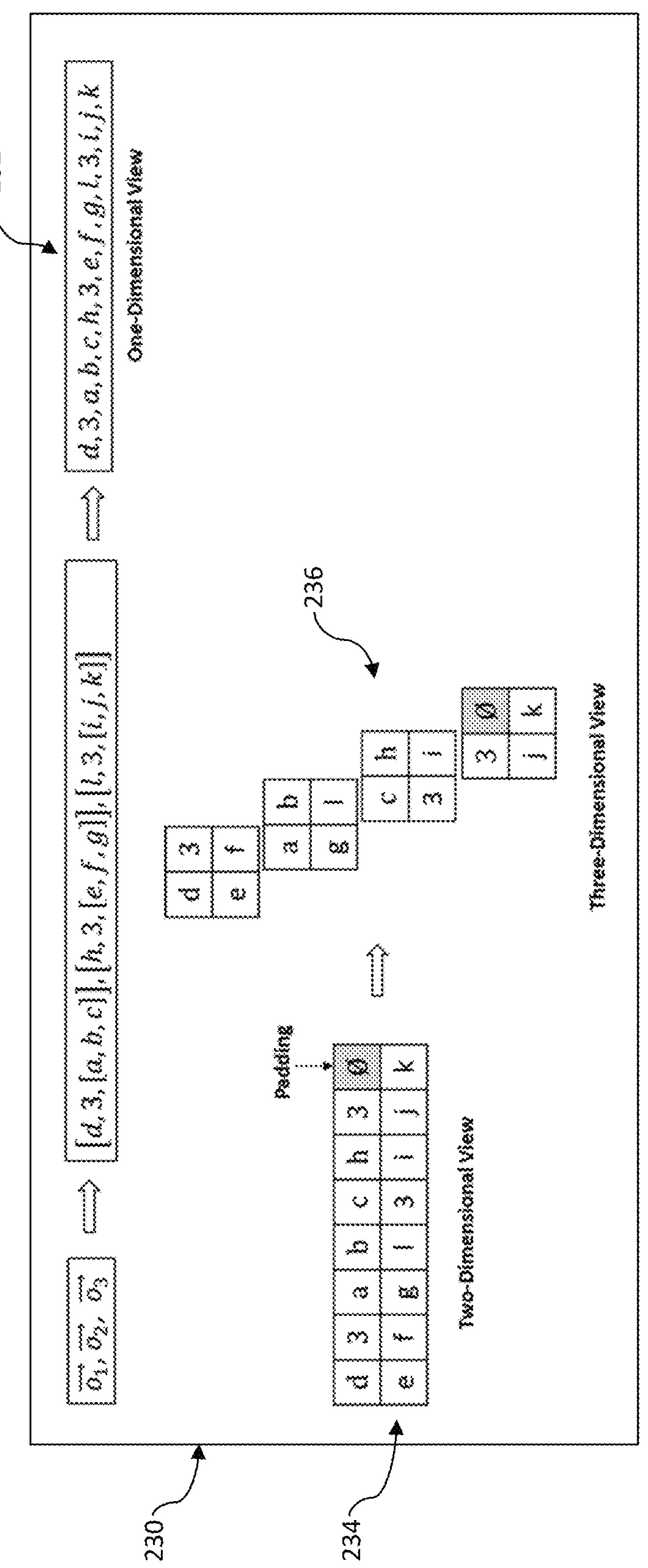
FIG. 14 shows the conversion of a list of advanced output vectors into one-, two-, and three-dimensional array form, in accordance with embodiments of the present invention.

FIG. 14 shows an example diagram 230 of a list of advanced output vectors converted into one-, two-, and three-dimensional arrays, e.g., 232, 234, and 236, respectively. The two- and three-dimensional arrays are shown to have extra characters added, called padding, used to ensure that the dimensions contain the same number of values. The padding can be added to the beginning, middle, or end position of a dimension. Consider that the list of advanced output vectors, since they can be converted back into their constituent A-OALPs, already represent both the compression and the obfuscation of the A-OALP source code. Using techniques like those found U.S. Pat. Nos. 10,009,168 and 10,148,425, we can encrypt the list of advanced output vectors.

Figure 15:
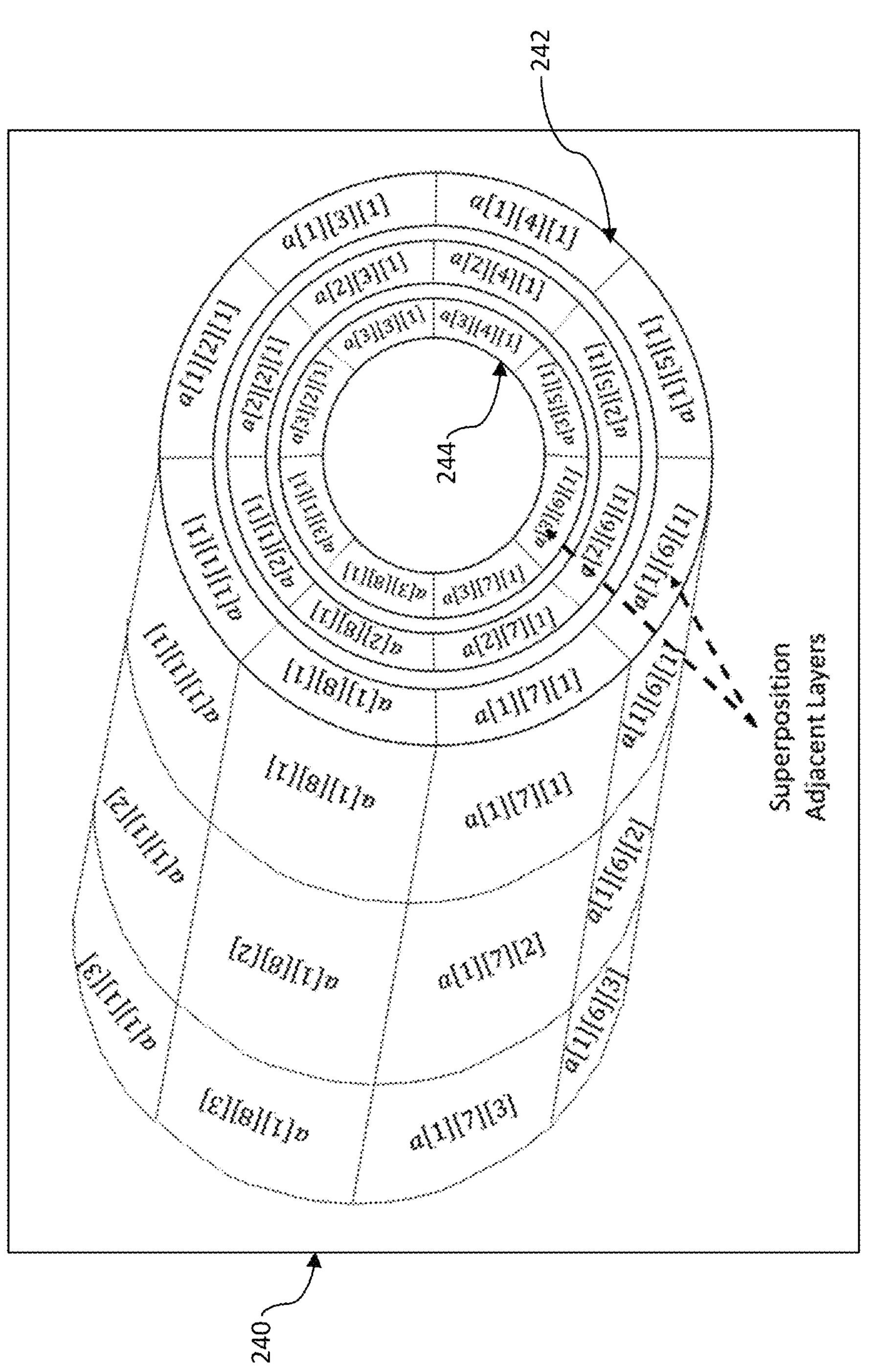
FIG. 15 shows a cylindrical array of advanced output vectors with superposition adjacent layers, in accordance with embodiments of the present invention.

FIG. 15 shows an example diagram 240 of a three-dimensional cylindrical array of advanced output vectors. As discussed above, an A-OALP-based directed acyclic graph can be converted into a list of advanced output vectors, which can be converted into two- or three-dimensional arrays. Here, a three-dimensional cylindrical array is shown, but the same principles apply to a three-dimensional toroidal array. In either case, there is an advantage to using superposition adjacency. This diagram 240 indicates that layer one 242, indicated as a[1][x][y], and layer three 244, indicated as [3][x][y], are adjacent to one another through superposition adjacency. This adjacency can be used as an additional dimension in multi-dimensional encryption. In this model, either the selected layer or its superposition adjacent layer is selected. The only difference in decryption is that once all of the values are back in order, the linked A-OALPs are reconstructed using A-OALP-based decompression.

Figure 16:
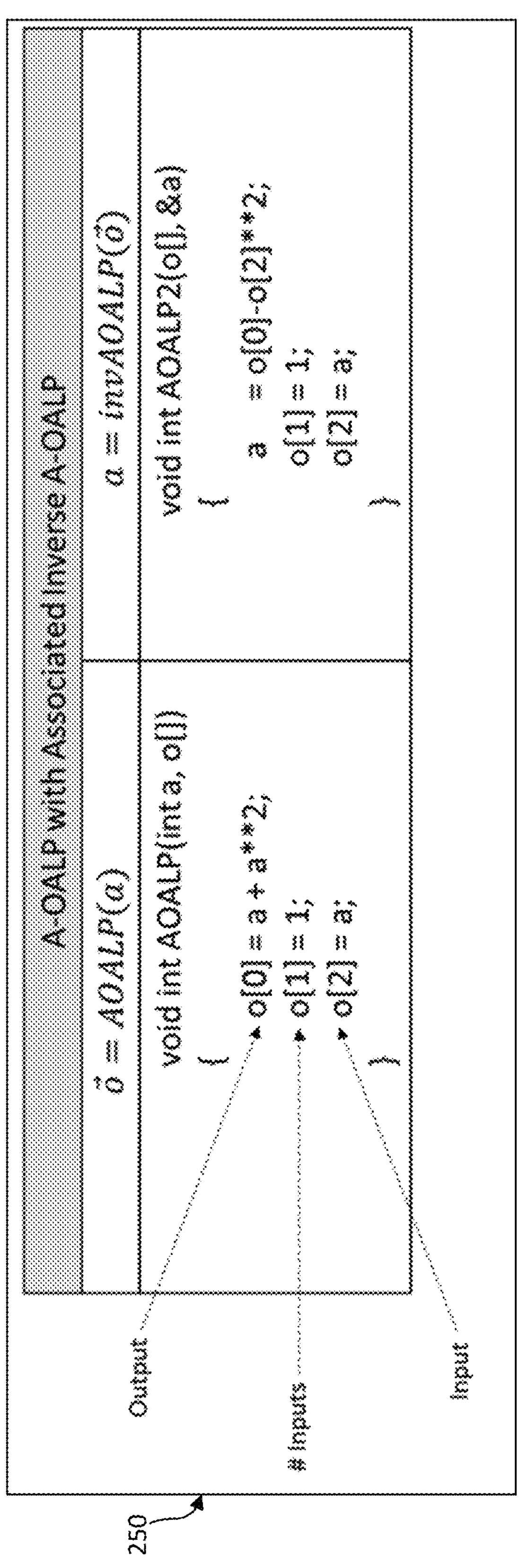
FIG. 16 shows an example of the source code of an A-OALP with a single input variable and its associated inverse A-OALP using an advanced output vector, in accordance with embodiments of the present invention.

FIG. 16 shows an example source code depiction 250 of a single input variable A-OALP and its associated inverse source code. The A-OALP generates an advanced output vector that contains its normal output, placing it in the zero$^{th}$ storage location of the vector, and the number of input values and the value itself. This example also shows the inverse function where the advanced output vector is used as input. The input value is calculated rather than directly used from the advanced output vector so that the processing time is on par with the original A-OALP function. The reverse processing time must be close to the original A-OALP processing time in order to decrease total energy consumption. The closer the reverse processing time is to the original A-OALP processing time, the less energy is consumed in the reversible circuit.

Figure 17:
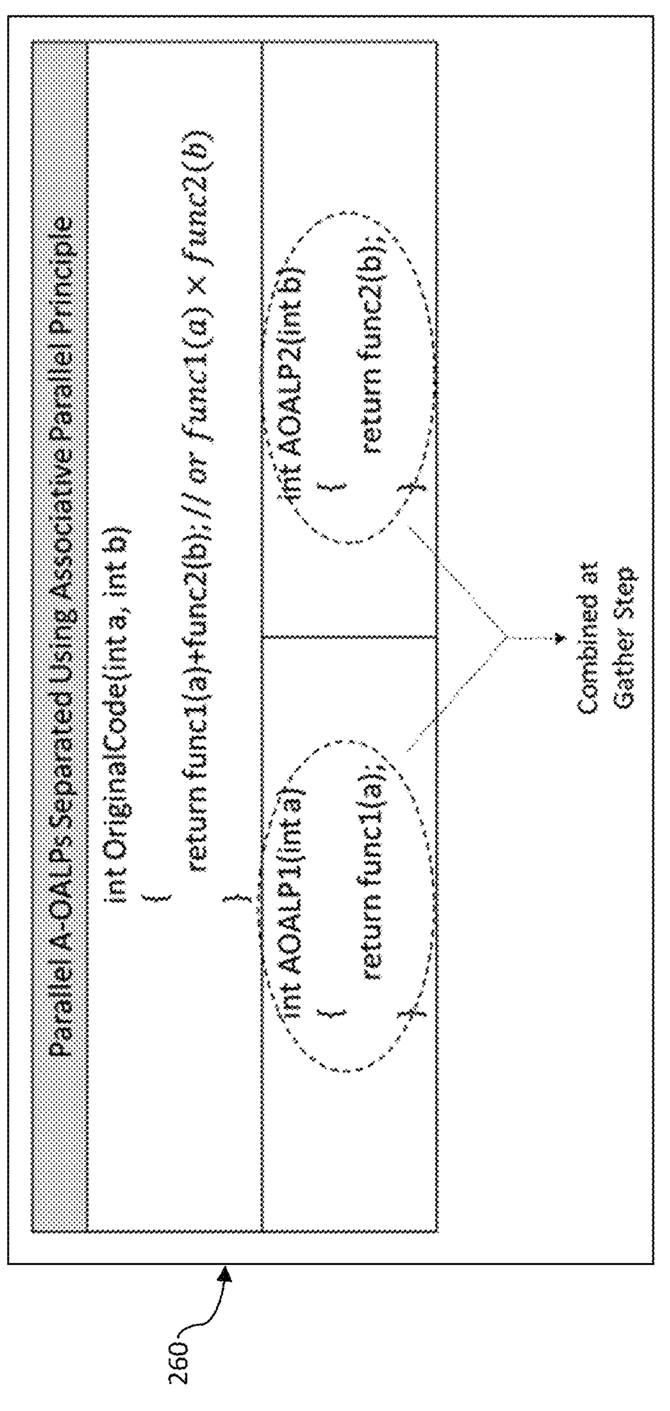
FIG. 17 shows a diagram depicting the generation of multiple A-OALP segments using the associative parallel principle, in accordance with embodiments of the present invention.

FIG. 17 shows an algorithm depiction 260 whose internal functions are linked using either addition or multiplication. Since both addition and multiplication are associative, functions that are linked with either can be separated. This means that for A-OALPs with associatively linked functions, additional A-OALP instances can be generated from the structure of the transformation that occurs on the current pathway. A-OALP instance generation, because of the associative property, is called herein the associative parallel principle. Unlike the task-like parallelism, which represents complete data transformations, the instances formed using the associative parallel principle do not represent complete data transformations and therefore require that the outputs of each instance be agglomerated together to produce the full data transformation. As with other parallel techniques, the agglomeration step is called gathering. During the gathering step the values are combined using the appropriate connection operation, either addition or multiplication, which is determined prior to the generation of instances of A-OALPs. The associative parallel principle can be combined with current parallelization methods.

Figure 18:
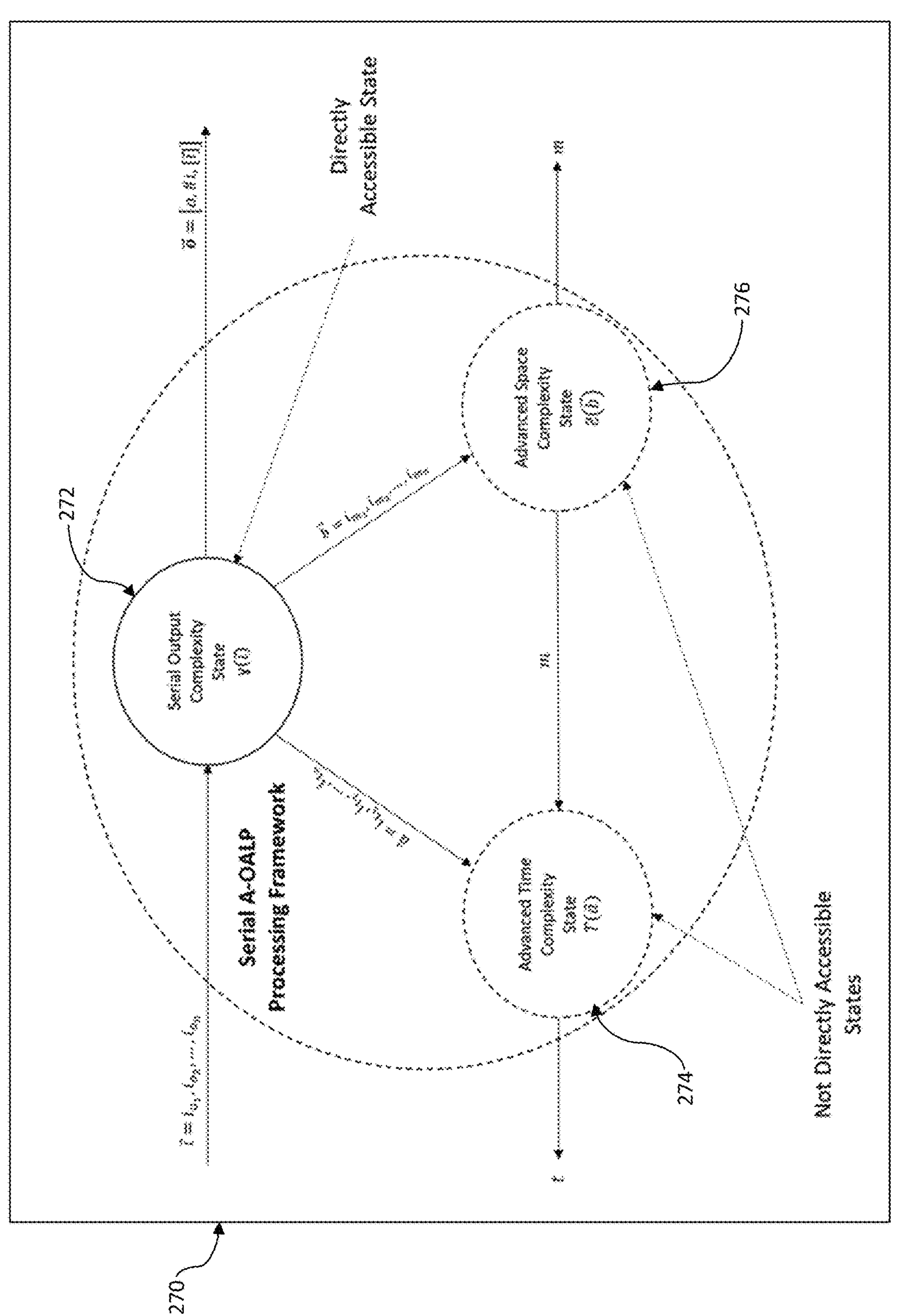
FIG. 18 is a diagram showing the simplest type of processing, the serial A-OALP processing framework. The diagram shows the three basic states that all A-OALPs require, in accordance with embodiments of the present invention.
Figure 19:
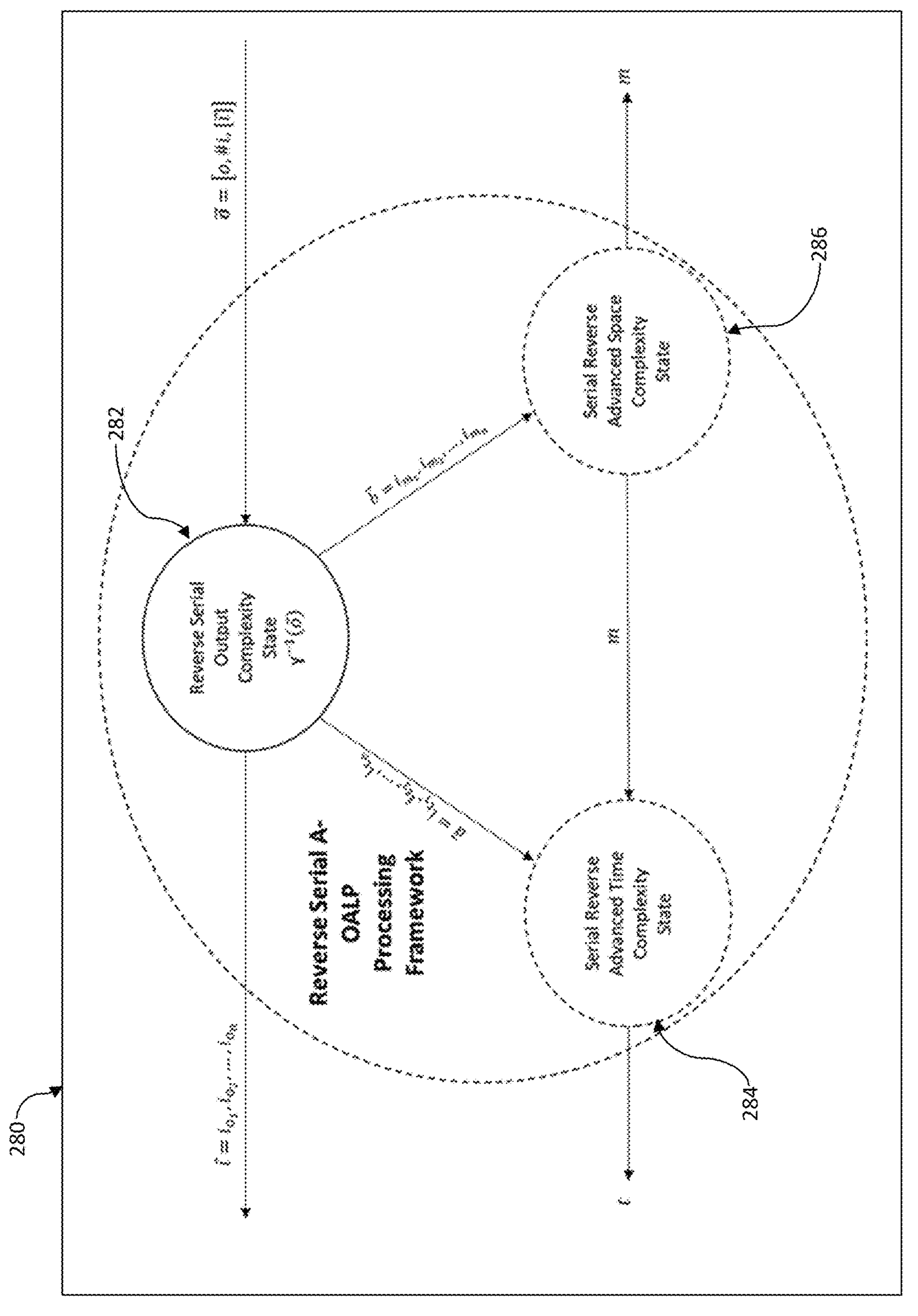
FIG. 19 is a diagram showing a reverse serial A-OALP processing framework. This framework is separate from the serial A-OALP processing framework as the required inputs differ, in accordance with embodiments of the present invention.

With regard to the example diagram 270 of FIG. 18 through the example diagram 280 of FIG. 19, programming concentrated primarily on the transformational aspects of an algorithm. However, all algorithms that are executed, whether using mechanical, electrical, electro-mechanical, biological, or any other means, require not only the actual data transformation but must also take some amount of processing time and the use of some amount of memory. In essence, transformation, processing time, and memory allocation represent the three fundamental states of algorithm use. All three states must exist for any data transformation to occur, meaning there is always associated processing time and associated memory use. Known computer programming makes no overt provision for anything other than the data transformation. The two frameworks shown in these two figures directly conjoin these three states even though only the data transformation state, called output complexity, is directly accessible by the user.

FIG. 18 shows a diagram 270 depicting the most basic form of an A-OALP processing framework. This framework executes with only a single computational instance; that is, it represents serial execution. Although the three states 272, 274, 276 are shown, neither the time complexity 274 nor the space complexity 276 are directly accessible. Even though processing time exists, its meaning is that given some input vector, $\vec{i}$, it will take some processing time, t, to complete. This framework shows that there can be some subset of the input vector $\vec{i}$ called vector $\vec{a}$, the list of input variables that affect the A-OALP's processing time. This subset is known as the set of time-affecting variables for the A-OALP. In addition to requiring processing time, t, the diagram also shows that there can also be some subset of the input vector $\vec{i}$ called vector $\vec{b}$, the list of input variables that affect the A-OALP's memory allocation, m. This subset is known as the set of memory-affecting variables for the A-OALP. In this basic form, although changes in processing time and memory allocation can occur from changes in the input dataset values, such changes are not directly predictable. Since the advanced time complexity and advanced space complexity are not externally exposed, dynamic hardware reallocation, as occurs with task-like with dynamic loop-unrolling parallelization, is not possible, making this a serial-only framework. It should be noted that this framework expands other frameworks by using advanced output rather than normal output.

Advanced Output Definition $$\vec{o} = [o, \#i_o, [\vec{\iota_o}]], \quad \text{Equation 25}$$

The list of input variables that affect the output variable is given as:

Input Variable Vector Definition $$\vec{\iota_1} = [i_{o_1}, i_{o_2}, \ldots, i_{o_n}], \quad \text{Equation 26}$$

Where $i_{o_1}$ = First input variable

The list of input variables that affect variable time is given as:

Temporal Vector Definition $$\vec{a_1} = [i_{t_1}, i_{t_2}, \ldots, i_{t_n}], \quad \text{Equation 27}$$

Where $i_{t_1}$ = First time−affecting input variable

The list of input variables that affect memory allocation is given as:

Spatial Vector Definition $$\vec{b_1} = [i_{m_1}, i_{m_2}, \ldots, i_{m_n}] \quad \text{Equation 28}$$

Where $i_{m_1}$ = First space−affecting input variable

FIG. 19 shows a diagram 280 depicting the reverse serial A-OALP framework, with states 282, 284, 286. Since there is no external access to the A-OALP analytics except through the use of the A-OALP's inputs, the reverse A-OALP resides as a separate framework. In the diagram the advanced output vector, $\vec{o}$, becomes the input while the original input vector, $\vec{i}$, becomes the new output.

Figure 20:
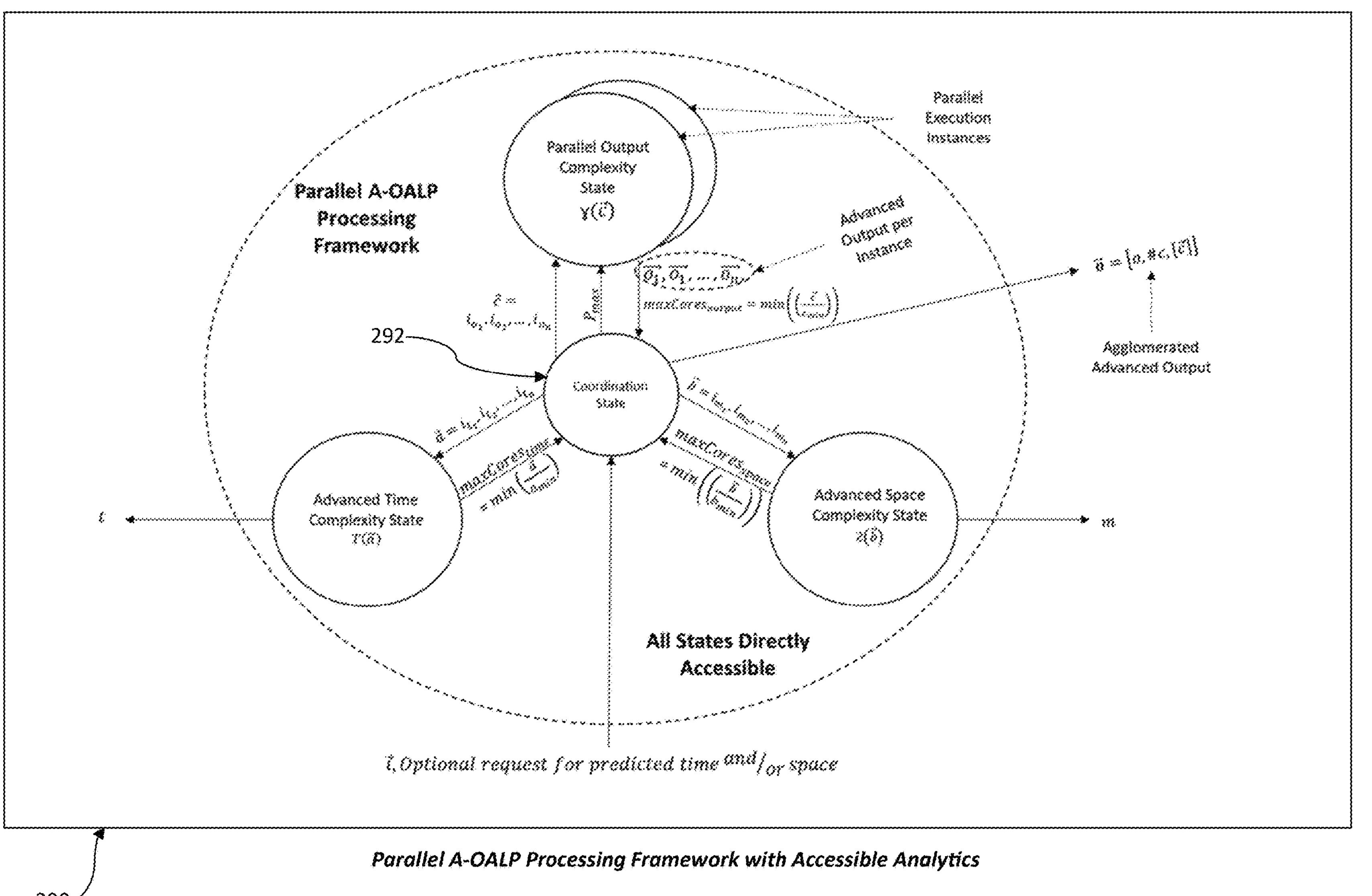
FIG. 20 is a diagram showing the simplest type of parallel A-OALP processing framework. This framework adds a fourth state, coordination, which is used to automatically determine the maximum possible number of processing elements (cores) required to process the input dataset, given $maxCores_{time}$, $maxCores_{space}$, and $maxCores_{output}$, in accordance with embodiments of the present invention.
Figure 21:
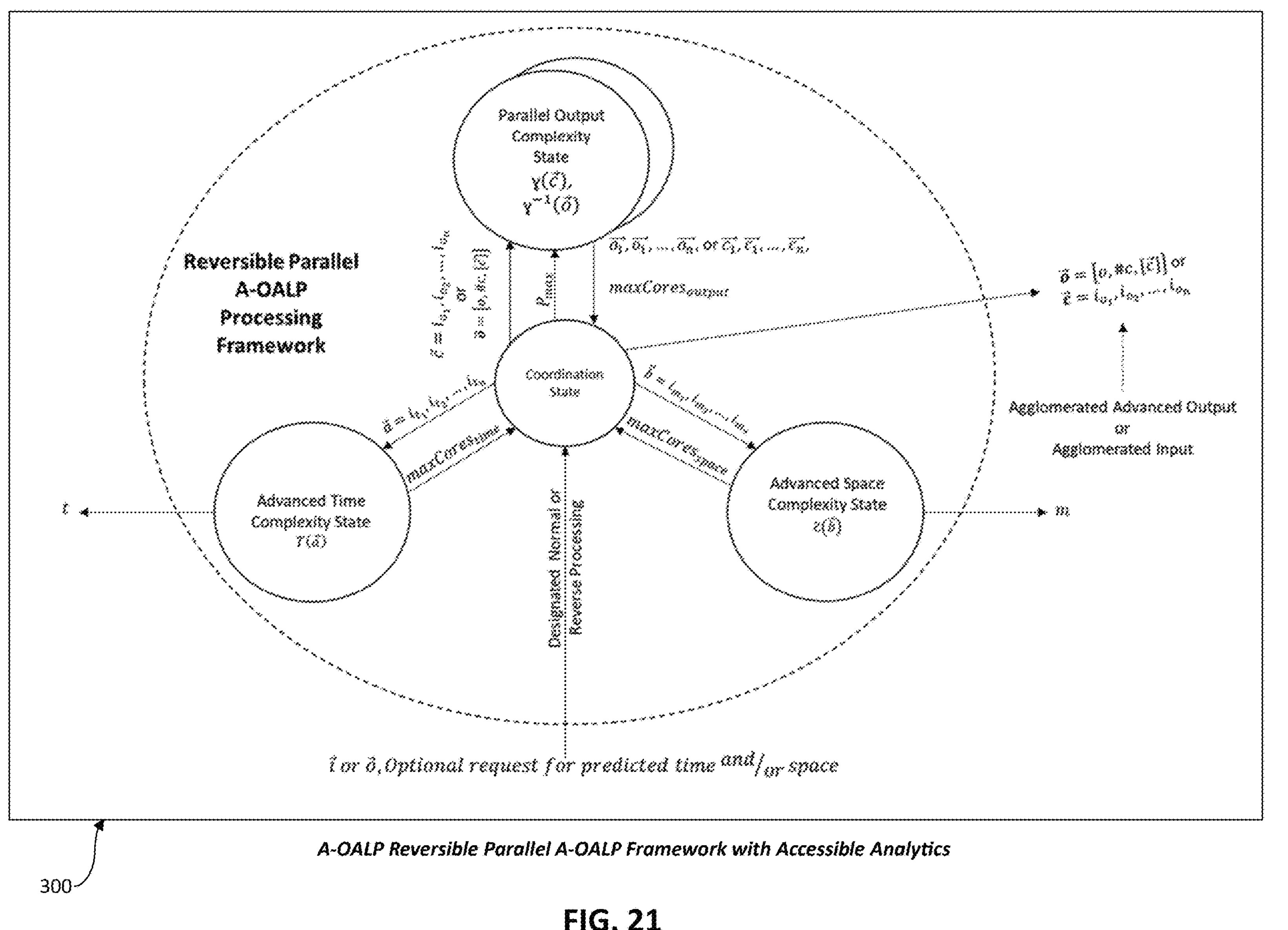
FIG. 21 is a diagram showing an extension to the parallel A-OALP processing framework, the reversible parallel A-OALP processing framework which combines the processing and its reverse, in accordance with embodiments of the present invention.
Figure 22:
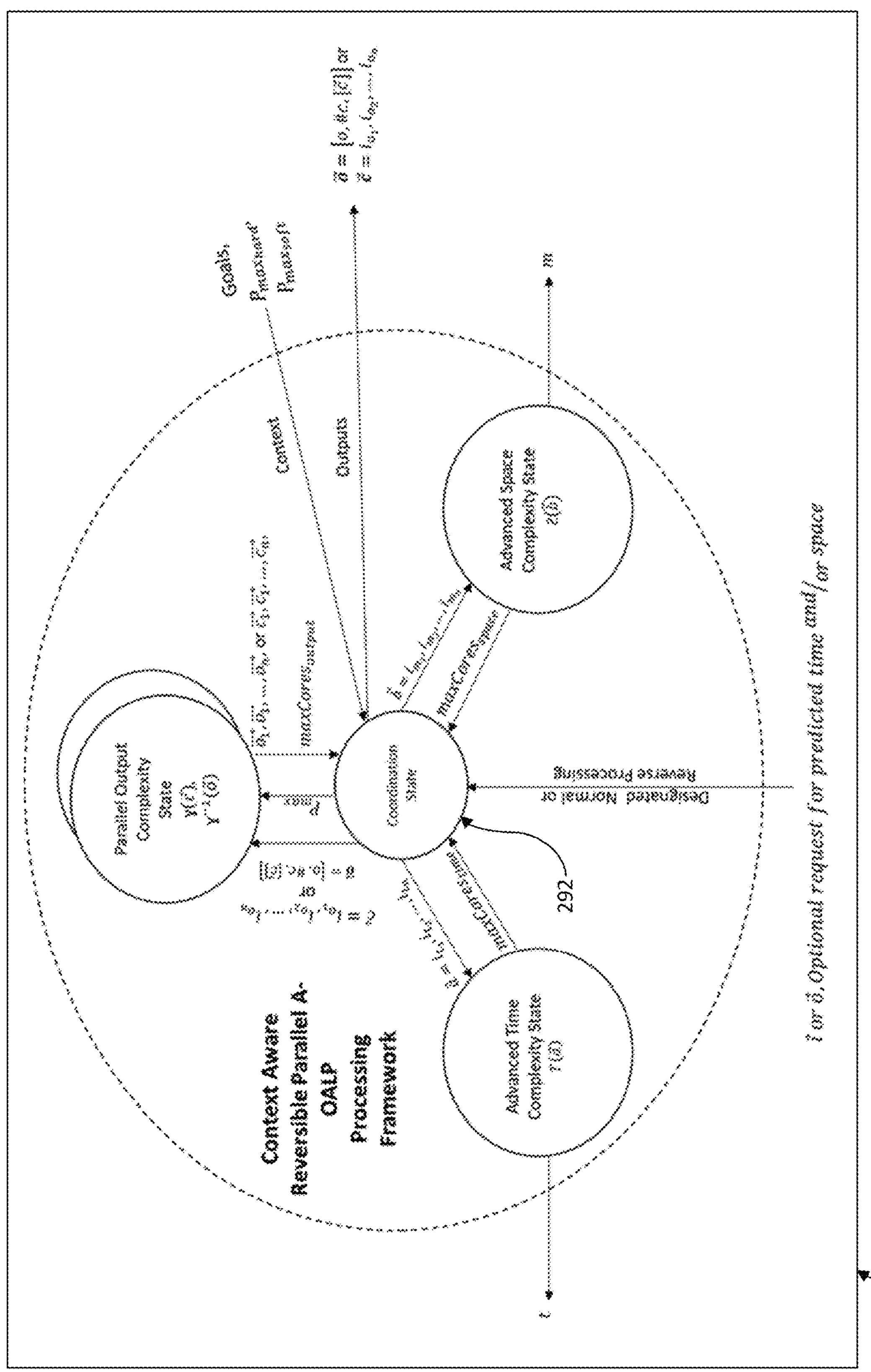
FIG. 22 is a diagram that extends the reversible parallel A-OALP processing framework by adding the processing context to the coordination state. This framework represents the most general form of processing linking serial, parallel, and reversible processing to analytics, processing elements, and user goals, in accordance with embodiments of the present invention.

With regards to FIG. 20 through FIG. 22, another state is added to the serial framework, allowing direct access to both the advanced time complexity and advanced space complexity states. This new state, called the coordination state, greatly increases the capability of A-OALPs. In the absence of the two optional system limits, $P_{max_{hard}}$ and $P_{max_{soft}}$, the new state uses the smallest valid value of scaled output complexity, scaled advanced time complexity, or scaled advanced space complexity to determine the maximum possible number of processing elements (or cores) that the current A-OALP executing the current input dataset can utilize, $maxCores_{time}$, $maxCores_{space}$, and $maxCores_{output}$. That is, the input variable values define the number of cores (processing elements) that can be used, directly exposing the temporal and spatial states that have existed but were unexposed.

Exposing A-OALP-associated advanced time and advanced space makes it possible to model time and space independent of performing the data transformation. This modeling can be used to dynamically change the resources used in processing an input dataset. This is how the dynamic loop-unrolling parallelism is able to adapt the number of cores (processing elements) to changes in input dataset values, called herein run-time adaptation. As long as the three states (output complexity, advanced time complexity, and advanced space complexity) remain aligned, there is always an associated, accurate prediction model that can be used to optimize an A-OALP's performance, memory use, and energy use. The coordination state allows for the selection of either the A-OALP or its inverse, making A-OALPs that use this framework not only run-time adaptable (using dynamic loop-unrolling parallelism) but also in reversible logic form, which corresponds to Feynman's reversible logic form. Having a reversible logic A-OALP that is also dynamically parallelizable is critical as using reversible logic gates to decrease energy use normally decreases processing performance. Reversibility plus dynamic loop-unrolling parallelism overcomes the performance loss from executing on reversible logic gates while retaining most of the energy consumption advantages of using such gates.

Since the associated advanced time complexity and advanced space complexity states can be accessed independent of processing the output complexity state, then those states can be directly used to predict processing time, processing efficiency, memory allocation, and memory allocation efficiency. The advantage is that the same mechanism used to drive performance and memory allocation can also be used to model and predict performance and memory allocation, without the need to perform the data transformation itself.

In addition, the coordination state provides the natural place to inject system processing context, the hard limits of the system and the soft limits provided by the system user.

FIG. 20 shows a diagram 290 of the parallel A-OALP processing framework. As indicated, this framework adds a new state, the coordination state 292. Rather than the input vector, i, being transferred to the parallel output complexity state directly, it is instead sent to the coordination state. The coordination state extracts the output-affecting input variables $\vec{c}=[i_{o_1}, i_{o_2}, \ldots, i_{o_n}]$, the time-affecting input variables $\vec{a}=[i_{t_1}, i_{t_2}, \ldots, i_{t_n}]$, and the memory allocation-affecting input variables $\vec{b}=[i_{m_1}, i_{m_2}, \ldots, i_{m_n}]$ and sends each set to the its appropriate state. Each state determines its minimum valid scaled input variable value, which corresponds to the maximum valid number of cores (processing elements) for that state. Scaling the values of the extracted input variables with the minimum valid input value gives:

$$\frac{\vec{a}}{a_{min}} = \left[\frac{i_{t_1}}{a_{min}}, \frac{i_{t_2}}{a_{min}}, \ldots, \frac{i_{t_n}}{a_{min}}\right], \frac{\vec{b}}{b_{min}} = \left[\frac{i_{m_1}}{b_{min}}, \frac{i_{m_2}}{b_{min}}, \ldots, \frac{i_{m_n}}{b_{min}}\right],$$

$$\frac{\vec{c}}{a_{min}} = \left[\frac{i_{o_1}}{c_{min}}, \frac{i_{o_2}}{c_{min}}, \ldots, \frac{i_{o_n}}{c_{min}}\right].$$

It is now possible to calculate the maximum number of cores per state:

Maximum Core Count Given

Multiple Time-Affecting Input Variables $$maxCore_{time} = \min\left(\frac{i_{t_1}}{a_{min}}, \frac{i_{t_2}}{a_{min}}, \ldots, \frac{i_{t_n}}{a_{min}}\right) \quad \text{Equation 29}$$

Maximum Core Count Given Multiple

Memory Allocation-Affecting Input Variables $$maxCore_{space} = \min\left(\frac{i_{m_1}}{b_{min}}, \frac{i_{m_2}}{b_{min}}, \ldots, \frac{i_{m_n}}{b_{min}}\right) \quad \text{Equation 30}$$

Maximum Core Count Given

Multiple Output-Affecting Input Variables $$maxCore_{output} = \min\left(\frac{i_{o_1}}{c_{min}}, \frac{i_{o_2}}{c_{min}}, \ldots, \frac{i_{o_n}}{c_{min}}\right) \quad \text{Equation 31}$$

Note that equation 31 is equivalent to equation 10 but adapted to the current framework. Combined with the hard and soft limits, the maximum number of cores that can be used to process the current dataset is given by equation 11, Pmax.

FIG. 21 shows a diagram 300 expanding the parallel A-OALP processing framework into the reversible parallel A-OALP processing framework. In this framework, the list of input variables that affects output, $\vec{c}$, is used to generate the advanced output vector, $\vec{o}$. Entering the advanced output vector as the input will generate the input variable values, $\vec{c}$. It should be noted that the input variable values are generated per parallel instance.

FIG. 22 shows a diagram 310 further expanding the reversible parallel A-OALP processing into a context-aware reversible parallel A-OALP processing framework. This is accomplished by allowing the coordination state 292 to be able to receive user goals for an A-OALP-based system (optimized energy use, carbon footprint, and/or water use), the number of currently available processing elements (called $P_{max_{hard}}$), and the user-decided maximum number of processing elements ($P_{max_{soft}}$). These goals and additional optional limits represent the processing context that an A-OALP is executing within. Providing context variable values to the coordination state allows for new levels of software control not available in known systems. There can be an additional separate, real-time processing goal that gives the longest acceptable processing time for the A-OALP. Unlike other context, which limits the maximum number of processing elements (or cores), the real-time goal results in a minimum number of cores that can be used to meet the goal with the current input dataset. This result is because A-OALPs use dynamic loop-unrolling parallelization that decreases processing time as the number of cores is increased. In other words, a maximum acceptable processing time limit gives the minimum acceptable number of cores. This is a new capability for software, the ability for an algorithm to automatically either meet a real-time requirement by adjusting the core count or determining that the real-time requirement will not be met prior to executing the algorithm.

Figure 23:
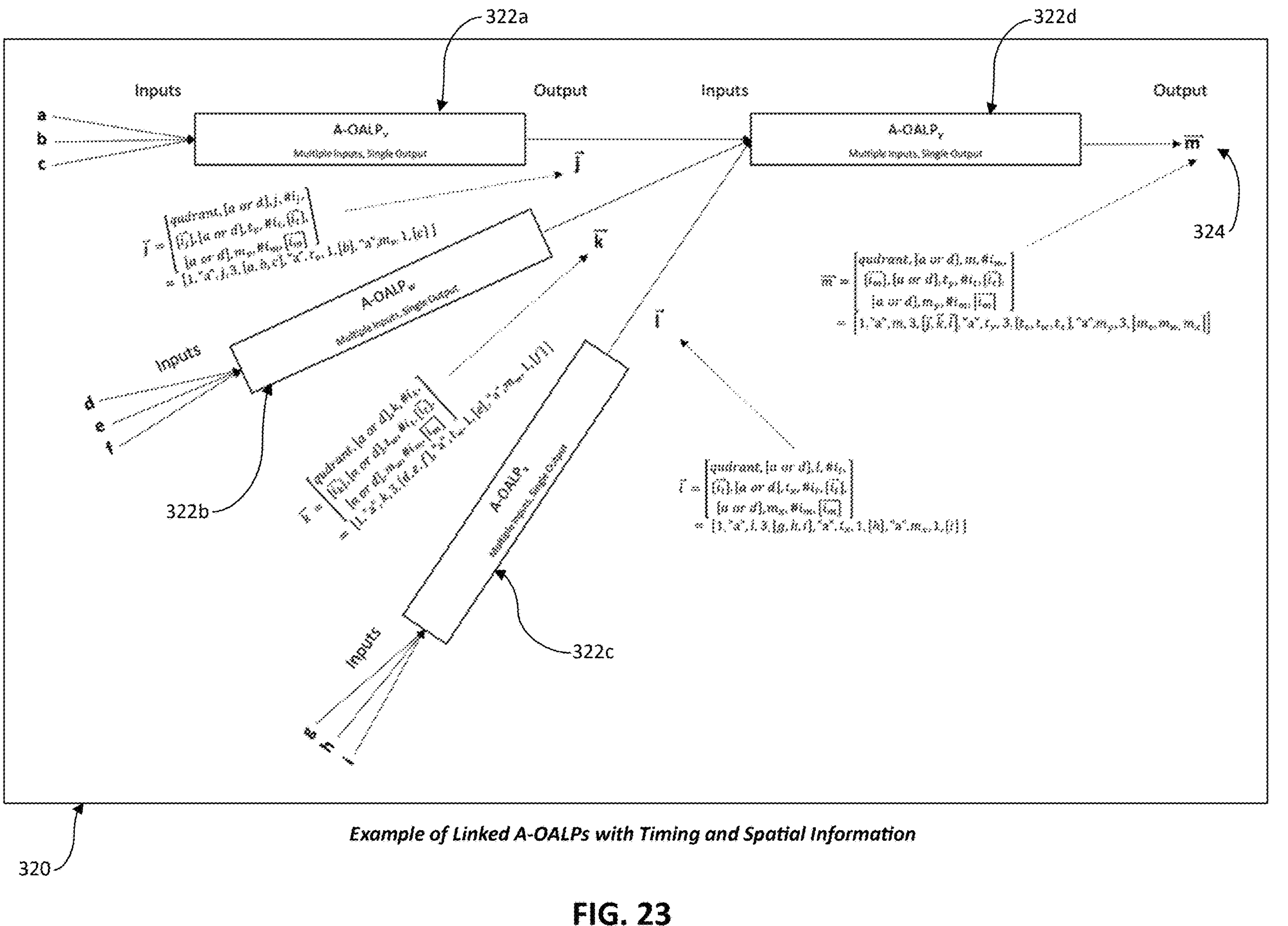
FIG. 23 is a diagram showing an example of linked A-OALPs whose advanced outputs are expanded to contain their timing and spatial information, in accordance with embodiments of the present invention.

FIG. 23 shows a diagram 320 of four linked A-OALPs 322*a*, 322*b*, 322*c*, 322*d*, each with multiple inputs, generating a single advanced output vector, $\vec{m}$ 324. The advanced outputs of A-OALP$_v$, A-OALP$_w$, and A-OALP$_x$ 322*a*, 322*b*, 322*c* define the inputs for A-OALP$_y$, 322*d*. The advanced output of A-OALP$_y$ shows nested advanced outputs stored in its advanced output vector. The advanced output vectors, $\vec{j}$, $\vec{k}$, and $\vec{l}$, show simple non-hierarchical input variables for their respective A-OALPs. The advanced output vector, $\vec{m}$ 324, shows that the input variables of an advanced output vector can themselves be advanced output vectors, making advanced outputs hierarchically defined vectors.

Consider that it is possible to store the input variables of an advanced output in a different location and then access the actual values using a hash code or other designator. This could be used to obscure the contents of a network such that only authorized users could restore it. This ability makes advanced outputs compatible with the data protections used by block chain-based hardware networks, allowing for the safe transmission of codes or AI networks for use in secured edge computing as occurs with robotics, drones, and distributed AI systems.

The four linked A-OALPs, the first three of which are AOALP$_v$ 322*a*, AOALP$_w$ 322*b*, and AOALP$_x$ 322*c* act as the input to AOALP$_y$ 322*d*. This means that the activation of AOALP$_y$ 322*d* requires that all three input A-OALPs 322*a*, 322*b*, 322*c* must be completed. Since the three input A-OALPs are, by the definition of an A-OALP, independent, they can be executed simultaneously. This represents a new kind of parallelism, one that is defined by the geometry of their graph positioning and not by the any particular A-OALP structure, called herein A-OALP network parallelism.

The advanced outputs shown here represent the use of full state advanced outputs. Not only are the inputs that affect the generated outputs preserved, giving Feynman reversibility, but the inputs that affect processing time and the inputs that affect memory allocation are also directly preserved, extending Feynman reversibility to include time and space recovery. This extension allows for temporal and spatial verification, which is not possible using Feynman reversibility alone.

Figure 24:
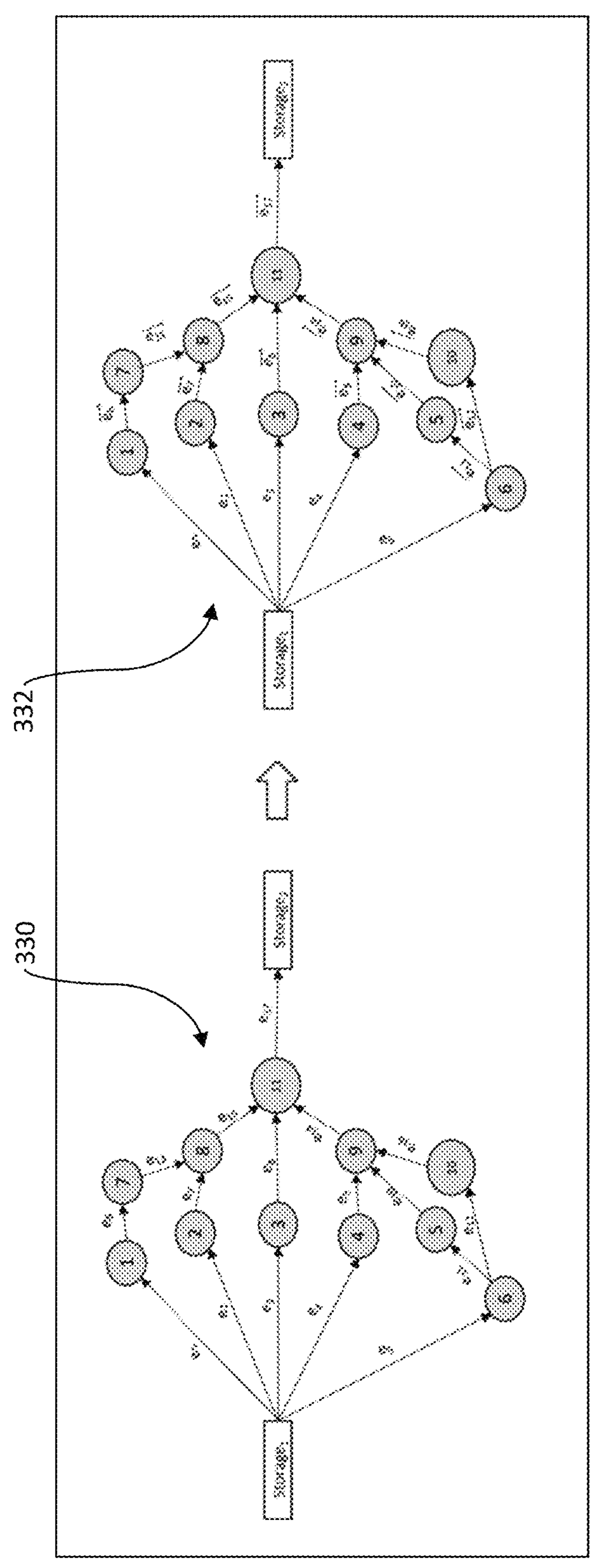
FIG. 24 shows an example of a directed acyclic graph (DAG) constructed using A-OALPs with standard and hierarchically combined advanced outputs. Note, time is ignored by standard DAGs. However, time is included when the DAG describes a logistics network, in accordance with embodiments of the present invention.

FIG. 24 shows two graphs 330, 332 that extend the concept of linked A-OALPs to include full directed acyclic graphs (DAGs). This is important because complex algorithms converted into A-OALPs form DAGs. In addition, neural networks and logistics networks are also types of DAGs. The first graph 330 is an example of a DAG whose nodes are A-OALPs (labeled 1 through 11), called an A-OALP-based DAG. The inputs of each node are comprised of either the outputs of associated preceding A-OALP nodes (linked A-OALPs) or an output medium (display, memory, disk, keyboard, sensor, computer system, etc.). It should be noted that, with the exception of the initial graph inputs (keyboard, file, data stream, etc.), the edges of all A-OALP-based DAGs are output variables from some A-OALP. The second graph 332 is an example of an A-OALP-based DAG whose non-initial graph input edges are comprised of advanced output variables and is called a reversible A-OALP-based DAG. This concept further extends Feynman's reversibility to include entire networks, not just individual reversible functions.

Figure 25:
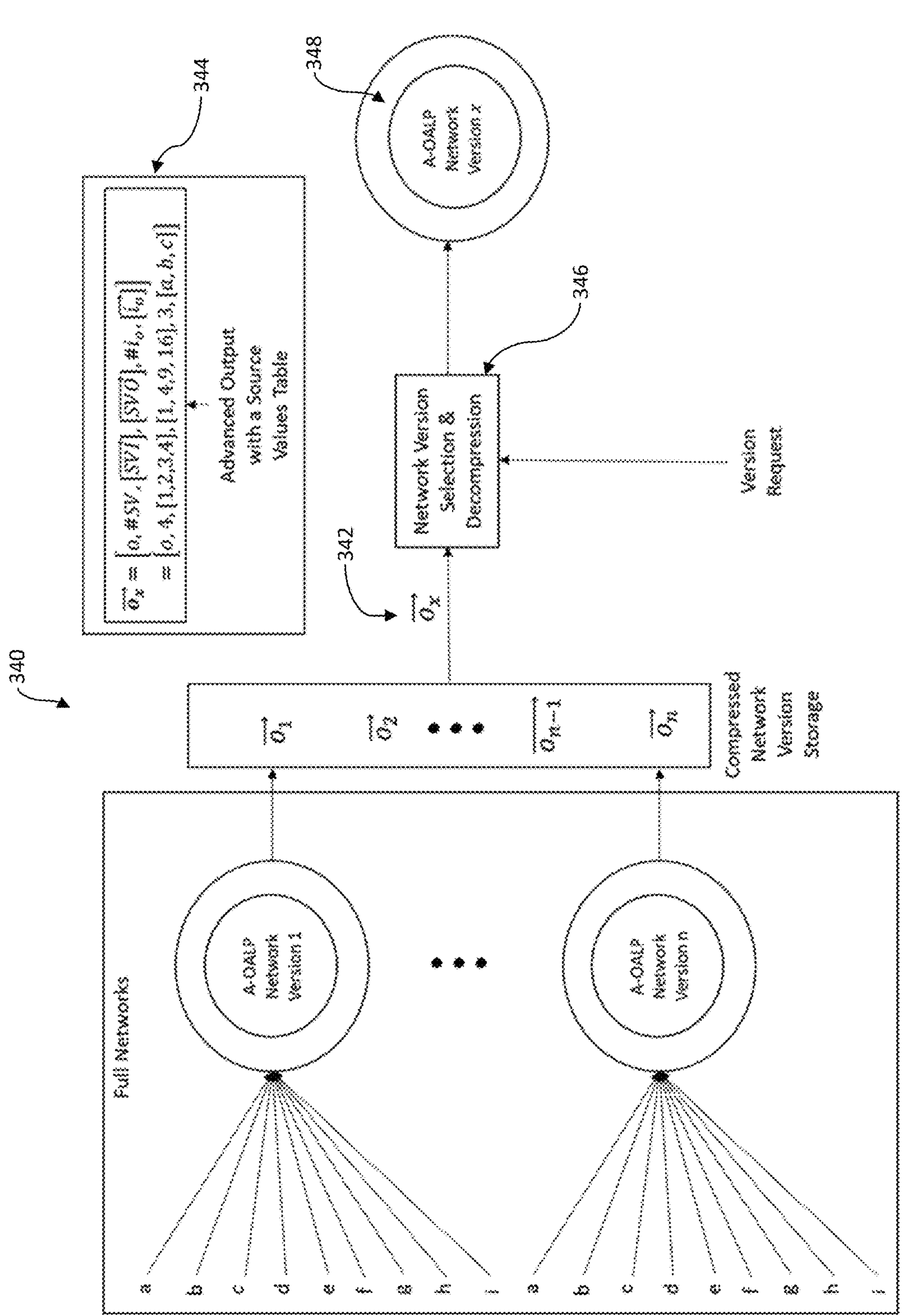
FIG. 25 shows an example of an A-OALP network version-control process flow, in accordance with embodiments of the present invention.

FIG. 25 is a diagram 340 of full network version control. An A-OALP network is first compressed into an advanced output vector 342. This vector is stored as the compressed network with a tag (file name or other designation) indicating the version number. When a particular version is requested then the advanced output vector corresponding to the network is retrieved. The compressed form of the advanced output vector is extended such that it contains a source values table 344 for each hierarchical level. The retrieved advanced output vector is then decompressed 346 using the associated source values tables to form the A-OALPs 348 of the selected network along with the processing time predictors (advanced time complexities), and run-time memory allocation predictors (advanced space complexities).

As shown, an advanced output vector has been augmented with the inclusion of source vector tables, which allows for the reconstitution of the networks without requiring profiling but at the expense of saving additional data. It should be noted that any advanced output vector type, including advanced output, all-quadrant advanced output, and full-state advanced output, can be augmented with source values table information.

Consider that the conversion of algorithms or source codes into A-OALP form implies the generation of a directed acyclic graph of A-OALPs, that is, an A-OALP network. This means that in addition to neural networks, logistics networks, and the like, different versions of the software code can also be efficiently controlled using A-OALP network version control.

Figure 26:
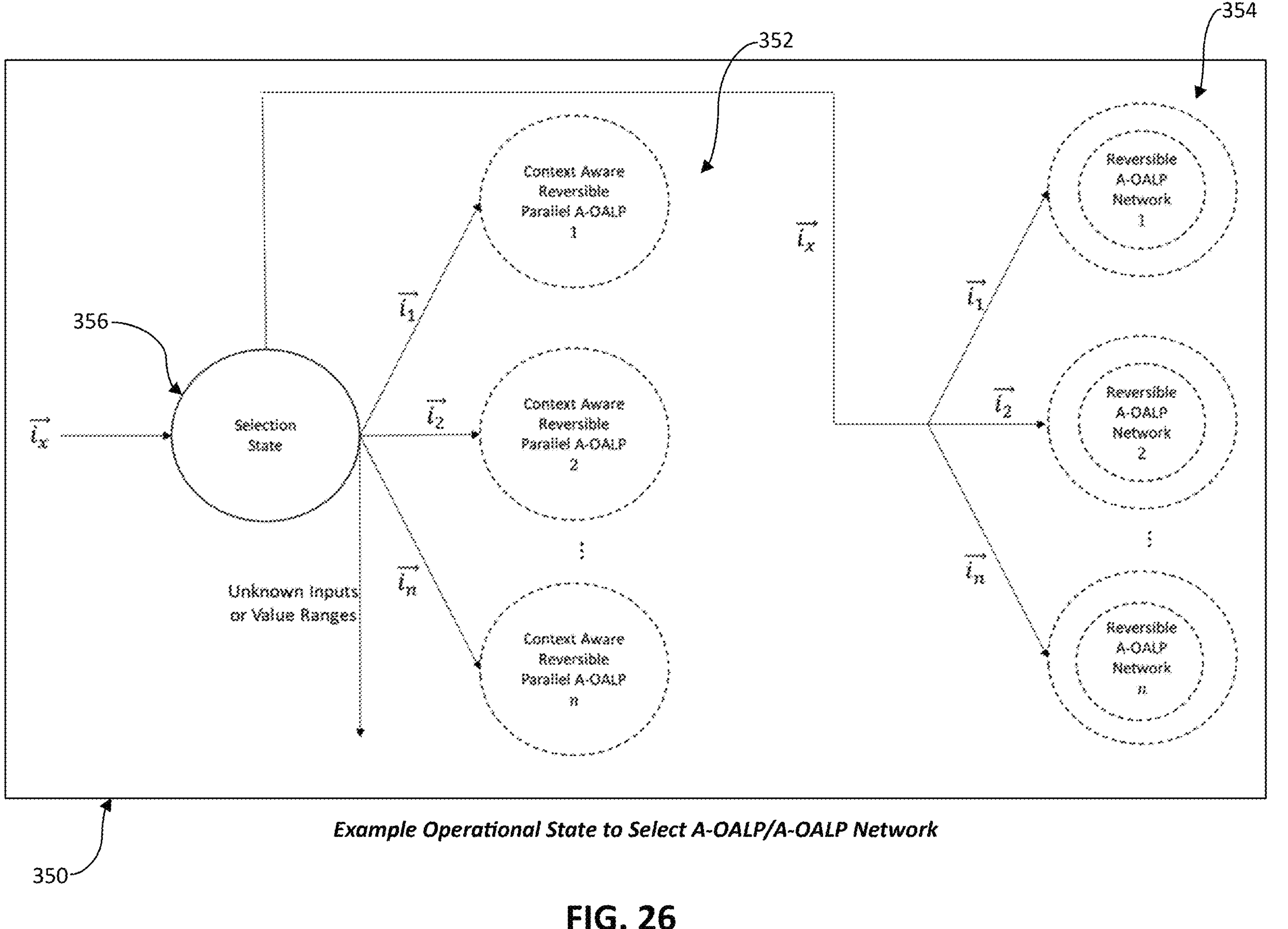
FIG. 26 shows an example of the operational state used to select A-OALPs and A-AOLP networks, in accordance with embodiments of the present invention.

FIG. 26 is a diagram 350 showing both A-OALP selection 352 and A-OALP network selection 354. Highlighted here is a new system state called the selection state 356 that occurs external to and prior to the A-OALP-based states (advanced time complexity, advanced space complexity, output complexity, and coordination). It has been shown that an A-OALP can be automatically selected using only the set of input variables and their associated value ranges. This is possible by accessing an execution pathway using the value ranges of the non-loop control conditions, whether direct, inferred, or synthesized (if, else, switch, ternary, etc.). The selection state determines from the input variable values and their ranges the correct A-OALP or A-OALP network to select. Subsets of the set of the input variable values and their ranges are used to select multiple A-OALPs or A-OALP networks. The use of a selection state external to the A-OALP states means that the system can directly multi-task without explicit programming, without human intervention, and without traditional generative AI-based selection.

Since input variables and their value ranges are explicitly associated with either A-OALPs or A-OALP networks, having a subset of input variable values that are not associated means an unknown area. That is, the system explicitly identifies any input variables or values ranges that it cannot process. This is especially important for generative AI systems as it can eliminate a key source of so-called AI hallucinations. If there is a corresponding output for any unknown input dataset or value ranges, then an output complexity function can be generated using the methods of this invention. That is, direct learning can be accomplished without the normal training used in the current machine learning technologies.

Figure 27:
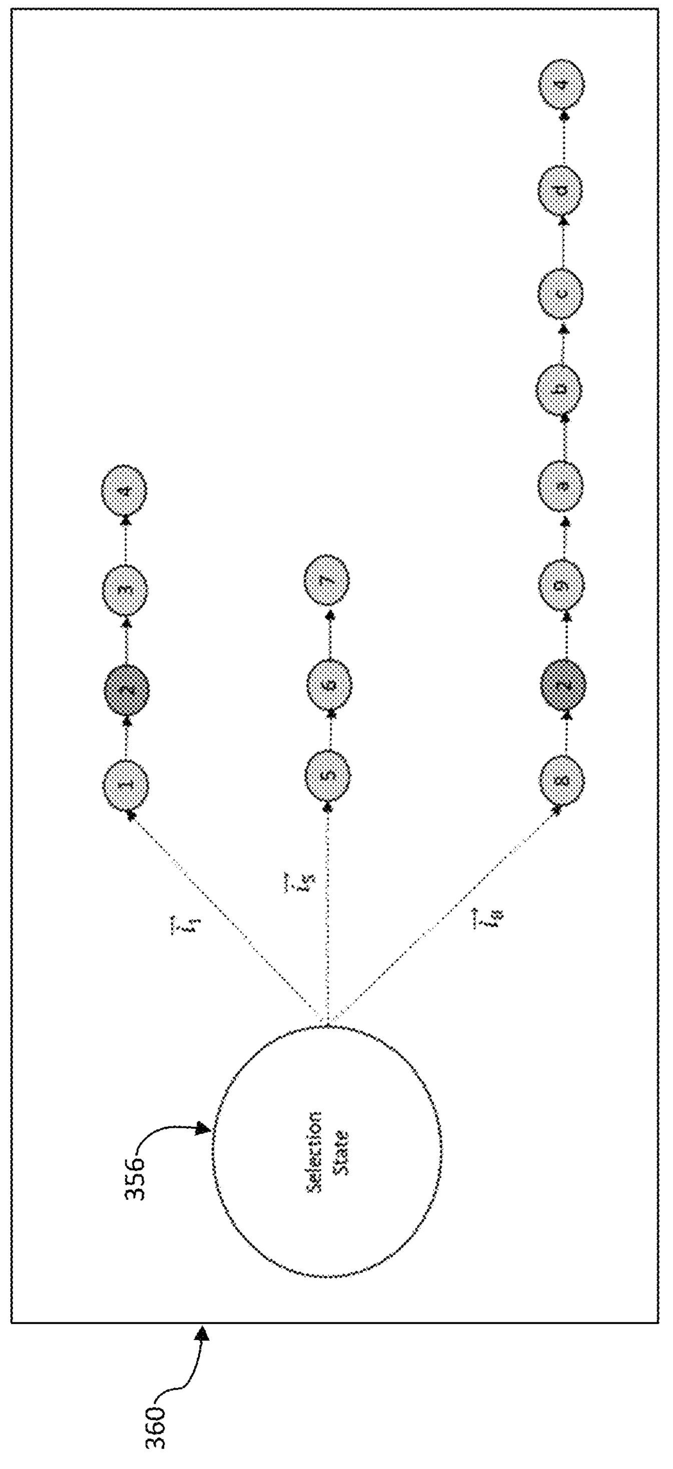
FIG. 27 shows an example of a network with multiple input A-OALPs selected, in accordance with embodiments of the present invention.
Figure 30:
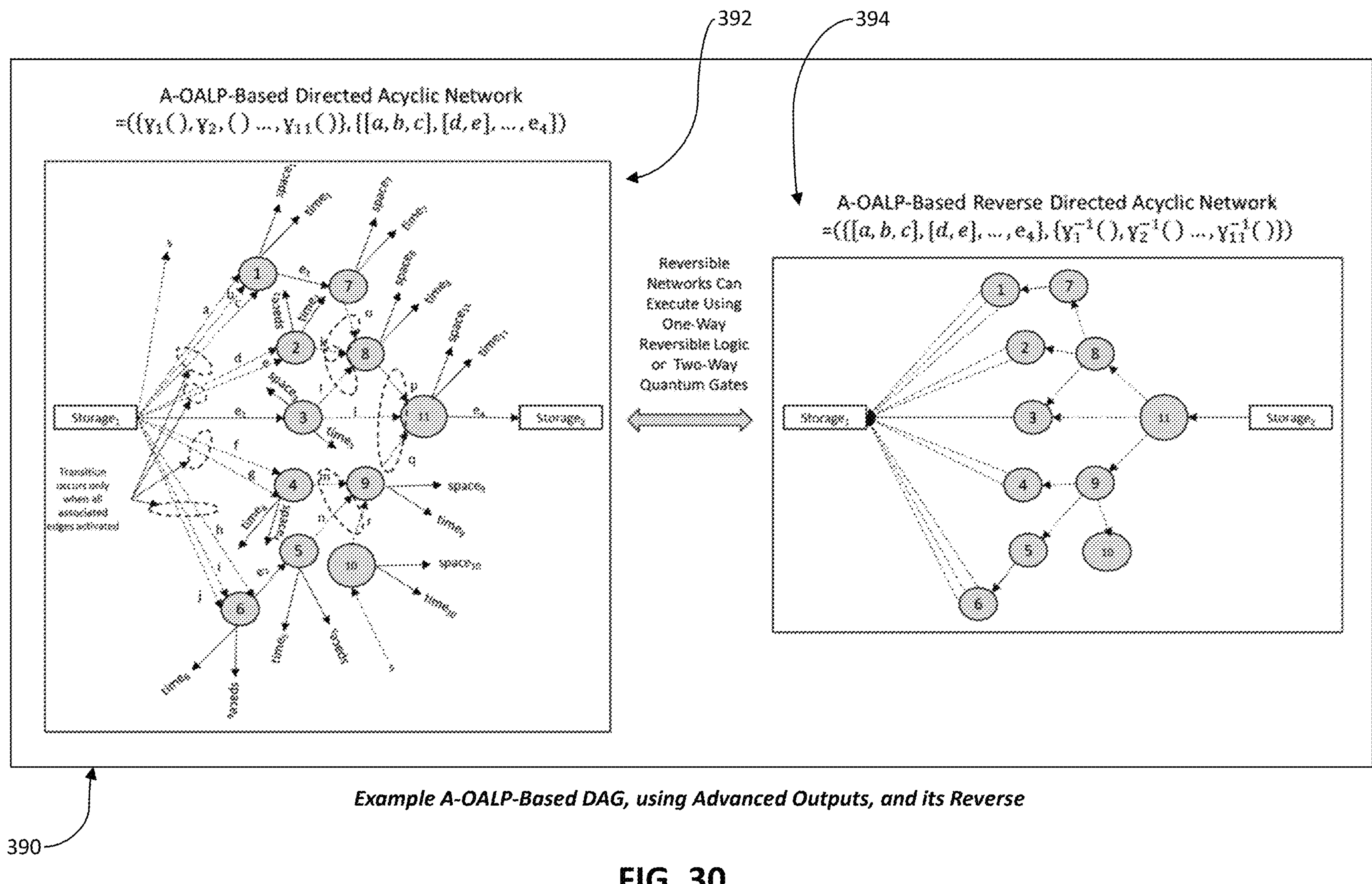
FIG. 30 shows an A-OALP-based DAG using hierarchically combined advanced outputs connecting nodes as well as its reverse, in accordance with embodiments of the present invention.
Figure 31:
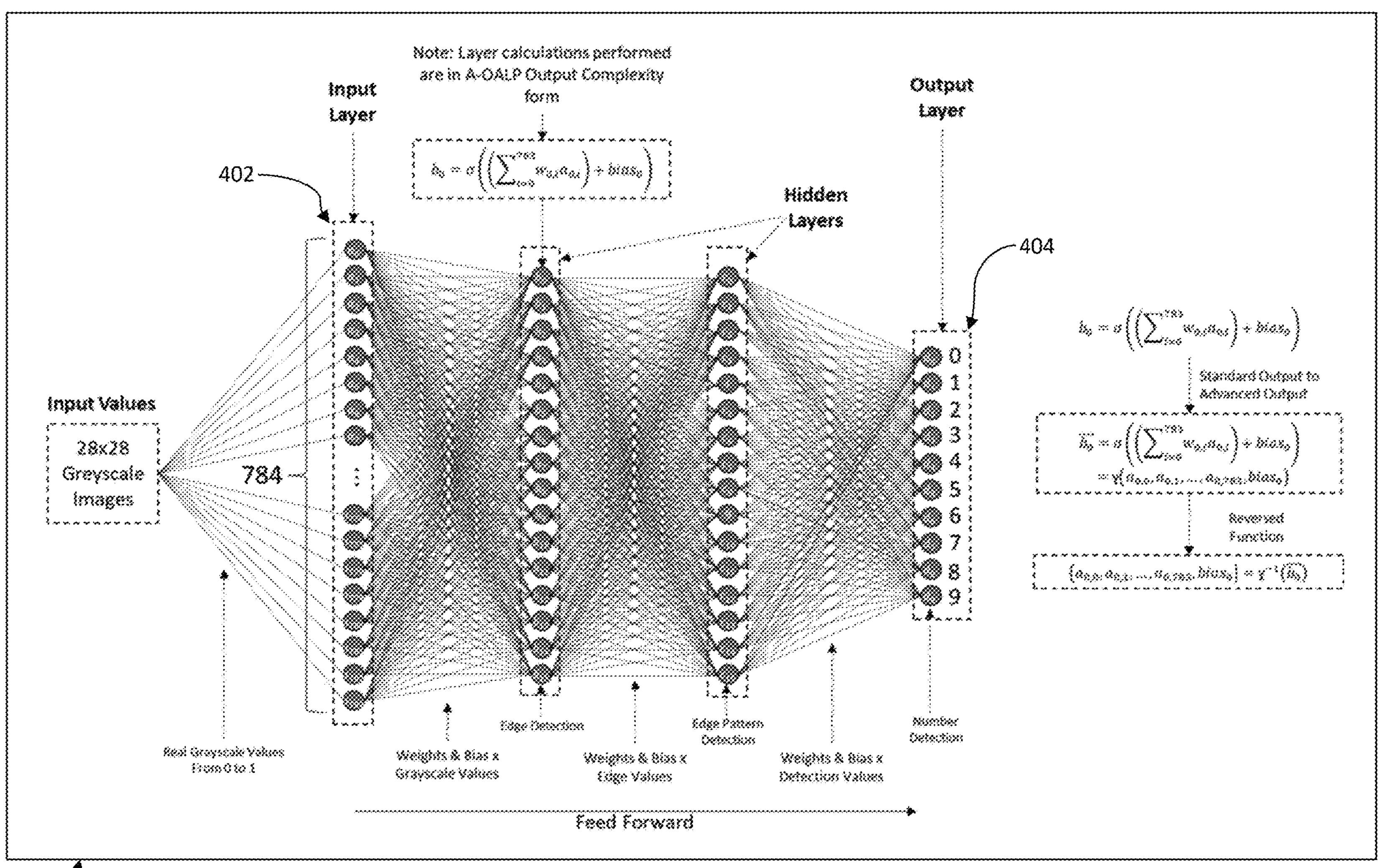
FIG. 31 shows an example diagram of a neural network with feed-forward, equivalent to a directed acyclic graph, in accordance with embodiments of the present invention.
Figure 32:
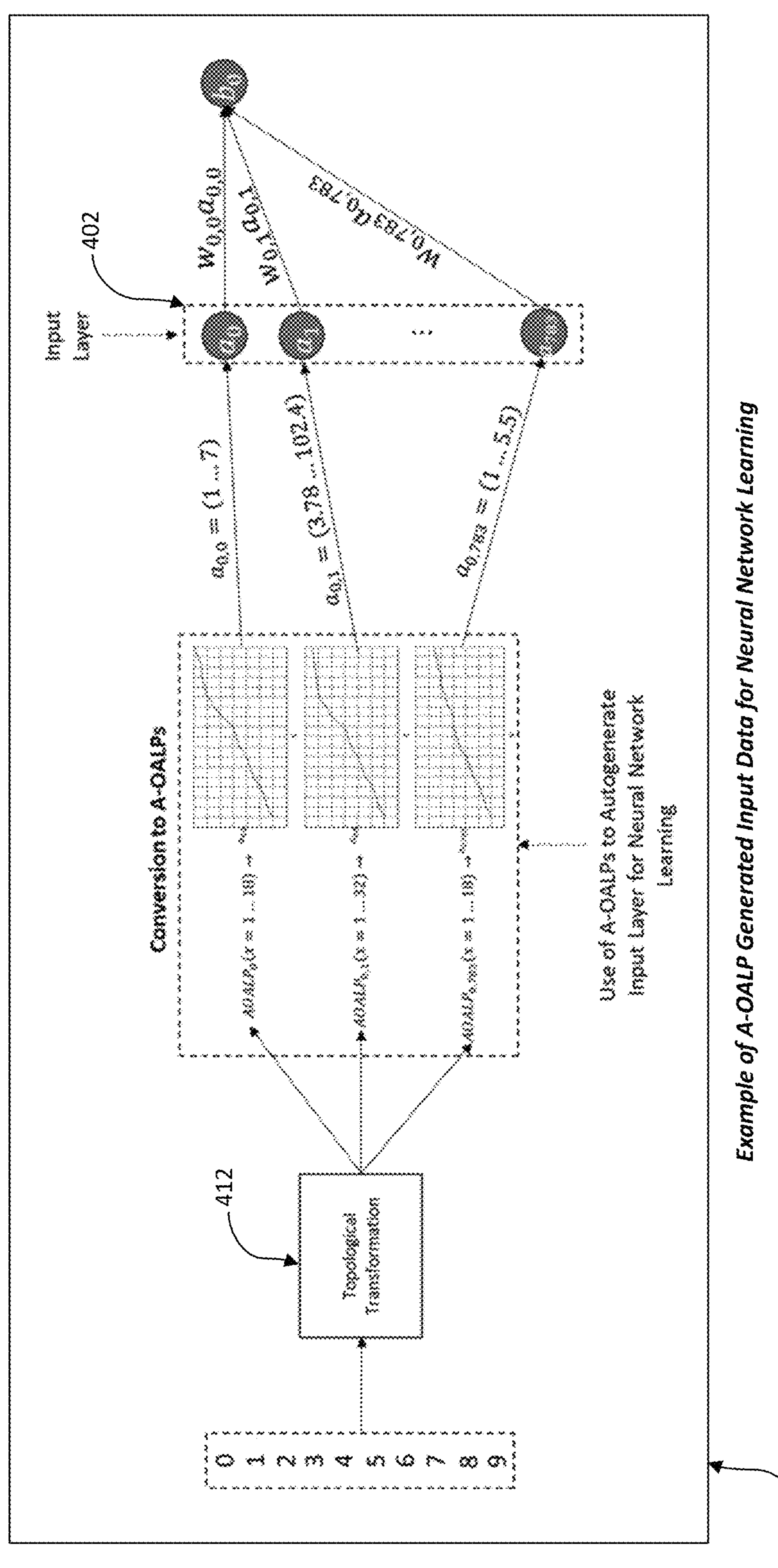
FIG. 32 shows an example of a set of A-OALPs as the source of the input datasets used to decrease the required input training data needed for neural network learning, in accordance with embodiments of the present invention.

FIG. 27 shows a diagram 360 of the selection state 356 selecting a network that uses multiple input A-OALPs. Selection of a particular A-OALP using only a set of non-loop control input variables with particular value ranges have been discussed. What was not discussed was the use of that same mechanism in the selection of the input A-OALPs of an A-OALP network. Many networks, in particular neural networks have multiple input A-OALPs as is shown in FIG. 30, FIG. 31, and FIG. 32. The present invention expands the concept of automatic A-OALP selection by selecting multiple A-OALPs that together define the input of a particular network, rather than a particular A-OALP.

Figure 28:
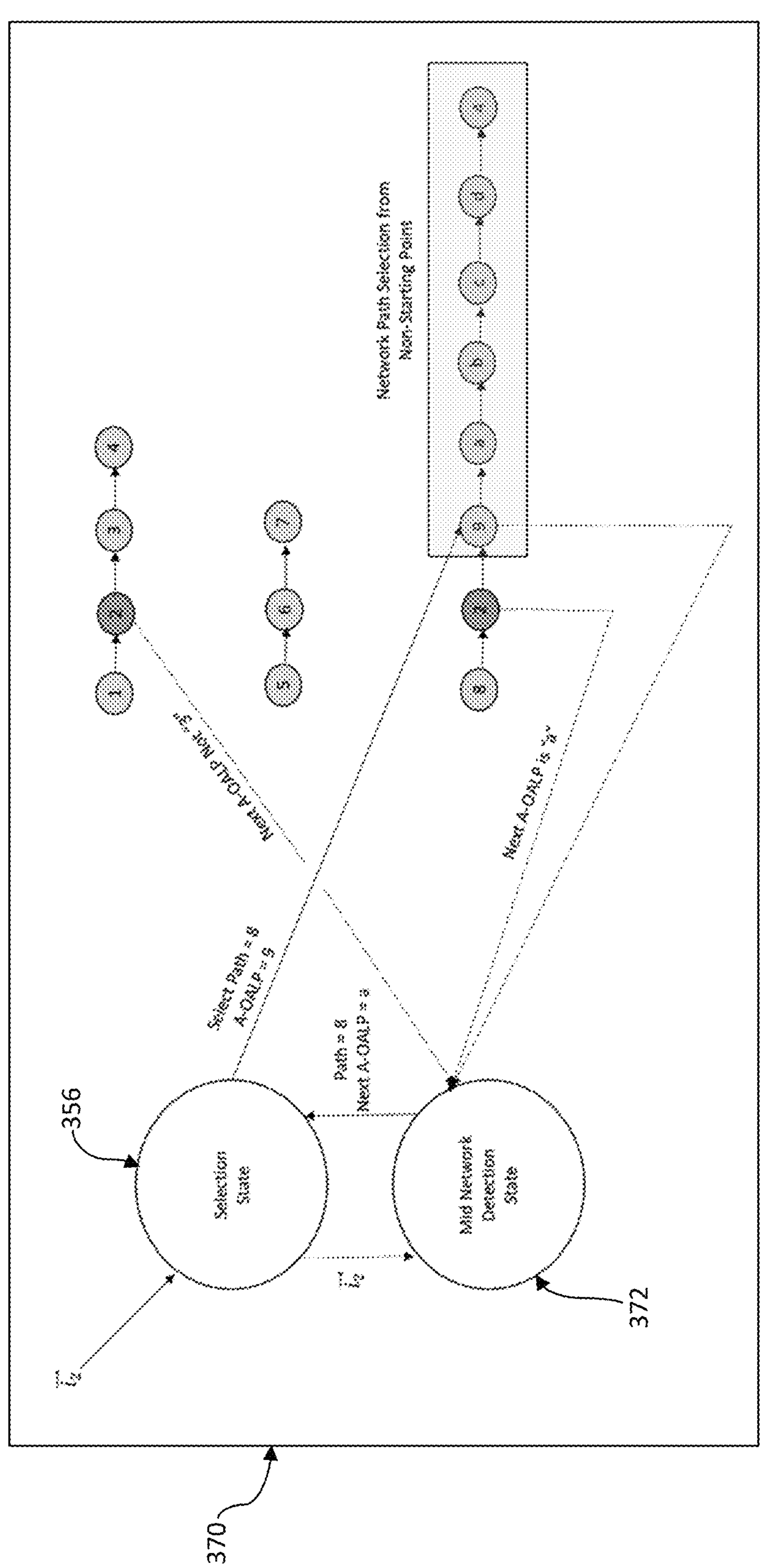
FIG. 28 shows an example of two operational states used to determine the network when the first A-OALP of a network pathway has not been detected, in accordance with embodiments of the present invention.

FIG. 28 shows a diagram 370 depicting the determination of the correct path within an A-OALP network when the starting A-OALP of that network path has not been detected. In this case the A-OALP to be selected based on the input variable attribute values that define the execution pathway is A-OALP 2. As shown, A-OALP 2 occurs along two different network paths: 1 and 8, named for their associated first A-OALP. There are three different possibilities if A-OALP 2 is selected: 1) there is no following A-OALP that is tied to a network pathway, 2) the following A-OALP is A-OALP 3, in which case the network pathway 1 would be indicated, and 3) the following A-OALP is A-OALP 9. The selection state 356 recognizes that A-OALP 2 is not the first A-OALP of any network pathway in its list of network pathways. This causes the state to transition to the mid-network detection state 372, which uses the generated output of A-OALP 2 to decide which of the three conditions apply, in this case network path 8 at the start of A-OALP 9. The mid-network detection state sends the network path and network path location back to the selection state and then transitions back to the selection state. Where transformation information is found, it is sometimes advantageous to be able to predict what the next transformations will be prior to performing those transformations. This is especially important to logistics networks where problems within the network need to be determined as soon as practicable.

Figure 29:
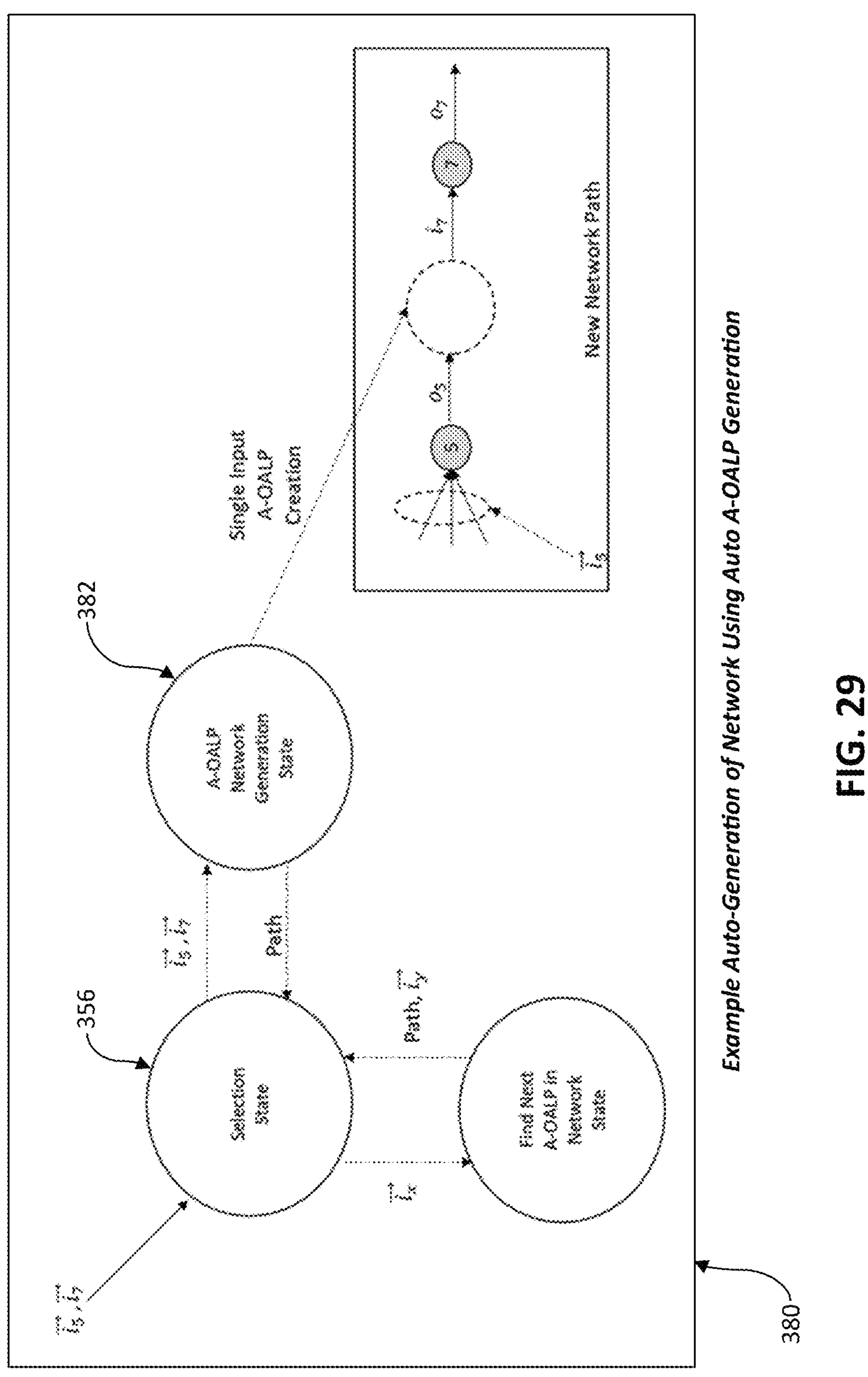
FIG. 29 shows an example of automatic A-OALP network generation with automatic A-OALP generation, in accordance with embodiments of the present invention.
Figure 29A:
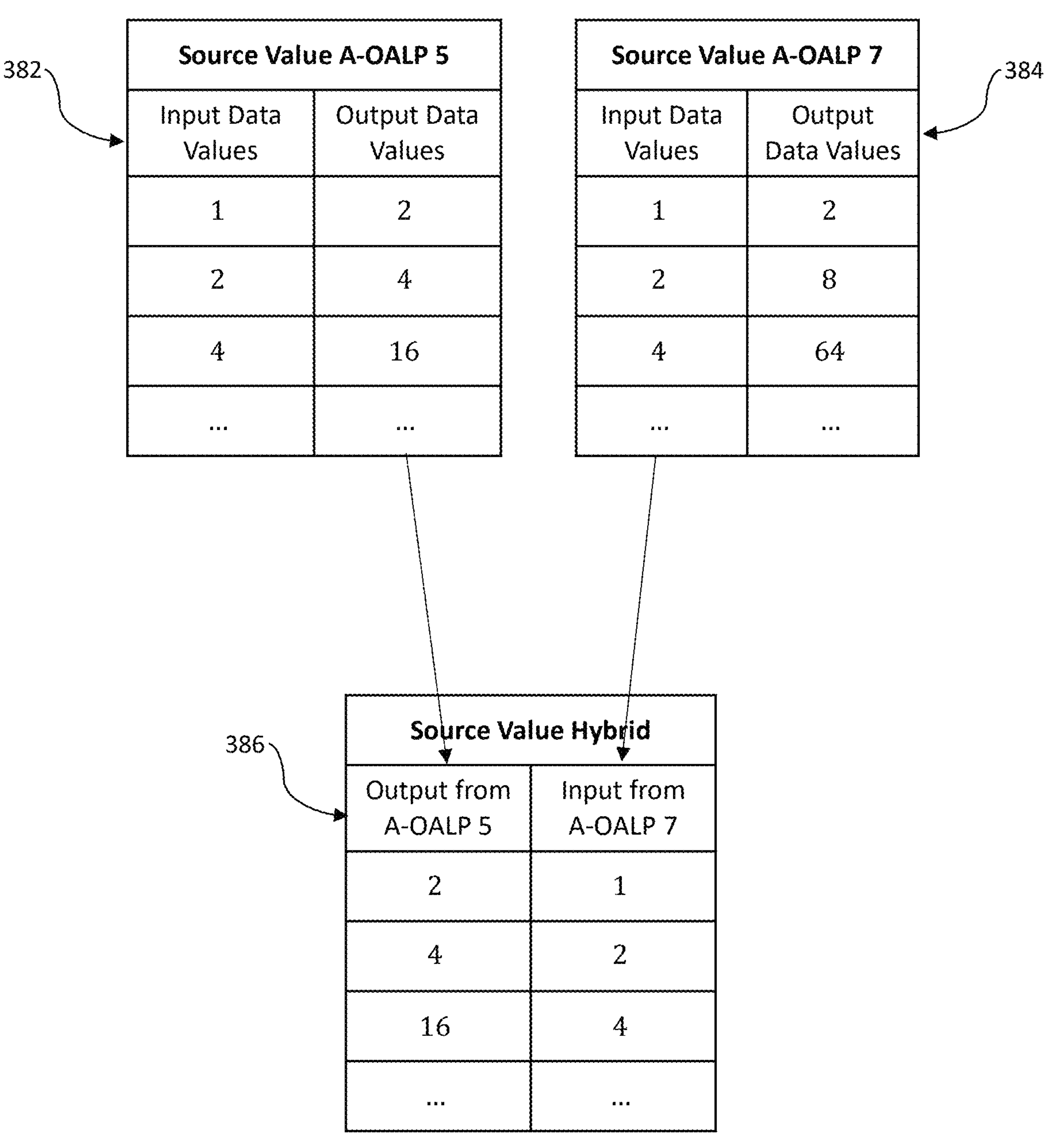
FIG. 29A shows that A-OALPs with multiple inputs can generate hybrid source values tables for each of their inputs, in accordance with embodiments of the present invention.

FIG. 29 shows a diagram 380 depicting the automatic generation of a network or network pathway. Here two A-OALPs, $\vec{i}_5$, $\vec{i}_7$, are given to the selection state 356. A-OALP $\vec{i}_5$ represents some beginning A-OALP while $\vec{i}_7$ represents a desired ending A-OALP. Note that the output of the beginning A-OALP does not match the input of the ending A-OALP. The source values tables for both A-OALP 5 and A-OALP 7 can be combined to produce a new hybrid table that can be used to create a new output complexity, equivalent to a new A-OALP, that bridges the beginning and ending A-OALPs. Advanced time and advanced space complexities are then generated by profiling the new A-OALP. As shown in FIG. 29A (Table 8), A-OALPs with multiple inputs can generate hybrid source values tables 386 for each of their inputs 382, 384.

Consider that both an A-OALP network and an algorithm or computer program represent a set of data transformations. David J. Wheeler is often cited as saying "automated software (creation) is just a different level of abstraction." Unlike Wheeler's statement, which presupposes that automated software is abstracted from existing software, the generation of a hybrid source values table and the subsequent creation of a new A-OALP is neither an abstraction from some existing code nor does it represent the sum of any set of pre-existing codes. Thus, the generated A-OALP network represents true automated software development and is called herein automated A-OALP network generation 382. Automated A-OALP network generation describes one aspect of general machine intelligence: solving problems where existing codes do not exist. As with any A-OALP network, automatically generated A-OALP networks can be serial, parallel, reversible, or quantum-enabled.

FIG. 30 shows an example diagram 390 of a reversible A-OALP-based DAG with hierarchically combined advanced outputs. The execution of any of the nodes on the first graph 392 shows that both processing time and memory allocation are generated. The second diagram 394 shows the A-OALP-based reverse DAG, which is possible when every inverse A-OALP in the A-OALP-based DAG has the associated advanced outputs of the original A-OALP nodes used as inputs. Notice that the processing time and memory allocation for the inverse are not shown but could be calculated.

The inverse of every A-OALP primary analytic is possible when they are strictly monotonic as they are well-behaved functions. Inverse functions calculate a set of valid input variable values given the output variable value. As for reversible A-OALPs in table 4, if there are multiple input variables, then multiple sets of values could generate the same output value. The inverse of an A-OALP primary analytic with more than one input variable will generate a valid set of input variable values but not necessarily the original set of input variable values. As discussed for FIG. 7, in order to complete the output value, it must be treated as a vector containing the standard output variables and the original input values.

FIG. 31 shows an example diagram 400 of the feed forward steps of a simple neural network. As can be seen, the feed forward step of a neural network is a type of directed acyclic graph. Every layer that is to the right of the input layer 402 consists of a set of calculations that utilize the data that is associated with the edges used as inputs for each node. The calculations are typically either a sigmoid or similar function. The calculations use multiple inputs and generate a single output, used as an input to a particular next layer (in the feed forward) node. This means that each node in each non-input layer is equivalent to an A-OALP. Defining the non-input layer nodes as A-OALPs allows for the transformation of each output value associated with each next layer-attached edge into advanced output variables. This means that it is possible to have a reverse "feed forward" neural network, allowing any output to be traceable through all layers, generating input layer values. The ability to back trace neural network feed-forward steps represents a new capability for neural networks. Since the entire neural network is reversible when put into A-OALP with advanced output form (output layer 404), then those networks can be processed using reversible logic circuits.

FIG. 32 shows an example diagram 410 of a novel A-OALP-based neural network learning system. Typically, a generative AI system requires vary large datasets in order to build a set of relevant solutions. Here, a set of inputs is topologically transformed 412 into a set of A-OALPs that are then used to generate the input values that go into the input layer 402 of the neural network. Identifying only the original input values allows the system to capture the variation in the data, thus training the system to recognize relevant patterns within the data. Here are shown the numbers zero through nine with various topological transformations put into A-OALP form. Since the originating input is known, the entire network is self-learning with the smallest possible input data required.

Figure 33:
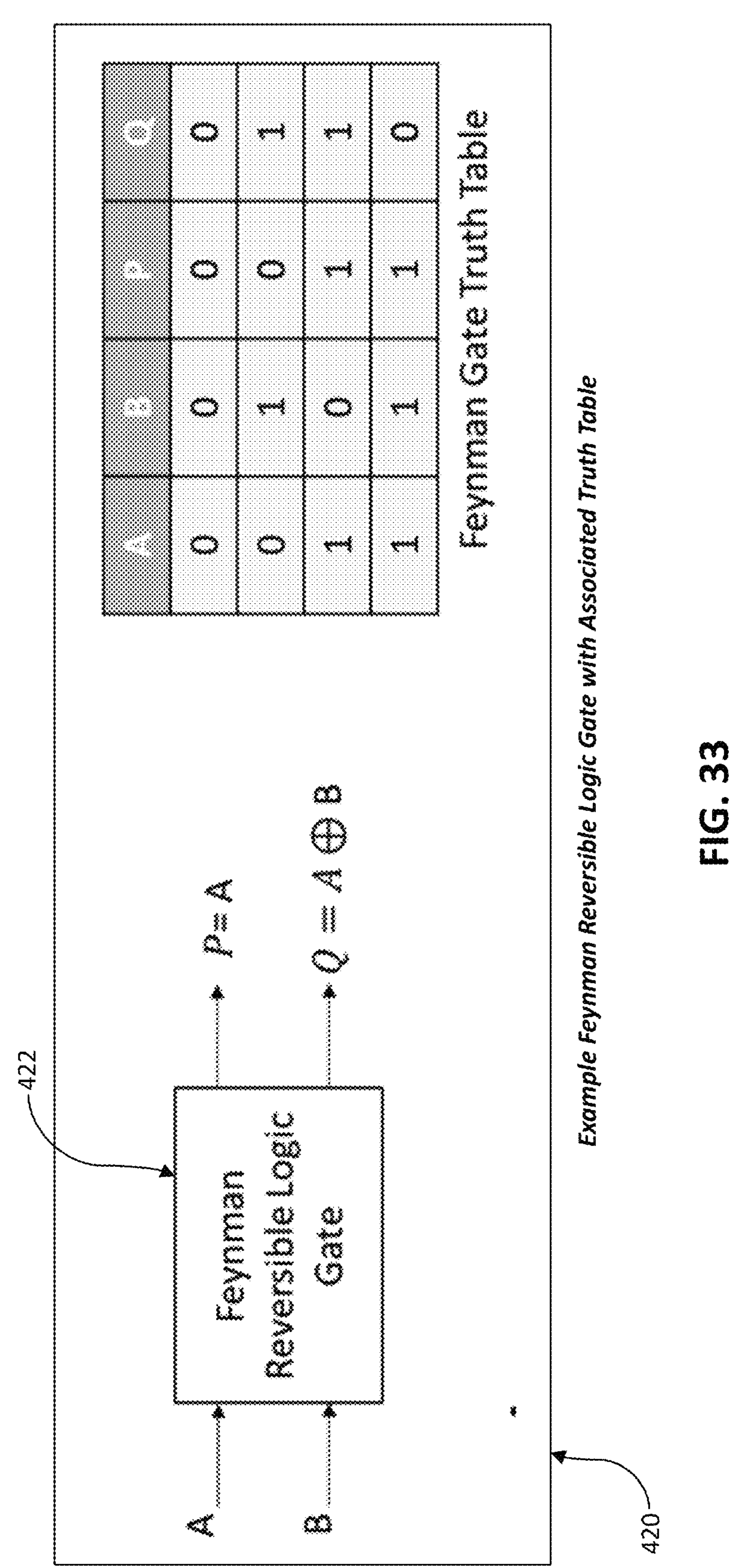
FIG. 33 shows an example of a Feynman reversible logic gate with its associated truth table, in accordance with embodiments of the present invention.

FIG. 33 shows an example diagram 420 of a reversible logic gate 422, the iconic Feynman gate. Only functions that are in reversible (invertible) form can execute using a reversible logic gate. Consider that every A-OALP primary analytic with an advanced output is invertible and thus meets the criteria needed to execute on reversible logic gates, including Feynman, double Feynman, Toffoli, Fredkin, Peres, TSG, Sayem, D-latches, reversible positive edge-triggered T-Flip Flops, asynchronous up/down counters, and any other hardware structure that requires the use of reversible functions. Thus, A-OALP primary analytics with advanced output inherently have applications in low-power CMOS, quantum computing, nanotechnology, optical computing, low-power DSPs and low-power FPGAs. Addressing fan-out from reversible functions requires only increasing the number of reversible logic gates.

Figure 34:
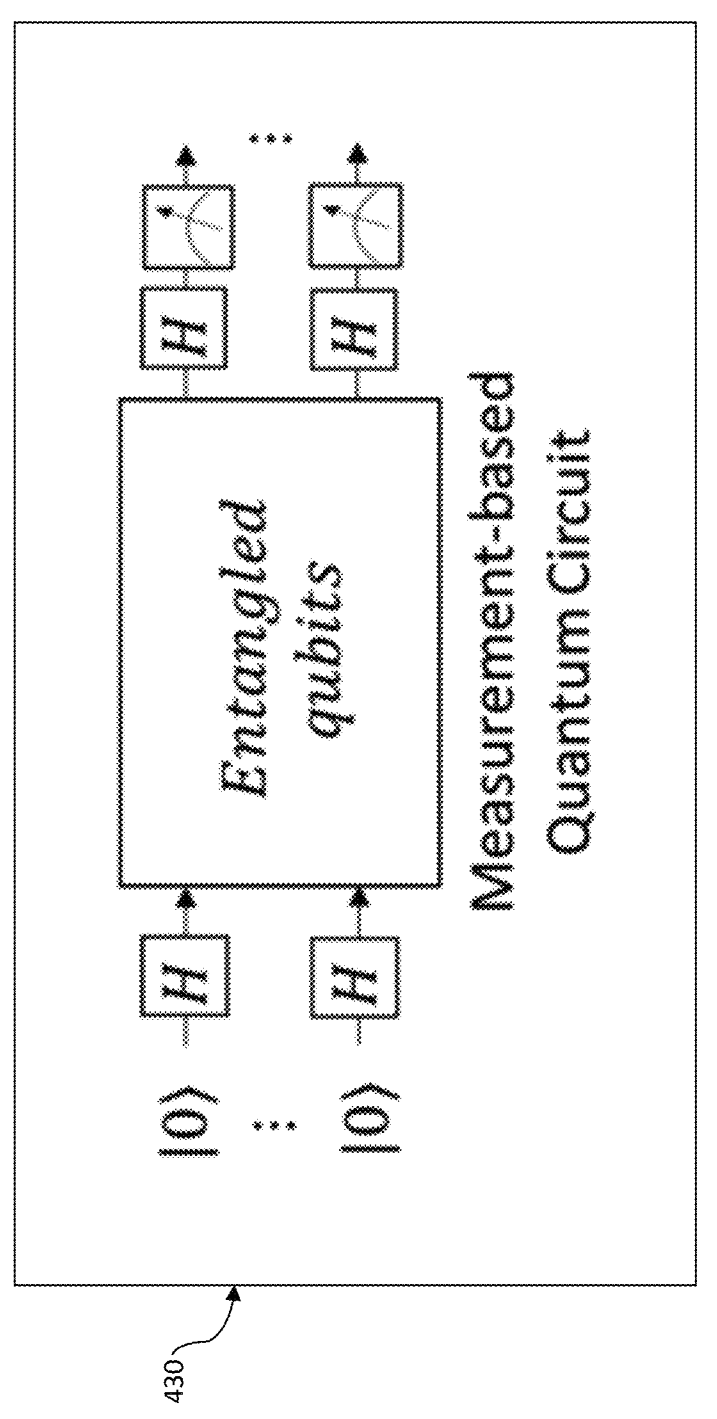
FIG. 34 shows an example of a measurement-based quantum circuit, in accordance with embodiments of the present invention.

With regard to FIG. 34, since all values of well-behaved functions can be represented as a possibly infinite superposition of plane waves, $e^{ikx}$, and since all A-OALP primary analytics are well-behaved functions, then all A-OALP primary analytics can be represented as a superposition of plane wave functions with definite momentum. This means that A-OALP primary analytics (both monotonic and constant) can be executed using non-reversible, one-way, measurement-based quantum computing.

That is:

Advanced Time Complexity as Superposed Plane Waves $$T_{AOALP}(x) = \frac{1}{\sqrt{2\pi}} \int dk \tilde{T}_{AOALP}(k) e^{ikx} \qquad \text{Equation 32}$$

Where: $T_{AOALP}(x)$ = Advanced time complexity of the current $A\text{-}OALP$ given some position $\tilde{T}_{AOALP}(k)$ = Continuous Fourier transform of advanced time complexity given $k$, -continued $$i = \text{A particular wave function,}$$

$$k = \frac{2\pi}{\lambda} \text{ wave number,}$$

$$x = \text{Position along the curve generated by the } A\text{-}OALP\text{'s advanced time complexity}$$

$$\lambda = \text{Wavelength}$$

$$e^{ikx} = \text{A particular function } i.$$

Reverse Advanced Time Complexity as Superposed Plane Waves $$\tilde{T}(k) = \frac{1}{\sqrt{2\pi}} \int dx T(x) e^{-ikx} \quad \text{Equation 33}$$

Advanced Space Complexity as Superposed Plane Waves $$\mathcal{Z}_{AOALP}(x) = \frac{1}{\sqrt{2\pi}} \int dk \tilde{\mathcal{Z}}_{AOALP}(k) e^{ikx} \quad \text{Equation 34}$$

$$\text{Where: } \mathcal{Z}_{AOALP}(x) = \text{Advanced space complexity of the current } A\text{-}OALP \text{ given some position}$$

$$\tilde{\mathcal{Z}}_{AOALP}(k) = \text{Continuous Fourier transform of advanced space complexity given } k,$$

$$i = \text{A particular wave function,}$$

$$k = \frac{2\pi}{\lambda} \text{ wave number,}$$

$$x = \text{Position along the curve generated by the } A\text{-}OALP\text{'s advanced space complexity}$$

$$\lambda = \text{Wavelength}$$

$$e^{ikx} = \text{A particular function.}$$

Reverse Advanced Space Complexity as Superposed Plane Waves $$\tilde{\mathcal{Z}}(k) = \frac{1}{\sqrt{2\pi}} \int dx \mathcal{Z}(x) e^{-ikx} \quad \text{Equation 35}$$

Output Complexity as Superposed Plane Waves $$\mathcal{Y}_{AOALP}(x) = \frac{1}{\sqrt{2\pi}} \int dk \tilde{\mathcal{Y}}_{AOALP}(k) e^{ikx} \quad \text{Equation 36}$$

$$\text{Where: } \mathcal{Y}_{AOALP}(x) = \text{Output complexity of the current } A\text{-}OALP \text{ given some position}$$

$$\tilde{\mathcal{Y}}_{AOALP}(k) = \text{Continuous Fourier transform of output complexity given } k,$$

$$i = \text{A particular wave function,}$$

$$k = \frac{2\pi}{\lambda} \text{ wave number,}$$

$$x = \text{Position along the curve generated by the } A\text{-}OALP\text{'s output complexity}$$

$$\lambda = \text{Wavelength}$$

$$e^{ikx} = \text{A particular function}$$

Reverse Output complexity as Superposed Plane Waves $$\tilde{\mathcal{Y}}(k) = \frac{1}{\sqrt{2\pi}} \int dx \mathcal{Y}(x) e^{-ikx} \quad \text{Equation 37}$$

All A-OALP primary analytics can also be represented as a superposition of states with definite position.

Advanced Time Complexity as Superposed Delta Functions $$T_{AOALP}(x) = \frac{1}{\sqrt{2\pi}} \int dx_0 T_{AOALP}(x_0) \delta(x - x_0) \quad \text{Equation 38}$$

$$\text{Where } \delta(x - x_0) = \text{Delta function}$$

Advanced Space Complexity as Superposed Delta Functions $$\mathcal{Z}_{AOALP}(x) = \frac{1}{\sqrt{2\pi}} \int dx_0 \mathcal{Z}_{AOALP}(x_0) \delta(x - x_0) \quad \text{Equation 39}$$

Output Complexity as Superposed Delta Functions $$\mathcal{Y}_{AOALP}(x) = \frac{1}{\sqrt{2\pi}} \int dx_0 \mathcal{Y}_{AOALP}(x_0) \delta(x - x_0) \quad \text{Equation 40}$$

FIG. 34 shows an example of a measurement-based quantum circuit 430, also known as a one-way quantum circuit. This type of quantum circuit is directly programable from A-OALP primary analytics, both monotonic and constant. The superposition principle, "a linear system whose net response, $y_{total}$, caused by multiple stimuli is equal to the sum of the responses caused by each stimulus separately," can be used to generate multiple parallel A-OALP instances:

Superposition Principle $$y_{total} = y(x_1) + y(x_2) + \cdots + y(x_n) \quad \text{Equation 41}$$

Multiple $A\text{-}OALP$ Instances from Superposition Principle $$\{AOALP(x_1) + AOALP(x_2) + \cdots + AOALP(x_n)\} \quad \text{Equation 42}$$

Thus, there is superposition-based parallelism. Note that superposition-based parallelism generates multiple instances of the same A-OALP instead of multiple A-OALPs as is the case with the similar-appearing associative parallel principle.

Methods of the present invention can provide and facilitate optimization of software or one or more algorithms, with various methods comprising receiving the software or the one or more algorithms, from an operator; decomposing the software or the one or more algorithms into one or more executable and analyzable advanced A-OALPs, wherein each of the one or more A-OALPs includes runtime information generation for one or more instances; executing the one or more A-OALPs; receiving one or more input variable attribute values in a source values table; comparing the one or more input variable attribute values that correspond to a pathway selection entry in an A-OALP selection table, wherein the A-OALP selection table uses the one or more input variable attribute values; selecting at least one A-OALP that corresponds to the pathway selection; determining which of the one or more input variable attribute values vary a processing time of the selected at least one A-OALP; determining which of the one or more input variable attribute values vary memory allocation of the selected at least one A-OALP; determining whether at least one output complexity value of the selected at least one A-OALP is monotonic, continuous, differentiable, or single-valued; determining at least one advanced output vector of the selected at least one A-OALP; and determining at least one superposed plane wave form of the at least one output complexity value of the selected at least one A-OALP.

In various embodiments, the method further comprises determining a maximum number of parallel cores usable by the selected at least one A-OALP for a currently available number of cores or a user-indicated maximum number of cores.

In various embodiments, the method further comprises optimizing energy consumption or processing performance through the use of quantum computer execution.

In various embodiments, the method further comprises generating a output complexity curve fit for each A-OALP of the one or more A-OALPs using the value profile. In addition, the inverse of the value prediction curve fit for each A-OALP is generated.

In various embodiments, the inclusion of quantum parallelism is combined with the task-like and dynamic loop parallelism giving more parallelism than either technique separately.

In various embodiments, the method further comprises enabling reversibility of the selected at least one A-OALP by use of the at least one advanced output vector.

In various embodiments, the method further comprises executing the reversible selected at least one A-OALP.

In various embodiments, the execution is on a reversible logic gate.

In various embodiments, the execution is on a quantum circuit.

In various embodiments, the quantum circuit is a measurement-based quantum circuit.

In various embodiments, the at least one advanced output vector comprises at least one of quadrant data, monotonicity data, or full-state metadata.

In various embodiments, the at least one advance output vector provides algorithmic compression.

In various embodiments, the at least one output complexity value is executed on a measurement-based quantum circuit.

In various embodiments, the method further comprises executing the selected at least one A-OALP within a processing framework selected from at least one of a serial A-OALP framework, a parallel A-OALP framework, a reversible parallel A-OALP framework, or a context-aware A-OALP framework.

In various embodiments, linked A-OALPs form a reversible DAG.

In various embodiments, the DAG represents a neural network, and the neural network is transmitted or reconstructed using only advanced output vectors.

In various embodiments, the method further comprises decomposing an A-OALP into a plurality of incomplete A-OALP segments and recombining the segments using an associative parallel principle.

In various embodiments, A-OALPs are executed in parallel using superposition parallelism or graph parallelism.

In various embodiments, the output complexity of an A-OALP is expressed as a superposition of plane waves and executed on a measurement based quantum circuit.

In various embodiments, an A-OALP is executed on a reversible logic gate selected from the group of: Feynman, double Feynman, Toffoli, Fredkin, Peres, TSG, and Sayem D latch.

In various embodiments, an A-OALP is executed within a processing framework selected from: a serial A-OALP framework, a parallel A-OALP framework, a reversible parallel A-OALP framework, or a context aware A-OALP framework.

In various embodiments, the context aware A-OALP framework links analytics, processing elements, and user goals to provide real time responsiveness.

In various embodiments, neural network training data is reduced by generating input datasets from A-OALPs.

In various embodiments, advanced output vectors are used to encrypt or compress neural network weights.

In various embodiments, the advanced output vector is used to automatically generate source value tables for each input variable.

In various embodiments, the advanced output vector is converted into a plurality of output complexities, one per input variable.

In various embodiments, the advanced output vector is used to regenerate an algorithm's execution pathway without access to the original source code.

In various embodiments, the A-OALP is decomposed into multiple quadrant specific A-OALPs, each corresponding to a distinct output value range.

In various embodiments, the A-OALP is executed in a hybrid framework combining dynamic loop unrolling with measurement based quantum parallelism.

In various embodiments, the advanced output vector is used to detect repeating activity loops within the algorithm.

In various embodiments, the advanced output vector is used to provide predictive analytics for algorithm performance.

In various embodiments, the advanced output vector is used to provide automatic rollback or inversion of algorithmic execution.

In various embodiments, the advanced output vector is used to synchronize distributed computing nodes in a parallel execution environment.

While various embodiments have been described above, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

It will be recognized by one skilled in the art that operations, functions, algorithms, logic, method steps, routines, sub-routines, and modules may be implemented in software, in firmware, in special purpose digital logic, and any combination thereof without deviating from the spirit and scope of the present invention as recited within the claims attached hereto.

The present invention may be embodied in other specific forms without departing from the spirit or essential attributes thereof, and it is, therefore, desired that the present embodiment be considered in all respects as illustrative and not restrictive. Similarly, the above-described methods, steps, apparatuses, and techniques for providing and using the present invention are illustrative processes and are not intended to be limited to those specifically defined herein. Further, features and aspects, in whole or in part, of the various embodiments described herein can be combined to form additional embodiments within the scope of the invention even if such combination is not specifically described herein.

While the methods, steps, and processing described above and illustrated in the drawings are shown as a sequence of steps, this was done solely for the sake of illustration. Accordingly, it is contemplated that some steps may be added, some steps may be omitted, the order of steps may be re-arranged, and some steps may be performed in parallel.

It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

For purposes of interpreting the claims for the present invention, it is expressly intended that the provisions of 35 U.S.C. § 112(f) are not to be invoked unless the specific terms "means for" or "step for" are recited in a claim.

Further, all patent applications, publications, and patents, and their corresponding disclosures and details, referenced or identified herein are hereby fully incorporated herein by reference.

What is claimed is:

1. A method for optimization of software or one or more algorithms, comprising:

receiving the software or the one or more algorithms, from an operator;

decomposing the software or the one or more algorithms into one or more executable and analyzable advanced output-affecting linear pathways (A-OALPs), wherein each of the one or more A-OALPs includes runtime information generation for one or more instances;

executing the one or more A-OALPs;

receiving one or more input variable attribute values in a source values table;

comparing the one or more input variable attribute values that correspond to a pathway selection entry in an A-OALP selection table, wherein the A-OALP selection table uses the one or more input variable attribute values;

selecting at least one A-OALP that corresponds to the pathway selection;

determining which of the one or more input variable attribute values vary a processing time of the selected at least one A-OALP;

determining which of the one or more input variable attribute values vary memory allocation of the selected at least one A-OALP;

determining whether at least one output complexity value of the selected at least one A-OALP is monotonic, continuous, differentiable, or single-valued;

determining at least one advanced output vector of the selected at least one A-OALP;

determining at least one superposed plane wave form of the at least one output complexity value of the selected at least one A-OALP;

enabling reversibility of the selected at least one A-OALP by use of the at least one advanced output vector; and executing the reversible selected at least one A-OALP.

2. The method of claim 1, wherein the execution is on a reversible logic gate.

3. The method of claim 1, wherein the execution is on a quantum circuit.

4. The method of claim 3, wherein the quantum circuit is a measurement-based quantum circuit.

5. The method of claim 1, wherein the at least one advanced output vector comprises at least one of quadrant data, monotonicity data, or full-state metadata.

6. The method of claim 1, wherein the at least one advance output vector provides algorithmic compression.

7. The method of claim 1, wherein the at least one output complexity value is executed on a measurement-based quantum circuit.

8. The method of claim 1, further comprising executing the selected at least one A-OALP within a processing framework selected from at least one of a serial A-OALP framework, a parallel A-OALP framework, a reversible parallel A-OALP framework, or a context-aware A-OALP framework.

9. A system for optimization of software or one or more algorithms, comprising:

a memory; and a processor operatively coupled with the memory, wherein the processor is configured to execute a program code to:

receive the software or the one or more algorithms, from an operator;

decompose the software or the one or more algorithms into one or more executable and analyzable advanced output-affecting linear pathways (A-OALPs), wherein each of the one or more A-OALPs includes runtime information generation for one or more instances;

execute the one or more A-OALPs;

receive one or more input variable attribute values in a source values table;

compare the one or more input variable attribute values that correspond to a pathway selection entry in an A-OALP selection table, wherein the A-OALP selection table uses the one or more input variable attribute values;

select at least one A-OALP that corresponds to the pathway selection;

determine which of the one or more input variable attribute values vary a processing time of the selected at least one A-OALP;

determine which of the one or more input variable attribute values vary memory allocation of the selected at least one A-OALP;

determine whether at least one output complexity value of the selected at least one A-OALP is monotonic, continuous, differentiable, or single-valued;

determine at least one advanced output vector of the selected at least one A-OALP; and determine at least one superposed plane wave form of the at least one output complexity value of the selected at least one A-OALP;

enable reversibility of the selected at least one A-OALP by use of the at least one advanced output vector; and execute the reversible selected at least one A-OALP.

10. The system of claim 9, wherein the execution is on a reversible logic gate.

11. The system of claim 9, wherein the execution is on a quantum circuit.

12. The system of claim 11, wherein the quantum circuit is a measurement-based quantum circuit.

13. The system of claim 9, wherein the at least one advanced output vector comprises at least one of quadrant data, monotonicity data, or full-state metadata.

14. The system of claim 9, wherein the at least one advance output vector provides algorithmic compression.

15. The system of claim 9, wherein the at least one output complexity value is executed on a measurement-based quantum circuit.

16. The system of claim 9, wherein the processor is further configured to execute the program code to execute the selected at least one A-OALP within a processing framework selected from at least one of a serial A-OALP framework, a parallel A-OALP framework, a reversible parallel A-OALP framework, or a context-aware A-OALP framework.

* * * * *